US012666463B2

(12) United States Patent
Zhu et al.

(10) Patent No.: US 12,666,463 B2
(45) Date of Patent: Jun. 23, 2026

(54) INTEGRATED SENSING AND COMMUNICATION NETWORK

(71) Applicant: HUAWEI TECHNOLOGIES CO., LTD., Guangdong (CN)

(72) Inventors: Peiying Zhu, Kanata (CA); Jianglei Ma, Kanata (CA); Alireza Bayesteh, Kanata (CA); Yan Chen, Guangdong (CN); Wen Tong, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 432 days.

(21) Appl. No.: 18/324,458

(22) Filed: May 26, 2023

(65) Prior Publication Data

US 2023/0309144 A1 Sep. 28, 2023

Related U.S. Application Data

(63) Continuation of application No. PCT/CN2020/139156, filed on Dec. 24, 2020.

(51) Int. Cl.
| | |
|---|---|
| *H04W 74/08* | (2024.01) |
| *H04W 56/00* | (2009.01) |
| *H04W 74/0808* | (2024.01) |

(52) U.S. Cl.
CPC ... *H04W 74/0808* (2013.01); *H04W 56/0015* (2013.01); *H04W 74/0866* (2013.01)

(58) Field of Classification Search
CPC ......... H04W 74/0808; H04W 56/0015; H04W 74/0866
See application file for complete search history.

(56) References Cited

U.S. PATENT DOCUMENTS

| | | | |
|---|---|---|---|
| 2014/0066085 | A1 | 3/2014 | Sun et al. |
| 2014/0162715 | A1 | 6/2014 | Pak et al. |

(Continued)

FOREIGN PATENT DOCUMENTS

| | | |
|---|---|---|
| CN | 102090097 A | 6/2011 |
| CN | 110149638 A | 8/2019 |

(Continued)

OTHER PUBLICATIONS

Le Thanh Tan:"Medium Access Control for Dynamic Spectrum Sharing in Cognitive Radio Networks," Jan. 19, 2016 (Jan. 19, 2016) XP080679510,total 206pages.

(Continued)

*Primary Examiner* — Derrick V Rose
(74) *Attorney, Agent, or Firm* — Slater Matsil, LLP

(57) ABSTRACT

Systems and methods of integrated sensing and communication are provided. These involve using a communications network for the exchange of both communications signals and sensing signals. A device on the network, which might be a user equipment or a network device, uses a first set of channels to transmit sensing signals for use in cooperative sensing involving a multiple devices, which may include user equipment and/or network devices, for sensing a target that is not registered in the network, such as a building. The device uses a second set of channels to transmit a communications signal. The second set of channels includes at least one channel not included in the first protocol stack.

19 Claims, 50 Drawing Sheets

(56)           References Cited

U.S. PATENT DOCUMENTS

| | | | |
|---|---|---|---|
| 2015/0003369 A1* | 1/2015 | Kim ...................... | H04W 16/14 |
| | | | 370/329 |
| 2017/0265170 A1* | 9/2017 | Park ...................... | H04W 72/23 |
| 2019/0059071 A1 | 2/2019 | Khoryaev et al. | |
| 2022/0155761 A1* | 5/2022 | Oriol ........................ | H04Q 9/00 |
| 2022/0279581 A1* | 9/2022 | Baek .................... | H04W 64/00 |
| 2023/0362990 A1* | 11/2023 | Jang ................. | H04W 74/0808 |

FOREIGN PATENT DOCUMENTS

| | | | |
|---|---|---|---|
| CN | 111190500 A | 5/2020 |
| CN | 111200698 A | 5/2020 |
| CN | 112073974 A | 12/2020 |
| JP | 2017208796 A | 11/2017 |
| WO | 2019058436 A1 | 3/2019 |
| WO | 2020122220 A1 | 6/2020 |

OTHER PUBLICATIONS

"Radio Resource Control (RRC) protocol specification", 3rd Generation Partnership Project; Technical Specification Group Radio Access Network; NR; (Release 16), 3GPP TS 38.331 V16.2.0, Sep. 2020, 921 pages.
Lenovo, et al., "Sidelink Resource Allocation for Power Saving," 3GPP TSG RAN WG1 #102-e, R1-2005839, Aug. 17-28, 2020, 7 pages.

* cited by examiner

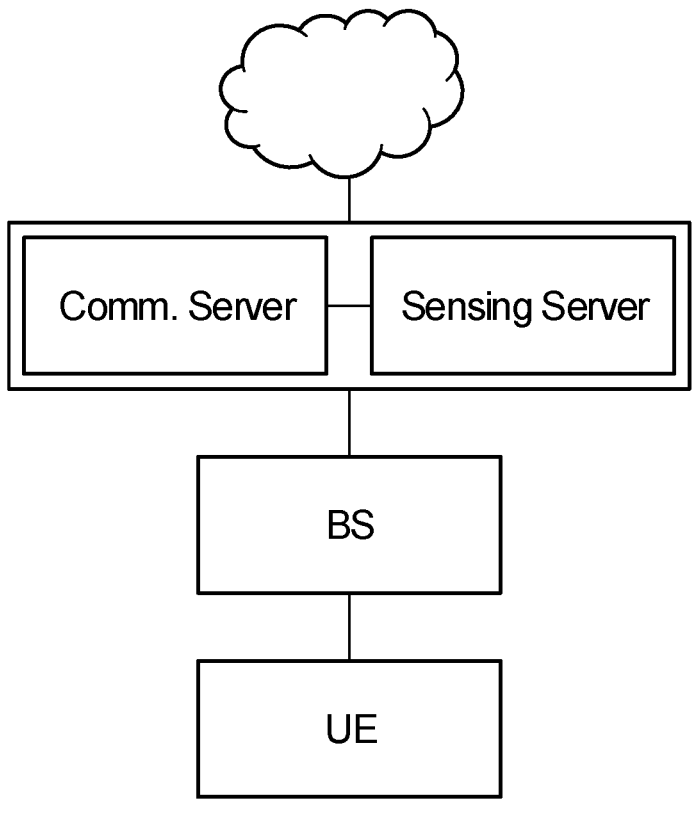
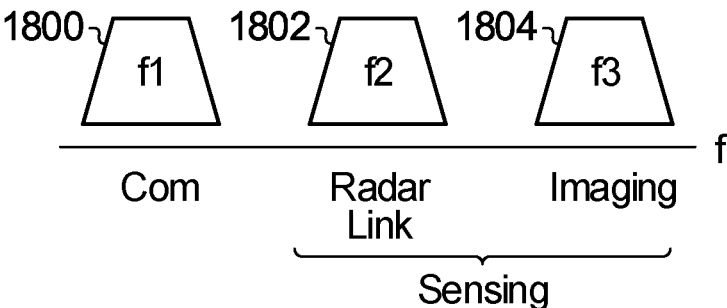
FIG. 18

$T_{ON}(i)$    $T_{ON}(j)$

...

$T_{OFF}(j)$

2710

| Sensing Subcycle 1 | Sensing Subcycle 2 | ... | Sensing Subcycle M |

ON | OFF | ON | OFF | ON | OFF

Baseline Communications Symbol $T_p$ $T_{ON}$ $T_p$ $T_p = \eta T_p$

4400

BUILDING
4430

4420

USER
EQUIPMENT
4110

BASE
STATION
4170

3500

| ICS WAVEFORM | | ICS CONFIGURATION - STRATEGY | | | ICS CAPABILITY | | | |
|---|---|---|---|---|---|---|---|---|
| | | SENSING-ONLY (DED. SENSING) | DEDICATED SENSING + BROADCAST DATA | COMMON SENSING + UNICAST DATA | RF | DUPLEX-ING | PROCESS-ING | OBL |
| FMCW | | ✓ | X | X | ✓ | ✓ | ✓ | OK |
| MULTI-CARRIER WAVEFORM | CP-OFDM | X | X | ✓ | REQ HI | REQUIRE FD | ✓ | OK |
| | OFDM (NO CP) | ✓ | ✓ | X | REQ HI PA CAP | ✓ | REQUIRE HIGH | OK |
| | FBMC | X | ✓ | X | ✓ | ✓ | REQUIRE HIGH | ✓ |
| SINGLE-CARRIER WAVEFORM (UWB PULSE RADAR) | | X | ✓ | X | ✓ | ✓ | ✓ | X |

FIG. 36

INTEGRATED SENSING AND COMMUNICATION NETWORK

CROSS-REFERENCE TO RELATED APPLICATION

This application is a continuation of International Application No. PCT/CN2020/139156, filed on Dec. 24, 2020, the disclosure of which is hereby incorporated by reference in its entirety.

FIELD

The application relates to systems and methods for performing integrated sensing and communication.

BACKGROUND

In wireless communication networks, electronic devices, such as base stations (BS), user equipment (UE), or the like, wirelessly communicate with each other to send or receive data between one another. Sensing is a process of obtaining information about a device's surroundings. Sensing can also be used to detect information about an object such as its location, speed, distance, orientation, shape, texture, etc. This information can be used to improve communications in the network, as well as for other application-specific purposes.

Sensing in communication networks has typically been limited to an active approach, which involves a device receiving and processing a radio frequency (RF) sensing signal. Other sensing approaches, such as passive sensing (e.g., radar) and non-RF sensing (e.g., video imaging and other sensors) can address some limitations of active sensing; however, these other approaches are typically stand-alone systems implemented separately from the communication network.

The benefits of integrating communication and sensing in wireless communications networks have been recognized. It is thus desirable to provide improved systems and methods for sensing and communication integration in wireless communications networks.

SUMMARY

Aspects of the present disclosure seek to better integrate passive sensing with active sensing and communication in a wireless communication network. Aspects of the present disclosure relate to collaborative sensing, involving multiple sensing nodes, to improve sensing performance in the integrated sensing and communication network. Accordingly, aspects of the present disclosure address challenges presented by the considerable performance and connectivity goals of future wireless networks, particularly those challenges related to sensing and building an RF map of the sensed surroundings.

According to one aspect of the present disclosure, there is provided a method in a first device, the method involves using a first set of channels to transmit, by the first device, a first sensing signal for use in cooperative sensing involving a second device for sensing a target. The method also involves using a second set of channels to transmit, by the first device, a communications signal, the second set of channels including at least one channel not included in the first set of channels.

The same first device, which may be a network device such as a base station, or an apparatus such as a user equipment, participates in communications signal transmission and sensing data transmission. This has the advantage of not requiring a separate network for sensing. Different sets of channels are used for communication as opposed to sensing, although there can be some channels that are used for both.

Optionally, each channel in the first of channels and each channel in the second set of channels is a logical channel or a transport channel or a physical channel.

Optionally, the first set of channels comprises at least one logical channel, and the second set of channels comprises a different at least one logical channel.

Advantageously, by using different logical channels, the communication data and sensing data can be treated differently.

Optionally, the method further comprises transmitting cooperation information between the first device and the second device, the cooperation information characterizing at least in part the first sensing signal.

Optionally, the first device is a network device and the second device is a network device and the cooperation information is transmitted via a backhaul link between the first device and the second device.

Optionally, the first device is one of a base station, an integrated access and backhaul (IAB) node or, a relay, and the second device is one of a base station, an IAB node, or a relay.

Optionally, the first device is a network device and the second device is a user equipment (UE), and the cooperation information is transmitted via a Uu link.

Optionally, the first device is a user equipment (UE) and the second device is a UE, and the cooperation information is transmitted via a sidelink between the first device and the second device, or via Uu links between the first device and a third device, and between the second device and the third device.

Optionally, the method comprises exchanging timing information between the first device and the second device for the purpose of synchronization. Optionally, the timing information indicates a time of transmission of the sensing signal.

Advantageously, exchanging timing information allows more accurate processing of the sensing data to be performed, to produce a more accurate sensing result.

Optionally, all channels of the first set of channels are dedicated to communication and all channels of the second set of channels are dedicated to sensing.

Optionally, the second set of channels includes a reduced set of channels compared to the first set of channels.

Optionally, channels of the first set of channels include at least some channels that are dedicated to communication and some channels that are common to the second set of channels and are used for communication and sensing, and channels of the second set of channels include the channels that are common to the first set of channels and at least some channels that are dedicated to sensing.

Optionally, transmitting, by the first device, the sensing signal is performed using a first frequency band. Transmitting, by the first device, the communications signal is performed using a second frequency band. The first frequency band and the second frequency band do not overlap. Alternatively, the first frequency band and the second frequency band do overlap. Alternatively, the first frequency band is a subset of the second frequency band. Alternatively, the second frequency band is a subset of the first frequency band. Alternatively, different bandwidth part (BWP) configurations apply to frequency bands for communication and sensing.

Optionally, the method further involves receiving, by the first device, signalling to turn on or off sensing functions in the first device.

Optionally, the signalling to turn on or off sensing functions comprises signalling that is one of: per cell; per sensing BWP; per device; per group of devices; per group of network devices.

Optionally, the signalling to turn on or off sensing functions is in the form of an on/off plan.

Optionally, the on/off plan is signalled: when the first device is turned on; or when collaborative sensing group is formed, reformed, or dismissed; or when a sensing task is initiated or completed.

Optionally, the method further involves receiving, by the first device, a sensing input from the second device, the sensing input comprising at least one of: first sensing data derived by the second device from a first echo of the sensing signal received by the second device; an intermediate version of the first sensing data derived by the second device from the first echo of the sensing signal received by the second device; a copy of the first echo of the sensing signal; a compressed version of the first echo of the sensing signal; coordinate information about one or more of the location, orientation, heading, and velocity of the second device; and synchronization or timing information; and obtaining, by the first device, second sensing data based on the sensing input.

Optionally, the method further involves receiving sensing data or compressed sensing data from the target.

Optionally, the cooperative sensing involves sensing based on echo signal(s) reflected off at least one target, and sensing data or compressed sensing data received from at least one target.

Optionally, the first device and the second device are any combination of: a base station, an integrated access and backhaul (IAB) node, a relay node, a non-terrestrial network (NTN) node, or a user equipment (UE).

Further embodiments provide a computer program product comprising instructions to perform any of the methods described herein or summarized above.

Further embodiments provide a first device comprising at least one processor; and a memory storing processor-executable instructions that, when executed, cause the processor to execute any one of the methods described herein or summarized above. The first device may be a network device that is, for example, one of base station, integrated access and backhaul (IAB) node, relay node, or non-terrestrial network (NTN) node. Alternatively, the first device may be an apparatus such as a user equipment.

BRIEF DESCRIPTION OF THE DRAWINGS

Embodiments of the disclosure will now be described with reference to the attached drawings in which:

FIG. 18 is an example of communication and sensing conducted using different frequency carriers;

FIG. 36 illustrates, in a table, examples of selection assistance data to assist in the making of a selection of a waveform for an ICS signal according to aspects of the present application;

DETAILED DESCRIPTION

Figure 1:
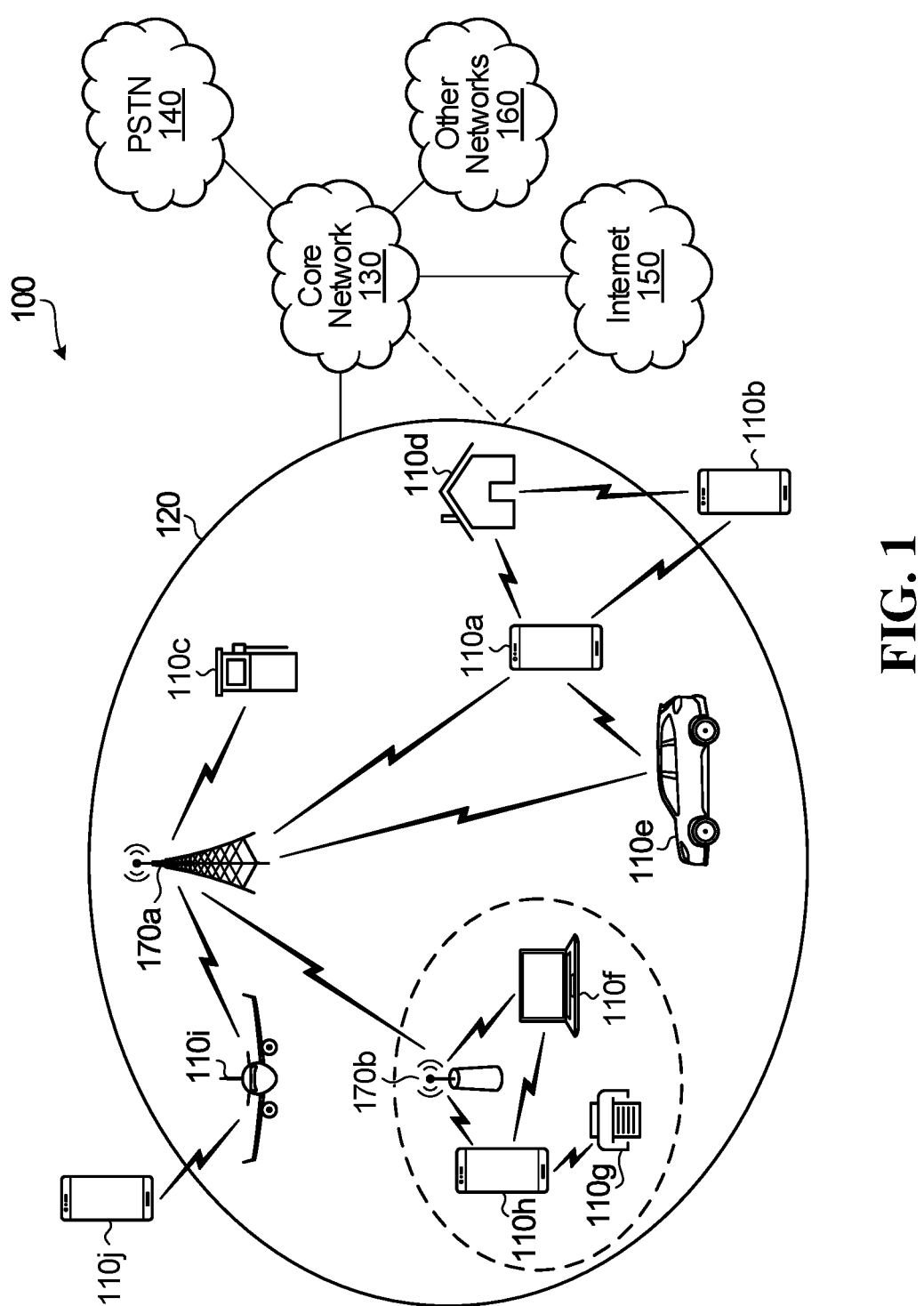
FIG. 1 is a block diagram of a communication system.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another or connected to one or more network nodes (170a, 170b, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

Figure 2:
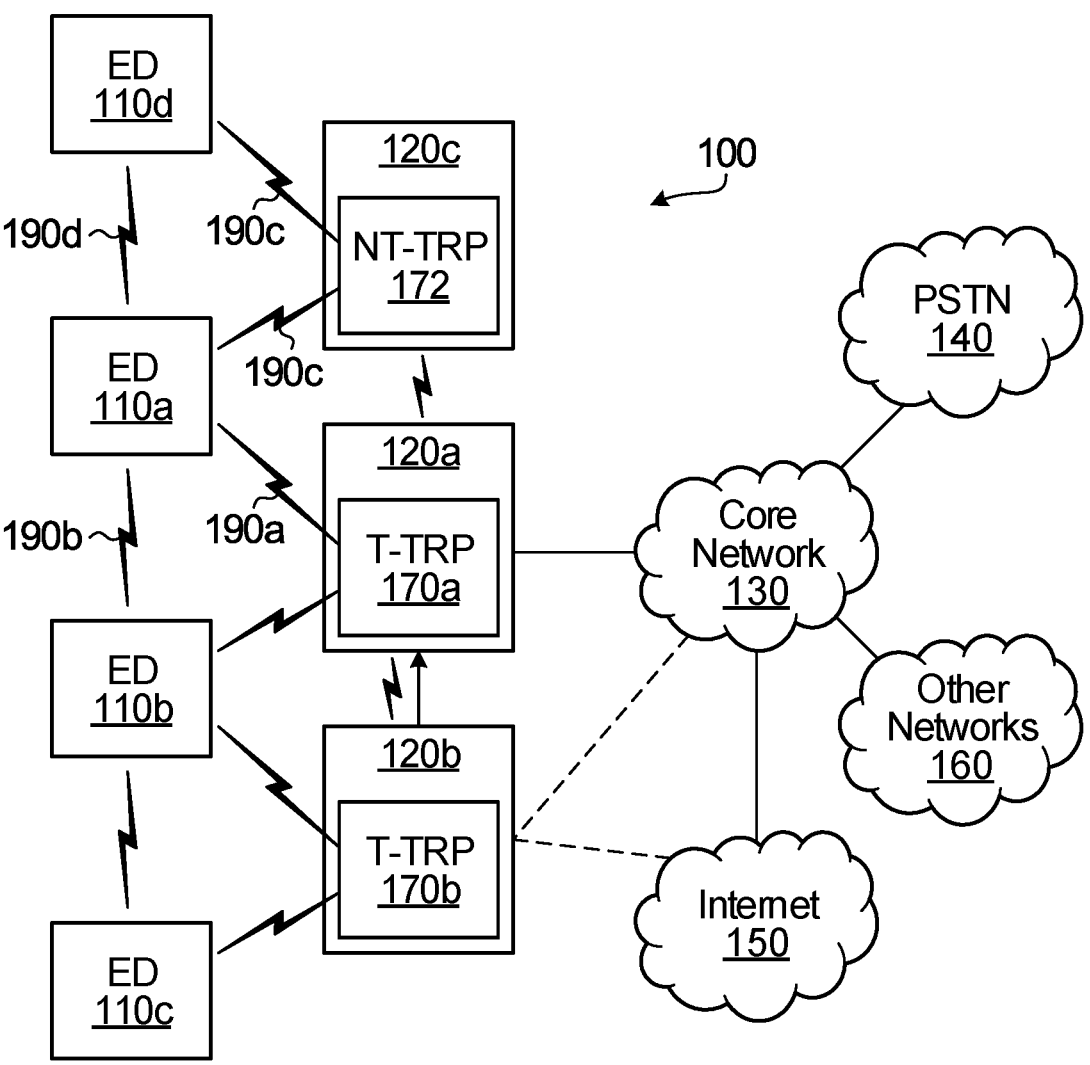
FIG. 2 is a block diagram of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies, and incorporate multiple transceivers necessary to support such.

Figure 3:
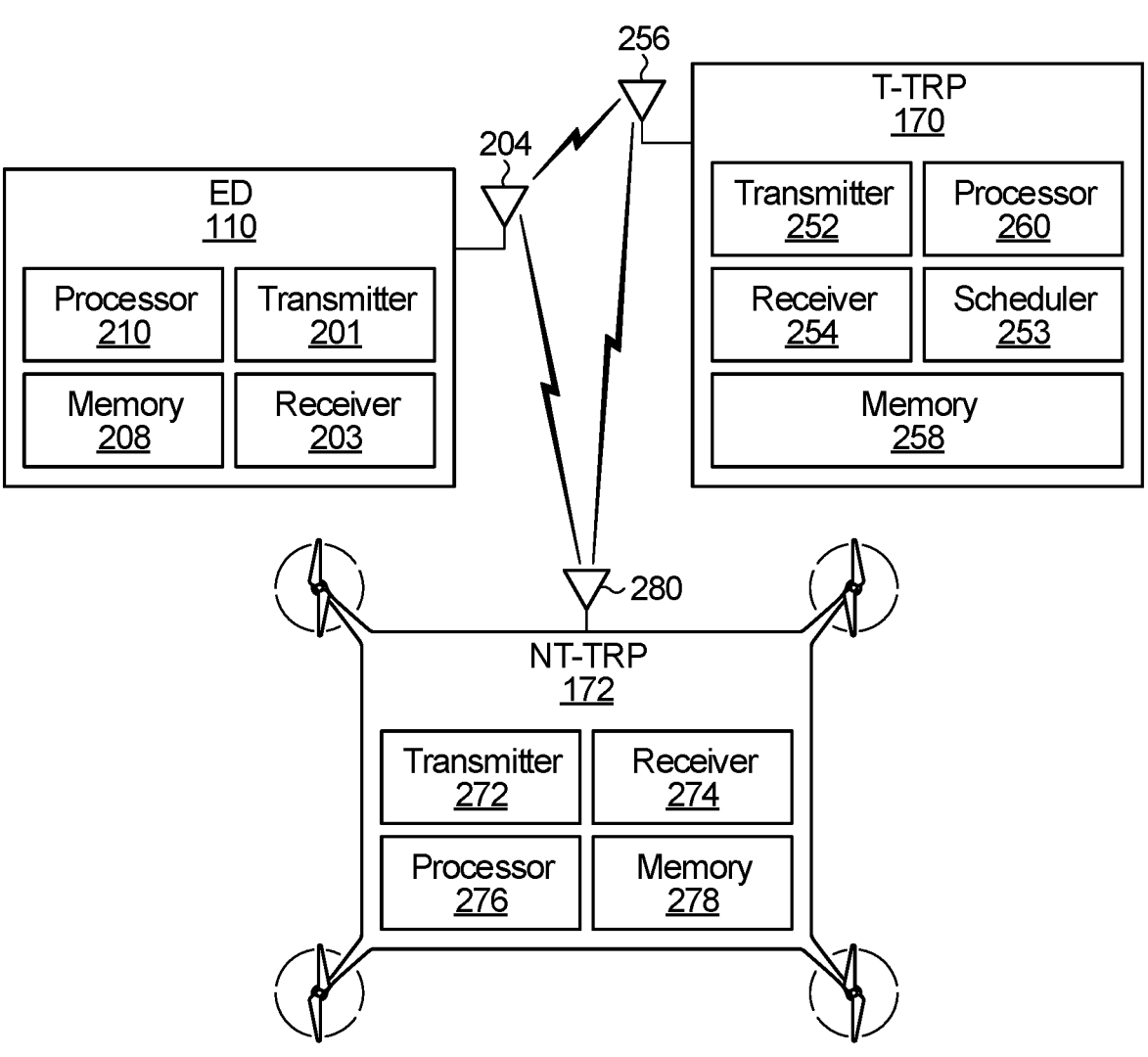
FIG. 3 is a block diagram of a communication system showing a basic component structure of an electronic device (ED) and a base station.

FIG. 3 illustrates another example of an ED 110 and a base station 170a, 170b and/or 170c. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170a and 170b is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

Figure 4:
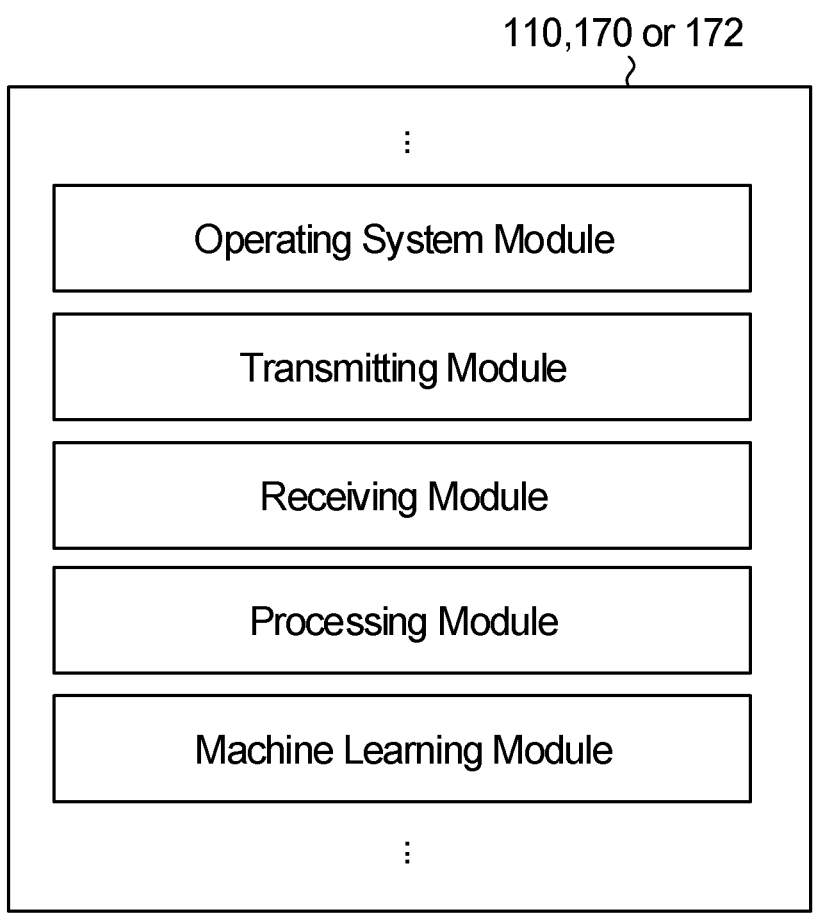
FIG. 4 is a block diagram of modules that may be used to implement or perform one or more of the steps of embodiments of the application.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Cell/Carrier/Bandwidth Parts (BWPs)/Occupied Bandwidth

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more bandwidth parts (BWPs). For example, a carrier may have one or more BWPs. A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers. More generally, wireless communication with the device may occur over a spectrum. The spectrum may comprise one or more carriers and/or one or more BWPs.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, including sidelink transmitting and receiving resources.

In some embodiments, a carrier may have one or more BWPs, e.g. a carrier may have a bandwidth of 20 MHz and consist of one BWP, or a carrier may have a bandwidth of 80 MHz and consist of two adjacent contiguous BWPs, etc. In other embodiments, a BWP may have one or more carriers, e.g. a BWP may have a bandwidth of 40 MHz and consists of two adjacent contiguous carriers, where each carrier has a bandwidth of 20 MHz. In some embodiments, a BWP may comprise non-contiguous spectrum resources which consists of non-contiguous multiple carriers, where the first carrier of the non-contiguous multiple carriers may be in a mmW band, the second carrier may be in a lower frequency band (such as a 2 GHz band), the third carrier (if it exists) may be in a THz band, and the fourth carrier (if it exists) may be in a visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage $\beta2$ of the total mean transmitted power. For example, a value of $\beta2$ could be 0.5%.

The carrier, the BWP, or the occupied bandwidth may be signaled by a network device (e.g. a base station) dynamically (e.g. in physical layer control signaling such as DCI), semi-statically (e.g. in radio resource control (RRC) signaling or in medium access control (MAC) layer signaling). Alternatively, the carrier, the BWP, or the occupied bandwidth may be predefined based on the application scenario, determined by the UE as a function of other parameters that are known by the UE, or it may be fixed (e.g. by a standard).

In future wireless networks, the number of connected devices could increase exponentially and these devices could also have diverse functionalities. Furthermore, many more new applications and use cases may emerge, each demanding more diverse quality of service. These will result in new key performance indications (KPIs) for the future wireless network (e.g. a "6G" network) that can be extremely challenging. New sensing technologies and AI/ML technologies (deep learning) will be key for improving telecommunication system performance and efficiency.

Integrated Sensing and Communication Network

Figure 5:
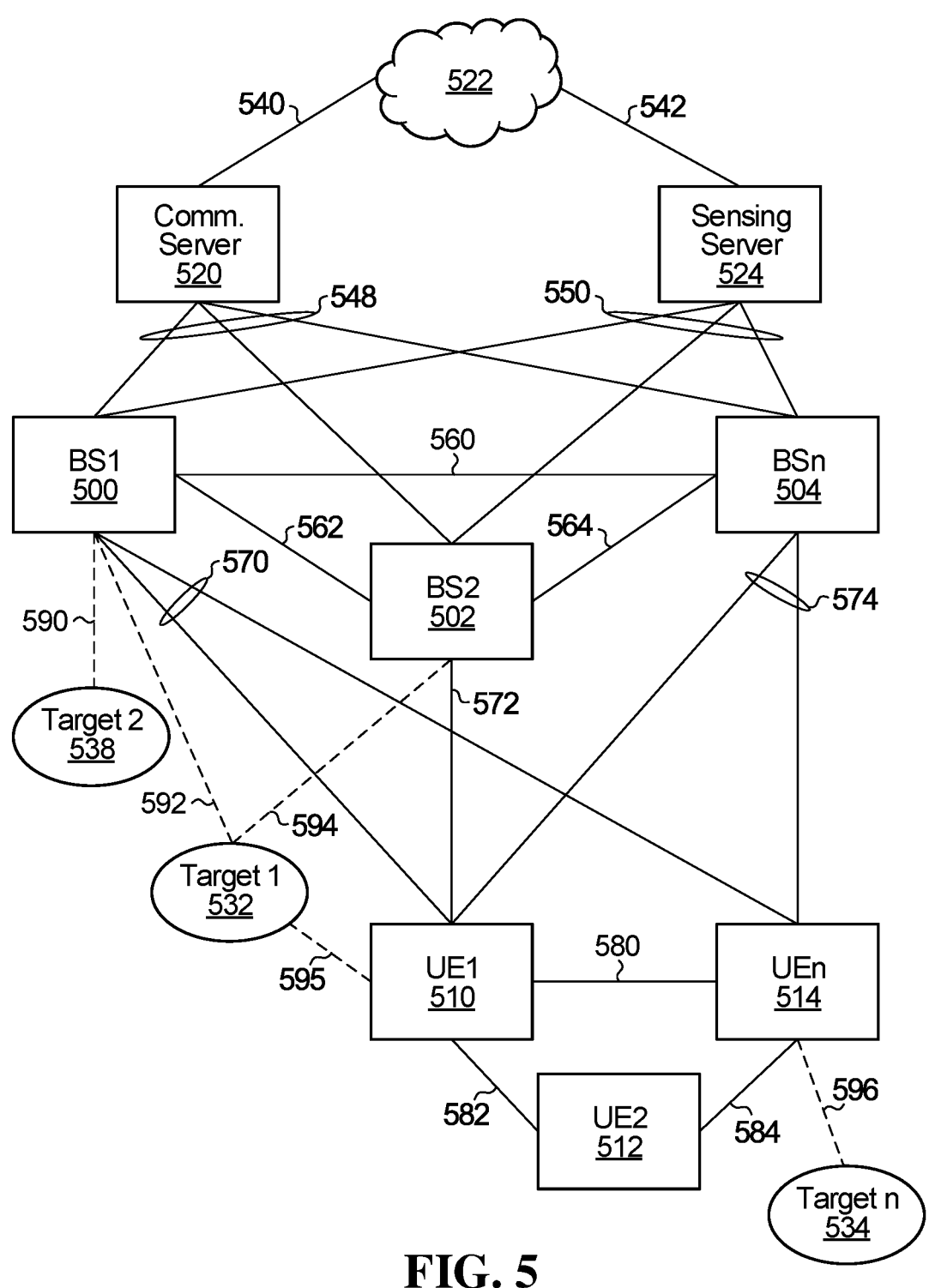
FIG. 5 is a block diagram of an integrated sensing and communication network.

An integrated sensing and communication network (ISAC) provided by an embodiment of the application is shown in FIG. 5. The network includes a number of base stations (BS) 500,502,504 (also labelled BS1, BS2, BSn), a number of user equipment (UE) 510,512,514 (also labelled UE1, UE2, UEn) and a number of targets 530,532,534 (also labelled Target 2, Target 1, Target n). Also shown is a communication server 520 which represents a core network, another network 522 which refers to a network other than the communication core network such as the internet, and a sensing server 524. Also shown are connections between the various depicted elements, including a connection 540 between communication server 520 and other network 522, a connection 524 between sensing server 524 and other network 522, connections 548 between communication server 520 and base stations 500,502,504, connections 550 between sensing server 524 and base stations 500,502,504, connections 560,562,564 between pairs of base stations 500,502,504, connections 570,572,574 between base stations 500,502,504 and UE 510,514, sidelink connections 580,582,584 between UE 510,512,514. Finally, sensing signals are depicted at 590,592,594,596. FIG. 5 is presented for the purpose of example. The number of elements of the various types, and the interconnectivity therebetween, can be different in a given implementation.

The BS 500,502,504 are examples of network devices. UE 510,512,514 are examples of devices that are registered on the network, or devices that the network is aware of or is communicating with. While FIG. 5 shows network devices in the form of BS 500,502,504, the network can alternatively or additionally include other types of network devices, such as an integrated access and backhaul (IAB) node, a relay node, or a non-terrestrial network (NTN) node (e.g., drones, high altitude platform stations (HAPS), satellites, etc.), or a combination of these nodes. The BS 500,502,504 and UE 510,512,514 can both be communication and sensing devices.

Unlike the BS and UE, which are network devices forming part of the network, or components registered on the network, each target 530,532,534 is not necessarily a registered component of the network. Generally, a target can be any object in the environment that is not part of the network. Examples include buildings, vehicles, etc. In addition, a target may also be a device that is registered on the network, such as a UE, vehicles (for V2V and V2X communications), sensors and so on. For environment sensing, the targets may not typically be communication devices, but for sensing-assisted communication applications, targets could likely be communication devices.

The sensing server 524 refers to a logical network entity that provides a sensing service. In the illustrated example, the sensing server 524 does not directly transmit and receive RF signals; however, in an alternative implementation, the sensing server can include or be integrated with a transceiver for connecting to sensing devices wirelessly. The functionality of the sensing server 524 can be distributed among network devices, such as BSs, and/or UEs. In an example embodiment, the sensing server 524 is a sensing management function and sensing agent function (SMAF) node, which is described in greater detail below. For cooperative sensing, the sensing server is responsible for coordinating joint sensing or collaborative sensing. This includes sending sensing instructions to sensing nodes involved in the joint sensing or cooperative sensing, and sending information required for performing sensing (such as time/frequency resources of the sensing signal, location of an object to be sensed, possible beam direction of the reflected sensing echo, timing adjustment, and so on).

In addition, in some embodiments, the sensing server 524 generates final sensing results from multiple observations (e.g., sensing data, echo signals, etc.) obtained from the cooperative sensing nodes.

The communication server 520 refers to a logical network entity that provides a communication service, for example, in a core network of a cellular system. The communication server 520 may contain many logical entities, possibly including the sensing server 524.

Sensing can be performed by an individual device, such as a single BS or a single UE. Sensing can also be performed jointly via multiple devices (also called cooperative sensing), such as by a pair of BSs (e.g. BS1 and BS2), a BS and a UE (such as BS1 and UE1), etc.

Sensing can involve receiving an echo of a transmitted sensing signal. The echo can be processed to produce sensing data. Sensing data can be any information that is derived from the echo. Examples include signal strength, delay, timing, angle of arrival, and other data that can be measured directly from the echo signal, or other values that are functions of such measured values. Sensing data may also include description and/or tags (e.g., header information) that identify the purpose and/or source of the sensing data, or identify the target that the sensing data is associated with.

In some embodiments, the same interface between BS and UE is used to carry the communication data and the sensing data. In some embodiments, separate logical and/or physical interfaces are defined for communication and sensing. These separate interfaces may include, for example, separate data planes and/or separate control planes. Detailed examples are provided below.

The communication and sensing data path can be same or different. For example, UEn 514 may obtain sensing data of Target n 534, and the sensing data can be sent via BSn 504 to the sensing server 524, and communication data of UEn 514 may be sent via BS1 500 to the communication server 520.

The communication and sensing signal processing chains can also be the same or different. For example, different coding, modulation, and waveform parameters may be used for communication and sensing.

In some embodiments, sensing can be turned on/off on demand. Detailed examples of this are provided below.

While not shown in the detailed examples below, for any of the embodiments described herein, synchronization information may be transmitted or exchanged to assist with collaborative sensing. Synchronization information includes information on the reference timing of the nodes relative to a global reference point, or relative to a timing reference obtained from timing calibration between different sensing nodes. It may also include information on the oscillator clock parameters and some other RF-related parameters affecting the timing synchronization between the nodes. Such an exchange can take place between any nodes involved in the collaborative sensing, such as one or more UE and/or one or more network devices.

In some embodiments, nodes may be synchronized to a common source, but still need to exchange the absolute sensing signal transmitting time information.

In some embodiments, artificial intelligence (AI) and/or machine learning (ML) is used to process sensing data from one or multiple nodes to produce a sensing result. For example, the sensing server 524 of FIG. 5 described above may use AI/ML to process sensing data received from one or more BS and/or one or more UE to produce a sensing result in respect of a target. Such processing may also or alternatively take place in a network device such as a base station, or in a UE.

AI/ML architectures usually involve multiple nodes, which can be organized in two modes, i.e., centralized and distributed, both of which can be deployed in an access network, a core network, or an edge computing system or third network. AI/ML architectures are data-hungry and are therefore well-suited to processing large amounts of cooperative sensing data from multiple sensing nodes.

FIGS. 6A-6D are examples of passive cooperative sensing involving multiple base stations and a target. These examples are passive in the sense that in all cases, the target passively reflects a sensing signal without decoding and processing the sensing signal.

Figure 6A:
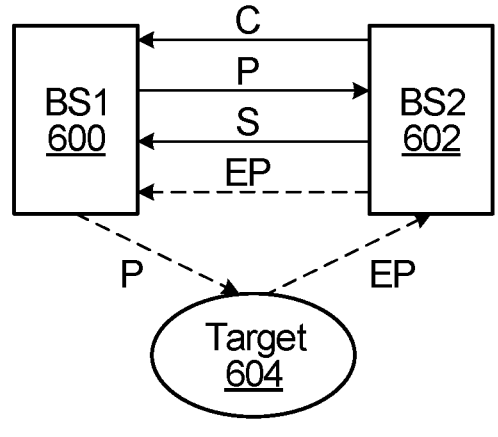
FIGS. 6A-6D are examples of passive cooperative sensing involving multiple base stations and a target.

FIG. 6A shows a first example of passive cooperative sensing involving base stations BS1 600, BS2 602, and a target 604. BS1 sends a RF sensing signal P to both the target and BS2. Also shown is the transmission of coordinate information C from BS2 to BS1. More generally, for any of the embodiments/examples described herein, there may be an exchange of coordinate information. This may be unidirectional as shown in the specific example of FIG. 6A, from one of the BS to the other BS, or bidirectional. Coordinate information is information about the location of one or more of the network devices and/or UEs performing the sensing operation in the (x,y,z) coordinate system with regard to a global coordinate system. It may also include orientation of the node (in terms of which directions the antennas point to), heading of the node (direction of the movement if the node is a moving object) and the velocity vector of the movement $(v\_x, v\_y, v\_z)$.

The link between BSs can be wired or wireless. BS2 receives the echo EP from the target and compares it with sensing signal P from BS1 and derives sensing data S. BS2 sends sensing data S (and optionally the echo EP or function of the echo f(EP)) to BS1.

Figure 6B:
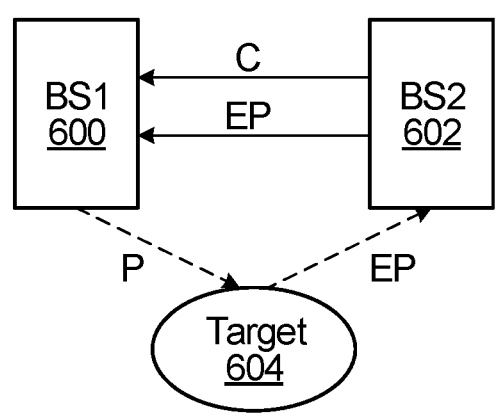

FIG. 6B shows a second example of passive cooperative sensing involving base stations BS1 600, BS2 602, and a target 604. BS1 sends a RF sensing signal P to the target. BS2 receives the echo EP from the target. BS2 sends the received echo EP back to BS1. Also shown is the transmission of coordinate information C from BS2 to BS1. The communication link between BSs can be wired or wireless. BS1 derives sensing data S (not shown) from received EP.

Figure 6C:
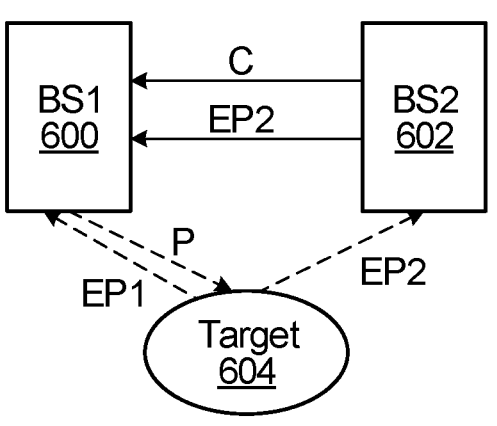

FIG. 6C shows a third example of passive cooperative sensing involving base stations BS1 600, BS2 602, and a target 604. BS1 sends a RF sensing signal P to the target. BS1 receives an echo EP1 from the target. BS2 receives a different echo EP2 from the target and sends the received echo EP2 back to BS1. Also shown is the transmission of coordinate information C from BS2 to BS1. The link between BSs can be wired or wireless. BS1 derives sensing data S (not shown) from both EP1 and EP2.

Figure 6D:
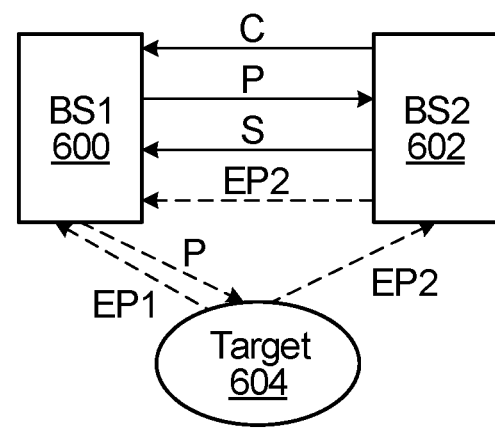

FIG. 6D shows a fourth example of passive cooperative sensing involving base stations BS1 600, BS2 602, and a target 604. BS1 sends a RF sensing signal P to both target and BS2. The link between BSs can be wired or wireless. BS1 receives an echo EP1 from the target. BS2 receives a different echo EP2 from the target and derives sensing data S based on the sensing signal P and the received echo EP2. BS2 sends the derived sensing data S (and optionally the received echo EP2) back to BS1. Also shown is the transmission of coordinate information C from BS2 to BS1. BS1 derives sensing data S' (not shown) from both the received echo EP1 and the sensing data S (and optionally the received echo EP2) from BS2.

Figure 7A:
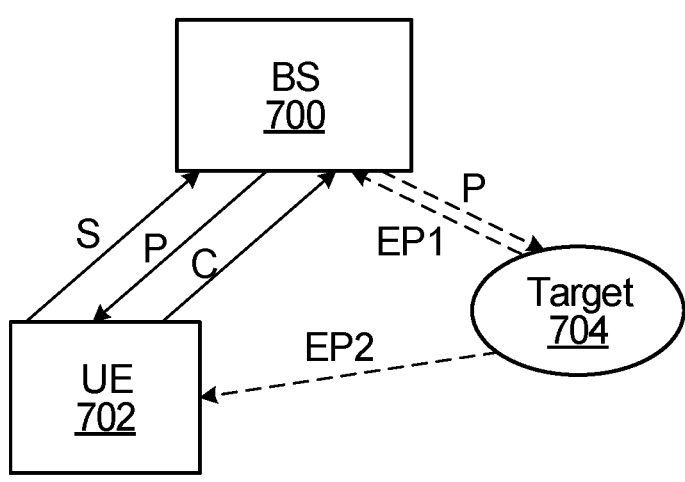
FIGS. 7A, 7B and 8 examples of passive cooperative sensing involving mixed types of devices.

Some embodiments involve cooperation between mixed devices, such as one or more BSs and one or more UEs. FIG. 7A is an example of passive cooperative sensing involving a BS 700, a UE 702, and a target 704. BS 700 sends an RF sensing signal P to both a target 704 and a UE 702. The BS 700 receives an echo EP1 from the target 704. The UE 702 receives the sensing signal P from the BS 700 and a different echo EP2 from the target 704, and derives the sensing data S or intermediate measurements, Is, useful for deriving the sensing data S. The UE 702 sends sensing data S (or intermediate measurements Is) to the BS 700. Also shown is the transmission of coordinate information C from the UE 702 to the BS 700. The BS 700 derives sensing data from both the echo EP1 and the sensing data S (or intermediate measurements Is) from UE 702. In this example, since the UE can process the sensing signal P and feedback the sensing data S (or intermediate measurements Is), the overall procedure can be seen as joint active and passive sensing.

Figure 7B:
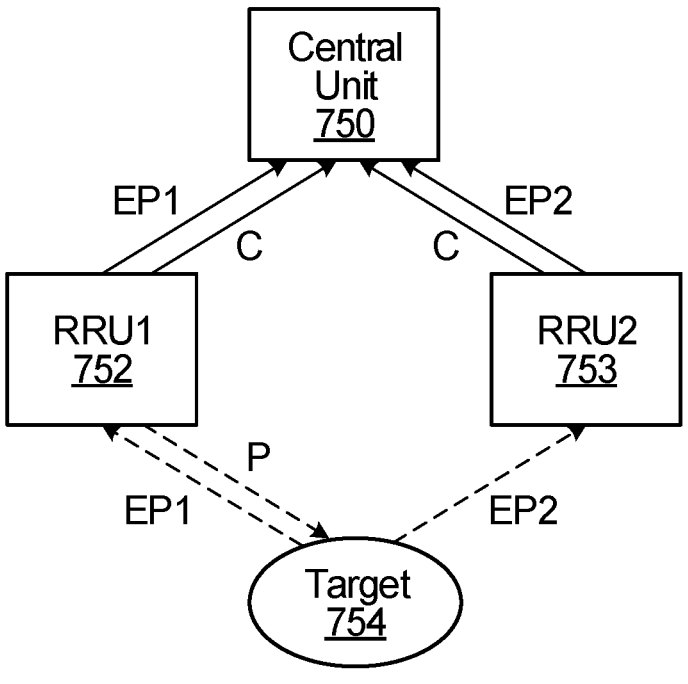

Some embodiments involve cooperation in a centralized radio access network (CRAN) architecture. A specific example is shown in FIG. 7B shows a CRAN architecture including a central unit 750, remote radio units (RRU) RRU1 752 and RRU2 754. Also shown is a target 754. In this example, RRU1 sends a RF sensing signal P to the target. RRU1 receives an echo EP1 from the target 754 and sends the echo EP1 (or f(EP1)) to the central unit. RRU2 receives a different echo EP2 from the target 754 and sends the echo EP2 (or f(EP2)) to the central unit 750. Also shown is the transmission of coordinate information C from RRU1 to the central unit, and from RRU2 to the central unit. The central unit derives sensing data S from both the echoes EP1 and EP2.

In another embodiment, there are more than two cooperative nodes where one node transmits a sensing signal and the other nodes detect it. The exchanged information may be the same as in the above examples.

In another embodiment, there are more then two cooperative nodes where more than one node sends sensing signals and one or more nodes detect the sensing signals. The exchanged information may be the same as above.

In another embodiment, there are more than two cooperative nodes, and each node sends and detects a sensing signal separately but they exchange the sensing information S or f(S) with each other.

The cooperative nodes can be BS, UE or a combination.

Figure 8:
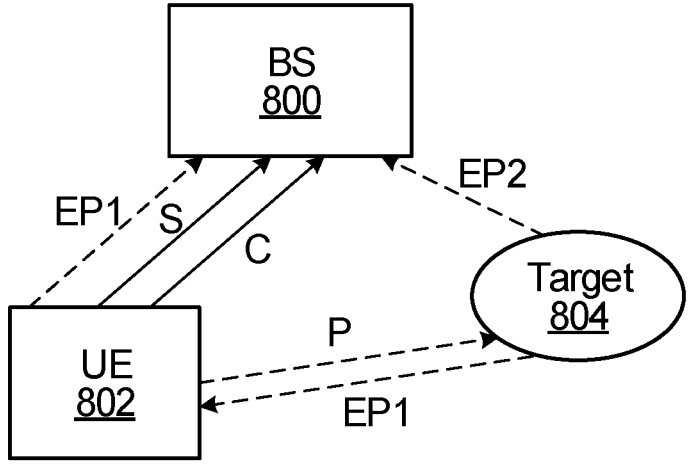

Another example of cooperation between mixed devices, is shown in FIG. 8, which involves BS 800, a UE 802, and a target 804. In this example, the UE 802 sends an RF sensing signal P to the target 804. The UE 802 receives an echo EP1 from the target 804 and derives the sensing data S. The BS 800 receives a different echo EP2 from the target 804. The UE 802 sends the derived sensing data S (and/or the echo EP1) and/or coordinate information C back to the BS 800. The BS 800 derives sensing data (not shown) from both the received echo EP2 and the sensing data S and/or coordinate information C from UE 802. Coordinate information is the information about the location of one or more of the network devices and/or UEs performing the sensing operation in the (x,y,z) coordinate system with regard to a global coordinate system. It may also include orientation of the node (in terms of which directions the antennas point to), heading of the node (direction of the movement if the node is a moving object) and the velocity vector of the movement (v_x, v_y, v_z).

Some of the examples involve the exchange of the sensing signal P between two or more BS or between a BS and a UE. Alternatively, instead of exchanging the sensing signal P directly, some other predefined information Ip, from which BS can indirectly know the sensing signal P, can be exchanged.

While some examples show a single echo, more generally, there may be one or more echoes (e.g., EP1 and EP2) received by multiple devices, all of which can be considered in deriving the sensing data S. In addition, there may be more than one echo reflected from a single target.

Some of the examples involve the exchange of one or more echo signals EP between two or more BSs or between a BS and a UE. Alternatively, instead of exchanging the echo EP directly, a value f(EP) that is some function of the echo EP may be exchanged. For example, f(EP) may be a compressed version of EP.

Some of the examples involve the exchange of sensing data S between two or more BSs or between a BS and a UE. Alternatively, instead of exchanging the sensing data S directly, a value f(S) that is some function of the sensing data S may be exchanged. For example, f(S) may be a compressed version of S. The sensing data S may also, or alternatively, include intermediate measurements which can be used to derive the sensing data S.

The mechanisms and examples described above can also be extended to more than 2 BSs, more generally to more than 2 network devices and/or to more than one UE. Other examples include UE-to-UE collaborations, multiple UE-to-BS collaborations, and multiple UE-to-multiple BS collaborations.

Active Cooperative Sensing

Figure 9A:
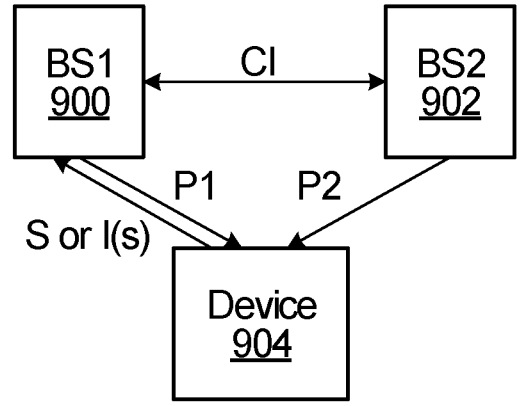
FIGS. 9A-9C are examples of active cooperative sensing involving multiple base stations and a target.
Figure 9B:
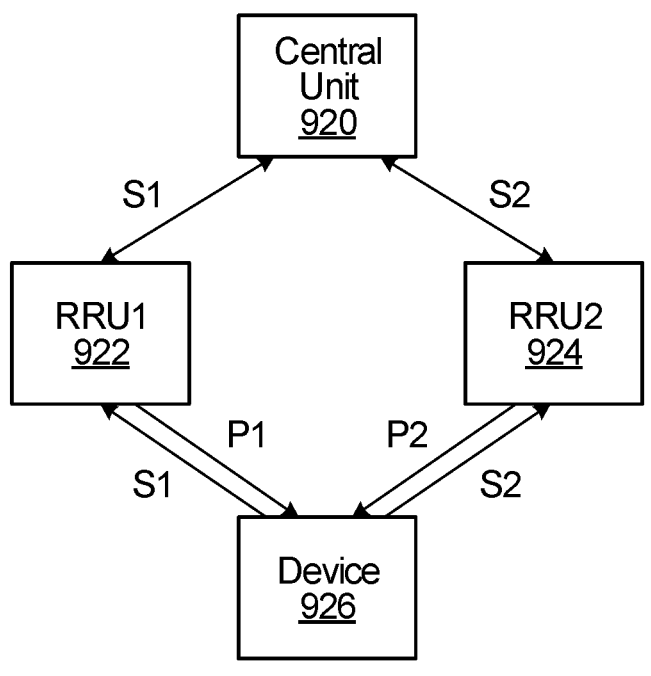
Figure 9C:
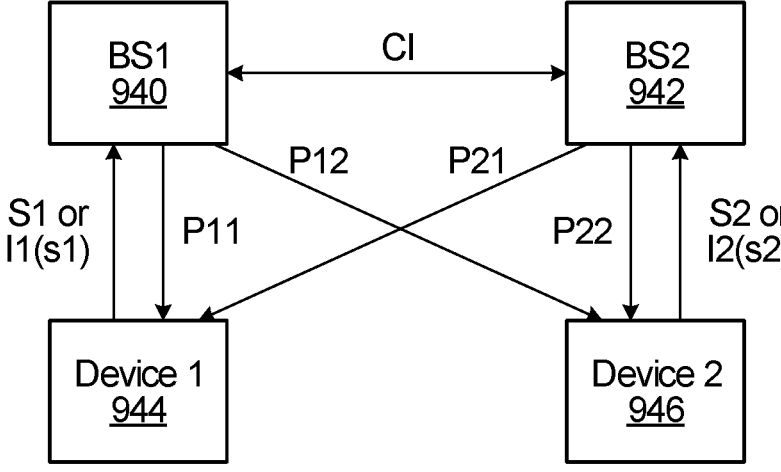

FIGS. 9A-9C are examples of active cooperative sensing involving multiple network devices and one or more devices to be sensed. These examples are active in the sense that in all cases, the devices to be sensed actively receive a sensing signal and derive some sensing data from the sensing signal. This derived sensing data, rather than the passively reflected echo signal, is relied upon for determining the position of the device.

FIG. 9A is an example of active cooperative sensing involving BS1 900, BS2 902, and a device 904. In this example, BS1 and BS2 exchange cooperation information CI. This may include information related to sensing signals P1 and P2, and scheduling information. Cooperation information may also contain information about the location, velocity, direction of movement, orientation of BSs. BS1 sends an RF sensing signal P1 to the device. BS2 sends an RF sensing signal P2 to the device. The device derives sensing data S based on P1 and P2. Alternatively, the device may derive intermediate information I(s). The device sends S or I(s) to the BS1 which detects the S or I(s).

This type of active cooperative sensing can be extended to the CRAN architecture. An example shown in FIG. 9B illustrates active cooperative sensing within a CRAN architecture including a central unit 920, remote radio units (RRU) RRU1 922 and RRU2 924. Also shown is a device 926 being sensed, and participating in the active sensing. In this example, RRU1 922 and RRU2 924 send respective sensing signals P1 and P2. The device 926 receives and generates sensing data S1 and S2 for transmission to RRU1 and RRU2, respectively, which in turn forward the respective sensing data S1 and S2 to the central unit 920 for further processing.

These active cooperative sensing approaches can also be extended to multiple devices to be sensed. An example is shown in FIG. 9C, which shows active cooperative sensing between BS1 940, BS2 942, and device1 944, and device2 946.

Similar mechanisms can be extended to more than 2 BSs. Other variations not shown here are also possible, such as cooperation between devices. In some embodiments, the devices may use sensing information directly to assist the communications, and in this case, there may be no need to send sensing data S back to the BS.

While all of the embodiments described above employ passive sensing or active sensing, in some embodiments, a mix of active sensing and passive sensing can be used to obtain sensing information about multiple targets. A mix of active sensing and passive sensing may be used in a case where there are multiple targets, some registered to the network (e.g., "RRC_CONNECTED" devices) and some not (e.g., "RRC_IDLE" devices, "RRC_INACTIVE" devices, or environmental objects) and the goal of the sensing is to obtain information about all these targets.

A mix of active sensing and passive sensing can also be used for sensing a target that is registered on the network. In an example of this approach, a network device such as a BS sends a sensing signal to a device (such as a car) and receives an echo from the device. The BS can use passive sensing to estimate the distance to the car based on the echo. At the same time, a processor in the car may use active sensing to detect the RF signal and derive some information. The information derived from active sensing can be sent to the BS to help the BS refine the passive sensing estimate.

Detailed Signaling Mechanism for Timing Exchange

With co-located sensing, the transmission and reception of sensing signal are happening in the same location. The transmitting device and receiving device can share timing, and there are no synchronization or timing issues.

With non-collocated sensing, the transmitter and receiver are not collocated. They can be in different devices that use different timing sources. Timing requirements for sensing can be stringent. To address this, methods of coordinating the timing between the nodes involved in sensing are provided.

Figure 10A:
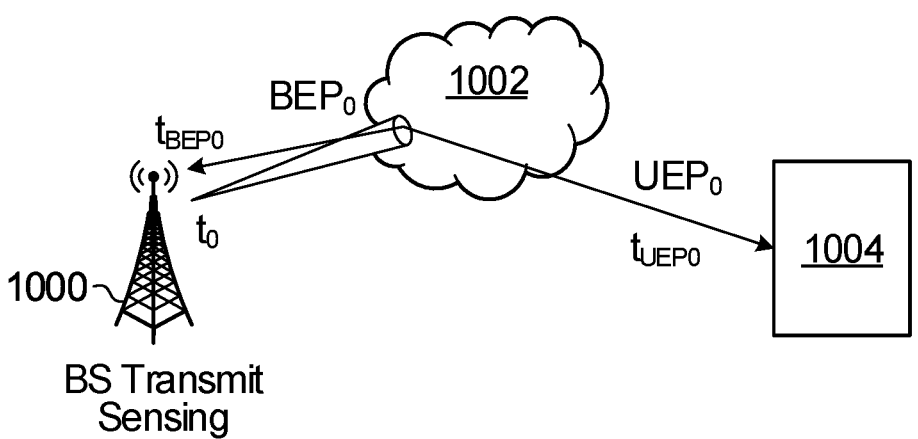
FIGS. 10A and 10B show a first example of a signaling mechanism for timing exchange.
Figure 10B:
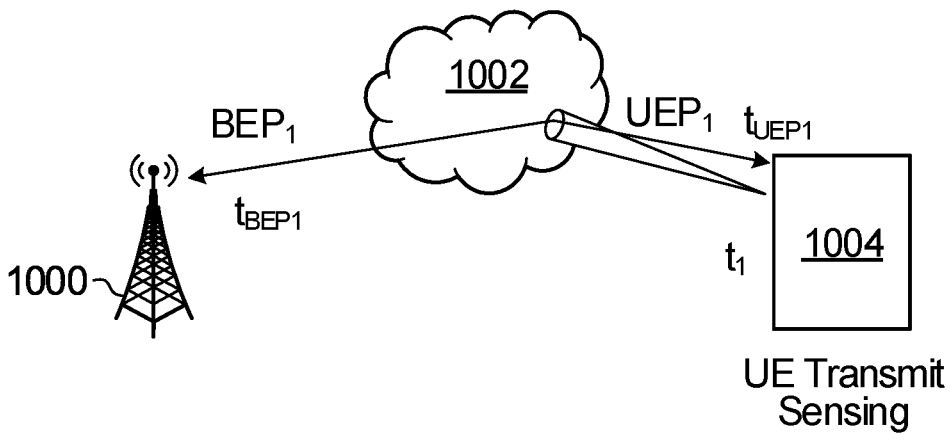

Referring now to FIGS. 10A and 10B, a first example of a signaling mechanism for timing exchange will be described, which involves joint timing and sensing data exchange. This example shows the exchange of timing information between a BS 1000 and a UE 1004, but the same approach can be used between any two devices, such as two BSs, two UEs, etc.

Referring first to FIG. 10A, the BS transmits a first sensing signal at time $t_0$, receives echo signal BEP0 from target 1002 at time $t_{BEP0}$ and the UE receives echo signal UEP0 at $t_{UEP0}$. The UE also estimates the angle of arrival (AoA) for UEP0, a reflection of the first sensing signal off of the target 1002, denoted by $\theta_0$ (not shown).

As shown in FIG. 10B, the UE transmits a second sensing signal at time $t_1$ over $\theta_0$, receives echo signal UEP1 form target 1002 at time $t_{UEP1}$ and the BS receives echo signal BEP1 from target 1002 at $t_{BEP1}$.

The UE sends $t_{UEP0}$, $t_1$, $t_{UEP1}$, $\theta_0$, f(UEP0) and f(UEP1) to the BS, where f(UEP0) and f(UEP1) are the measured sensing data obtained by the UE. The remaining information $t_{UEP0}$, $t_1$, $t_{UEP1}$ convey the notion of time at the UE. In some embodiments, $\theta_0$ may be included in f(UEP0).

From the information received from the UE, and also by calculating $t_{BEP0}-t_0$, the BS can obtain the UE timing information and sensing data.

Figure 11A:
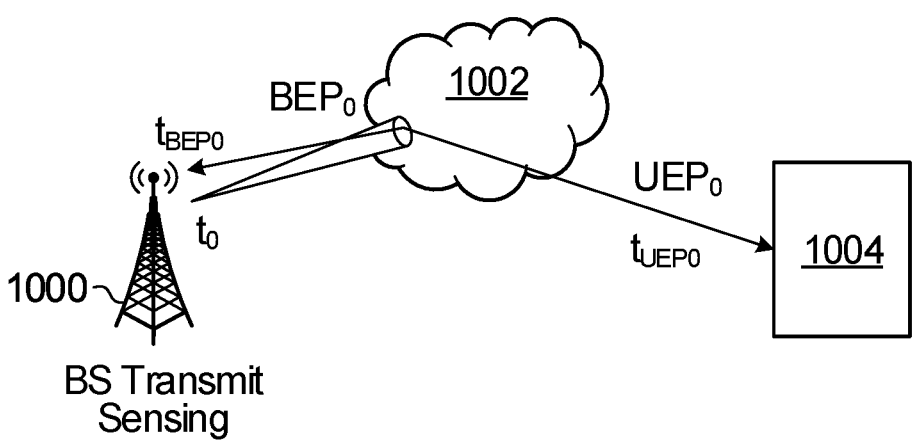
FIGS. 11A and 11B show a second example of a signaling mechanism for timing exchange.
Figure 11B:
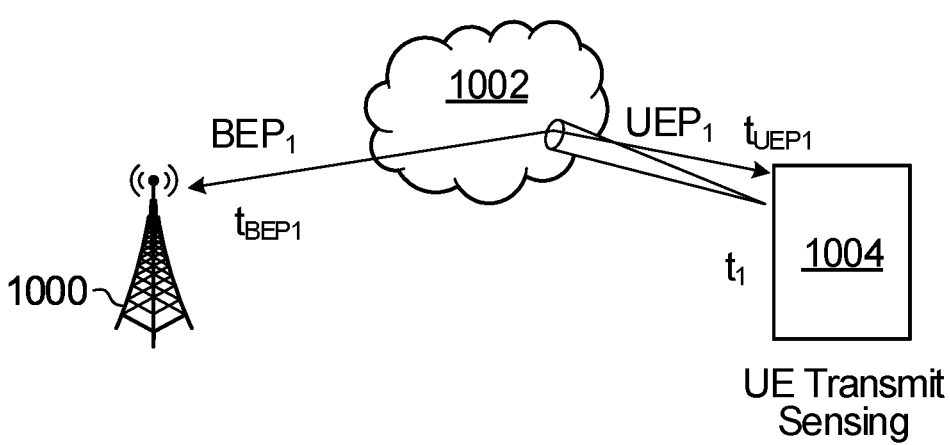

Referring now to FIGS. 11A and 11B, a second example of a signaling mechanism for timing exchange will be described, which involves partial timing and full sensing data exchange.

As shown in FIG. 11A, The BS transmits a first sensing signal at time $t_0$, receives echo signal BEP0 at time $t_{BEP0}$ and the UE receives echo signal UEP0 at $t_{UEP0}$. The UE also estimates the AoA for UEP0, denoted by $\theta_0$ (not shown).

As shown in FIG. 11B, the UE transmits a second sensing signal at time $t_1$ over $\theta_0$, receives echo signal UEP1 at time $t_{UEP1}$ and the BS receives echo signal BEP1 at $t_{BEP1}$.

The UE sends $t_1-t_{UEP0}$, $t_{UEP1}-t_1$, $\theta_0$, f(UEP0) and f(UEP1) to the BS. f(UEP0) and f(UEP1) are the measured sensing data obtained by the UE. $t_1-t_{UEP0}$, $t_{UEP1}-t_1$ give only the time difference. In some embodiments, $\theta_0$ may be included in f(UEP0).

From the information received from the UE, and also by calculating $t_{BEP0}-t_0$ and $t_{BEP1}-t_0$, the BS can obtain the necessary timing information to obtain sensing data but not the absolute UE timing.

In some embodiments, the nodes can exchange their reference timing information with respect to a global reference point before the sensing session. For example, the UE may send a reference time info (RTI) to the BS before the sensing operations described in FIGS. 10 and 11. In this case, the UE may only send $t_{UEP0}$, $t_{UEP1}-t_1$, $\theta_0$, f(UEP0) and f(UEP1) to the BS. In some other embodiments, UE may only send $t_{UEP0}$, $\theta_0$, f(UEP0) to the BS. In some embodiments, $\theta_0$ may be included in f(UEP0).

Cooperation Information Exchanges

As detailed above, in some embodiments timing information is exchanged to facilitate the cooperative sensing methods. In addition to timing information, other cooperation information may be exchanged. Examples of cooperation information include carrier frequency, and waveform parameters for the sensing signal (e.g. details of the signal P which may have the form of a pilot signal).

Figure 12:
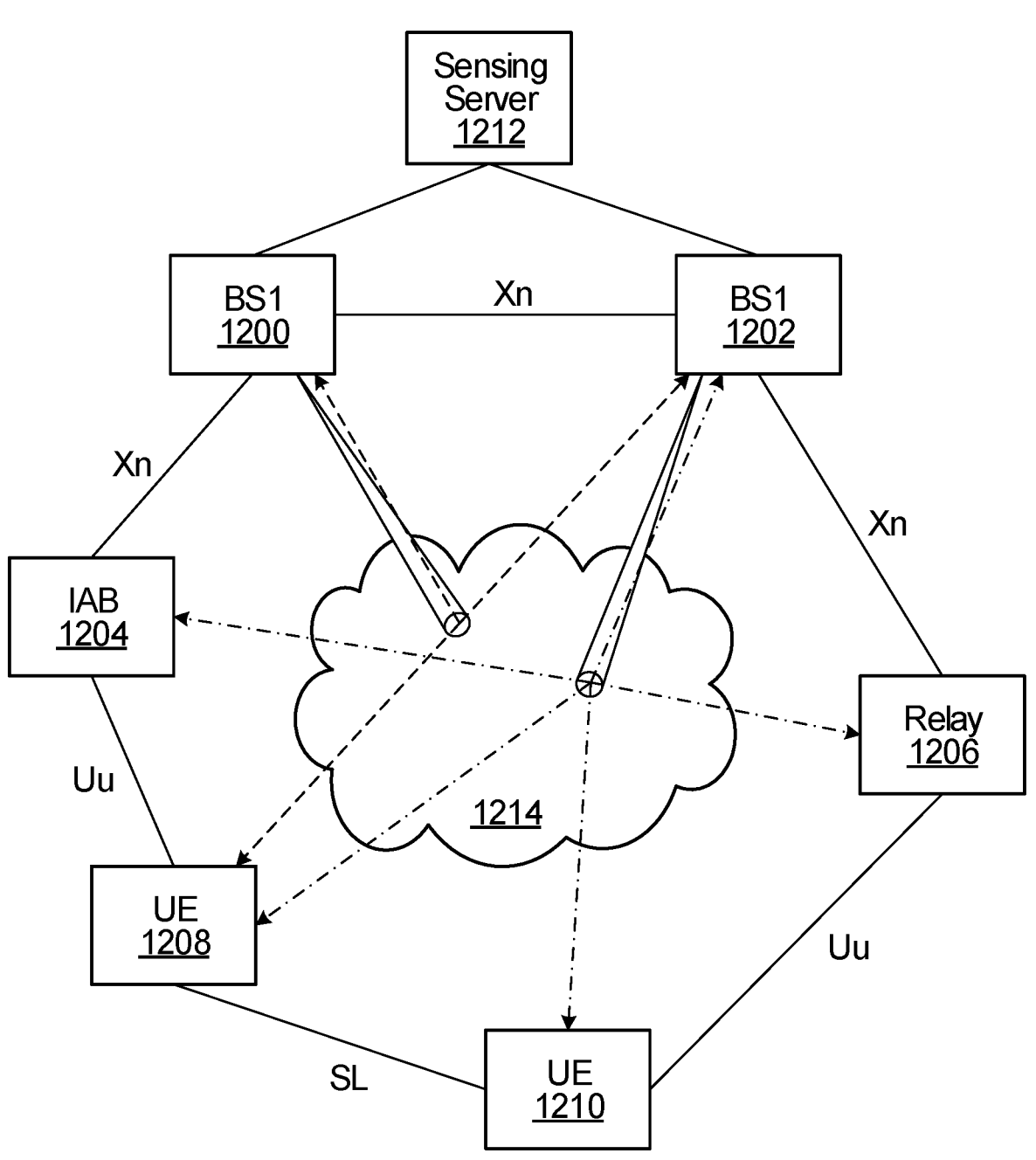
FIG. 12 shows an example of specific links that may be used to share cooperation information.

The cooperation information can be exchanged over various links. FIG. 12 shows an example of specific links that may be used to share cooperation information. FIG. 12 shows sensing server 1212, BSs 1200,120, IAB node 1204, relay node 1206, and UEs 1208,1210.

For cooperation information exchange, a Uu link may be used to exchange between BS and UE, or between BS and IAB or relay node. A sidelink (SL) can be used to exchange cooperation information between between UEs. Backhaul links can be used to exchange cooperation information between network nodes such as IAB and BS. For example, Xn links may be used to exchange information between BSs. Links of these types may be used for cooperation information exchange in any network topology, not limited to the network of FIG. 12. The links used to exchange the cooperation information may be the same or different from the links used to exchange the actual sensing data (e.g. EP, f(EP), S, I(S)). The cooperation information may be somewhat semi-static, meaning that it does not change dynamically while the actual sensing information is dynamic (like communication data); therefore, the cooperation information and the sensing information might be communicated through different physical and logical interfaces between the nodes.

Multiple cooperating nodes can perform sensing individually and transmit the sensing data to the sensing server 1212 for further processing.

In some embodiments, even for the same target, multiple devices may sense different parts of the target, then send respective the sensing data to a node to combine them together to derive the final sensing data.

Also, in some embodiments, one or more sensing devices may sense a target over time and space to get multiple instances of sensing data, then combine them together. For example, to obtain a complete picture of a building, multiple sensing devices may be used to scan this building.

Integration of Sensing and Communication—Mode 1

In a first mode of integrated sensing and communication, referred to herein as "Mode 1", communication and sensing each have separate radio access technologies (RATs). Each RAT is designed or selected for one of communication or sensing, and there are separate physical layer processing chains. Each RAT can also have different protocol stacks to suit the different needs of service requirements, for example, with or without HARQ, ARQ, segmentations, ordering etc. This also allows for the coexistence of communication-only and sensing-only nodes in the network.

Interworking between communication and sensing can be done via the core network, for example using communication and sensing servers. For a BS with both communication and sensing capabilities, a dual connectivity mechanism such as one provided in 5G can be used. The same or different frequency carriers are used for communication and sensing. If the same frequency carrier is used, then two different RATs can share the spectrum via time division multiplexing (TDM) and/or frequency division multiplexing (FDM).

Figure 13:
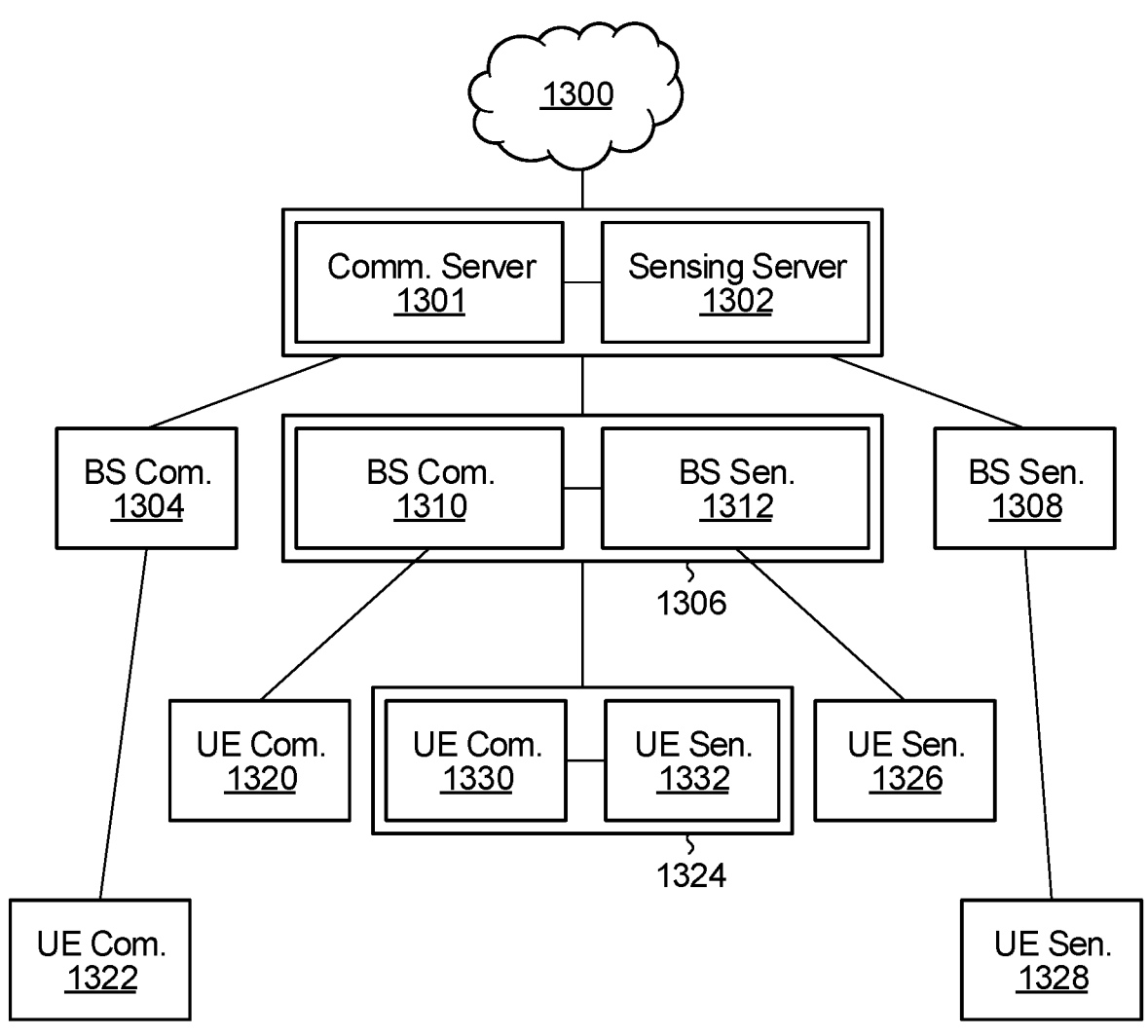
FIG. 13 is specific example of mode 1 integrated sensing and communication.

A specific example of mode 1 integrated sensing and communication is shown in FIG. 13, which shows a network 1300, communication server 1301 and sensing server 1302. Shown are three base stations 104,1312,1308. BS 1304 has only communication capability; BS 1312 has communication 1310 and sensing 1312 capabilities, meaning it is multi-RAT capable; BS 1308 has only sensing capability. Shown are 5 UEs 1320,1322,1324,1326,1328. UEs 1320, 1322 have only communication capability. UE 1324 has communication 1330 and sensing 1332 capabilities, meaning it is multi-RAT capable. UEs 1326 and 1328 have only sensing capabilities.

Integration of Sensing and Communication—Mode 2

In a second mode of integrated sensing and communication, referred to herein as "Mode 2", the same RAT is used for communication and sensing. In comparison to Mode 1, the same RAT of Mode 2 advantageously avoids multiplexing two different RATs under one spectrum, or necessitating two different carrier spectrums for each RAT, which should improve spectrum efficiency.

In some embodiments, a first set of channels is used by a first device to transmit a sensing signal for use in cooperative sensing involving a second device for sensing a target. A second set of channels is used to transmit, by the first device, a communications signal. In some embodiments, each channel in the first set of channels and each channel in the second set of channels is a logical channel, a transport channel, or a physical channel. The second set of channels includes at least one channel not included in the first set of channels. In some embodiments, the first set of channels includes at least one logical channel, and the second set of channels includes at least one logical channel. The logical channels in the first set are different than those of the second set. This means that different logical channels are used for communication data, as opposed to sensing data. Examples of different channels are provided below with reference to FIGS. 15, 16, and 17.

In addition, in some embodiments, different signal formats are used for the sensing data compared to the communications data. In a specific example of this, the header used for sensing data may be different from that used for communications data.

In addition, in some embodiments, different protocols can be used for sensing data as opposed to communications data. For example, different retransmission schemes may be used for sensing data as opposed to communications data.

At the physical layer, communication and sensing may be performed via separate physical channels. For example, a first physical downlink shared channel PDSCH-C is defined for data communication, while a second physical downlink shared channel PDSCH-S is defined for sensing.

Similarly, separate physical uplink shared channels (PUSCH) PUSCH-C and PUSCH-S could be defined for uplink communication and sensing.

In some embodiments, a common physical downlink control channel (PDCCH) and a common physical uplink control channel (PUCCH) is used to carry control information for both sensing and communication. Alternatively, in another embodiment, separate physical layer control channels may be used to carry separate control information for communication and sensing. For example, PUCCH-S and PUCCH-C could be used for uplink control for sensing and communication respectively, and PDCCH-S and PDCCH-C for downlink control for sensing and communication respectively. In another example, the same PDSCH and PUSCH could be also used for both communication and sensing, with separate logical channels and transport channels defined for communication and sensing. Note also that control channel(s) and data channel(s) for sensing can have the same or different channel structure (format), occupy same or different frequency bands or bandwidth parts.

Figure 14:
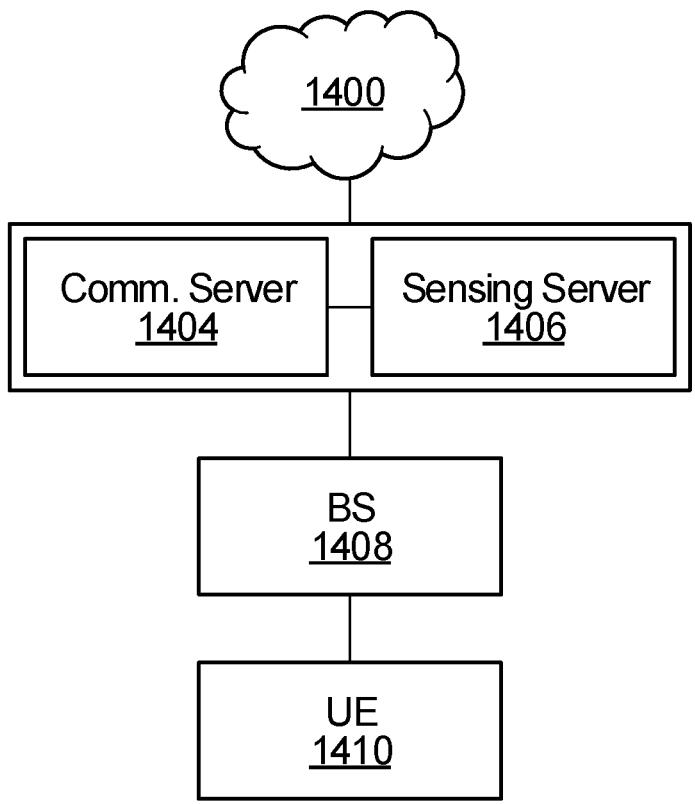
FIG. 14 is specific example of mode 1 integrated sensing and communication.

A specific example of mode 2 integrated sensing and communication is shown in FIG. 14, which shows a network 1400, communication server 1404 and sensing server 1406. Also shown is a BS 1408 and UE 1410. In the example of FIG. 14, a single RAT is used for both sensing and communication.

At the medium access control (MAC) layer, separate logical channels maybe defined for communication and sensing to provide service to radio link layer (RLC).

For example, at the MAC layer, in addition to Dedicated Traffic Channel (DTCH) and Dedicated Control Channel (DCCH), a Dedicated Sensing Traffic Channel (DSTCH) and Dedicated Sensing Control Channel (DSCCH) could be defined to carry sensing data and to carry configuration information for sensing function.

In some embodiments, for at least one MAC layer channel type, a single MAC layer channel is used for both communication and sensing. For example, one Dedicated Control Channel may be used to carry the configuration for both communication and sensing. Similarly, for the common control channel, paging channel, broadcasting channel, the same channel can be used to carry necessary information for both communication and sensing, or separate logical channels may be defined.

In some embodiments, at the MAC layer, separate transport channels are defined for communication and sensing to use the physical layer services. For example, a downlink shared channel for communication (DL-SCH-C) and downlink shared channel for sensing (DL-SCH-S) could be defined to be main transport channels used for downlink communication and sensing, respectively. Similarly, separate communication and sensing uplink shared channels UL-SCH-C and UL-SCH-S could be defined for uplink transport channels.

Different combinations of the above described schemes are possible.

Mode 2 DL Channel Mapping Examples

Downlink channel mapping examples will now be described with reference to FIGS. 15, 16 and 17. These are specific examples of sets of channels used for communication data and for sensing data. Various channels are referred to by channel acronyms which are all expanded upon below. When the channel acronym has "-C" appended, that means the channel is dedicated to communication. When the channel acronym has "-S" appended, that means the channel is dedicated to sensing. When there is no "-C" or "-S" appended, that means there is no separate instance for each of communication and sensing.

The following logical channels are referred to in these Figures:

PCCH: paging control channel
    BCCH: broadcast control channel
    CCCH: common control channel
    DTCH: dedicated traffic channel
    DCCH: dedicated control channel.

The following transport channels are referred to in these Figures:

PCH: paging channel
    BCH: broadcast channel
    DL-SCH: downlink shared channel
    UL-SCH: uplink shared channel
    RACH: random access channel.

The following physical channels are referred to in these Figures:

PBCH: physical broadcast channel
    PDSCH: physical downlink shared channel
    PUSCH: physical uplink shared channel
    PDCCH (for DCI): physical downlink control channel (for downlink control information)
    PUCCH (for UCI): physical uplink control channel (for uplink control information)
    PRACH: physical random access channel.

Mode 2 DL Channel Mapping—First Example—Full duplication

Figure 15:
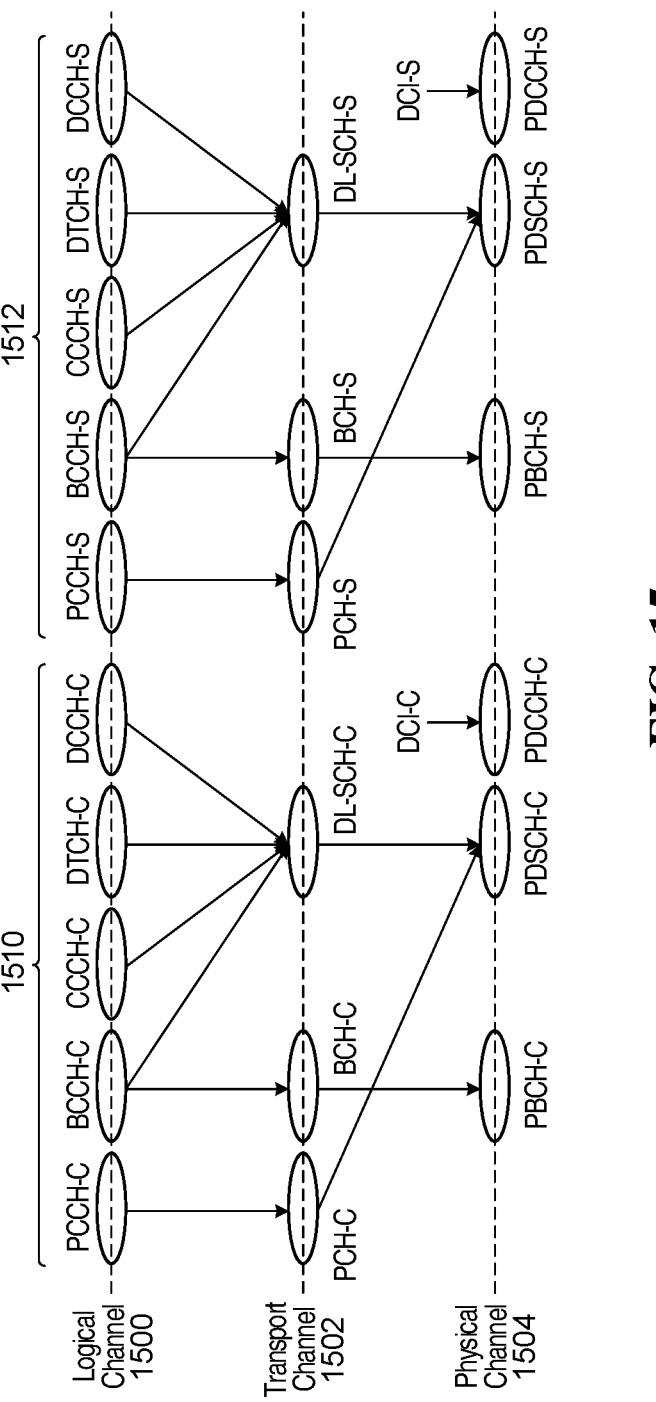
FIGS. 15,16 and 17 show a set of downlink channel mapping examples.

A first example of downlink channel mapping for cooperative sensing is depicted in FIG. 15, broken down into logical channels 1500, transport channel 1502, and physical channels 1504. The channels are also broken down into channels 1510 for communication and channels 1512 for sensing. In this example, for each type of channel, there is a separate instance for each of communication and sensing.

The channels 1510 for communication include:

logical channels PCCH-C, BCCH-C, CCCH-C, DTCH-C, DCCH-C;
    transport channels PCH-C, BCH-C and DL-SCH-C;
    physical channels PBCH-C, PDSCH-C, and PDCCH-C.

The channels 1512 for sensing include:

logical channels PCCH-S, BCCH-, CCCH-S, DTCH-S, DCCH-S;
    transport channels PCH-S, BCH-S and DL-SCH-S;
    physical channels PBCH-S, PDSCH-S, and PDCCH-S.

Mode 2 DL Channel Mapping—Second Example

For some types of channels, providing two separate channels for communications and sensing is not always necessary, especially for devices having both communications and sensing capabilities.

As an example, BCCH is a channel used for transmission of system information from the network to all devices in a cell. In some embodiments, information related to communication and information related to sensing is included in a single BCCH channel, and in this case, it is not necessary to have separate BCCH-C for communication related information and BCCH-S for sensing related system information.

Similarly, PCCH is a paging control channel used for paging of devices. In some embodiments, the same PCCH channel is used for both communication and sensing.

CCCH is used for transmission of control information in conjunction with random access. In some embodiments, the same CCCH channel is used for both communication and sensing.

DCCH is used for transmission of control information to/from a device. The channel is used for individual configuration of devices such as setting various parameters in devices. In some embodiments, the same DCCH channel is used for both communication and sensing. Alternatively, two separately designed channels may be used DTCH is used to transmit unicast data to/from a device. Given that the sensing data may be shared between BSs and BSs to UEs, it is better to have a separate logical channels for sensing and communication.

Figure 16:
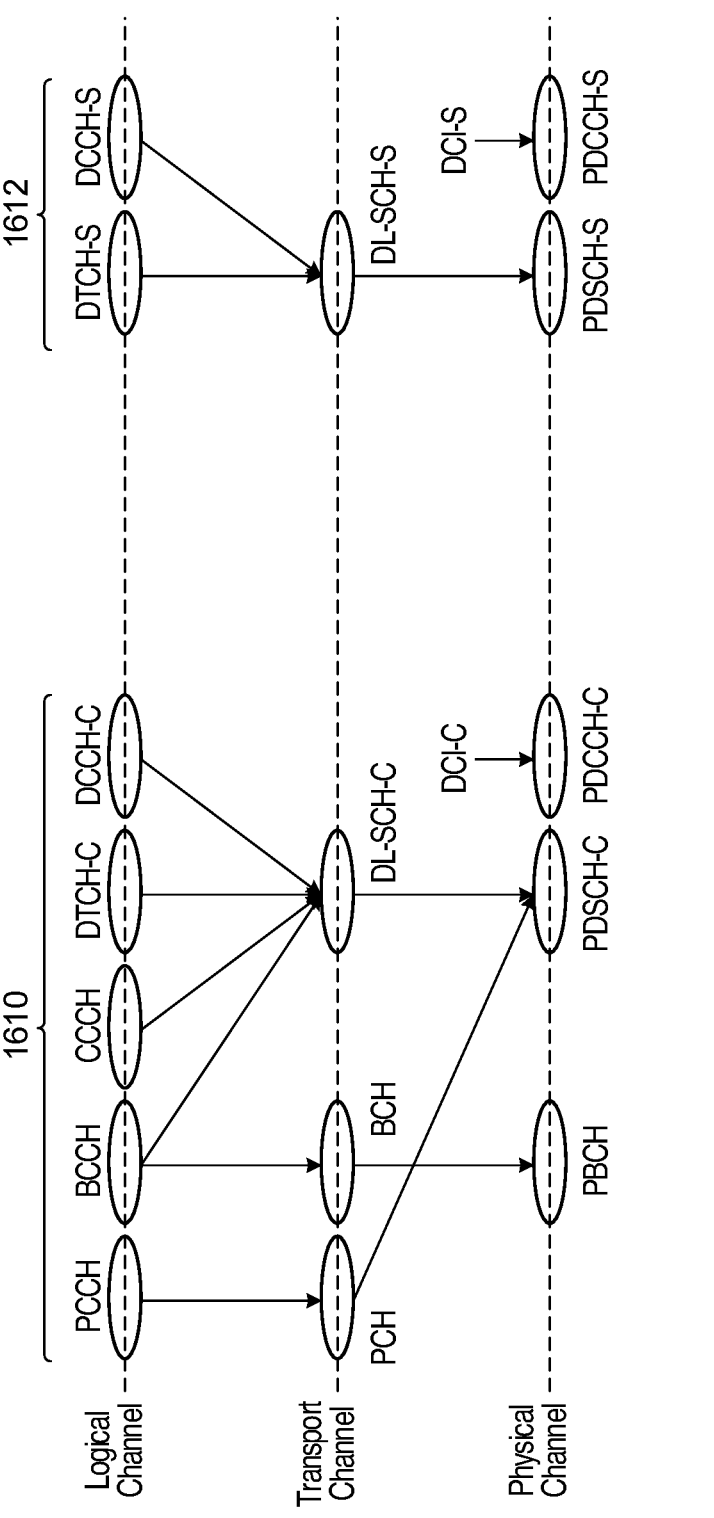

In a second example, depicted in FIG. 16, only certain channels are duplicated for communication and sensing. The channels 1610 for communication include:

logical channels PCCH, BCCH, CCCH, DTCH-C, DCCH-C;
    transport channels PCH, BCH and DL-SCH-C;
    physical channels PBCH, PDSCH-C, and PDCCH-C.

The channels 1612 for sensing include:

logical channels DTCH-S, DCCH-S;
    transport channels DL-SCH-S;
    physical channels PDSCH-S, and PDCCH-S.

Mode 2 UL Channel Mapping—Third Example

Figure 17:
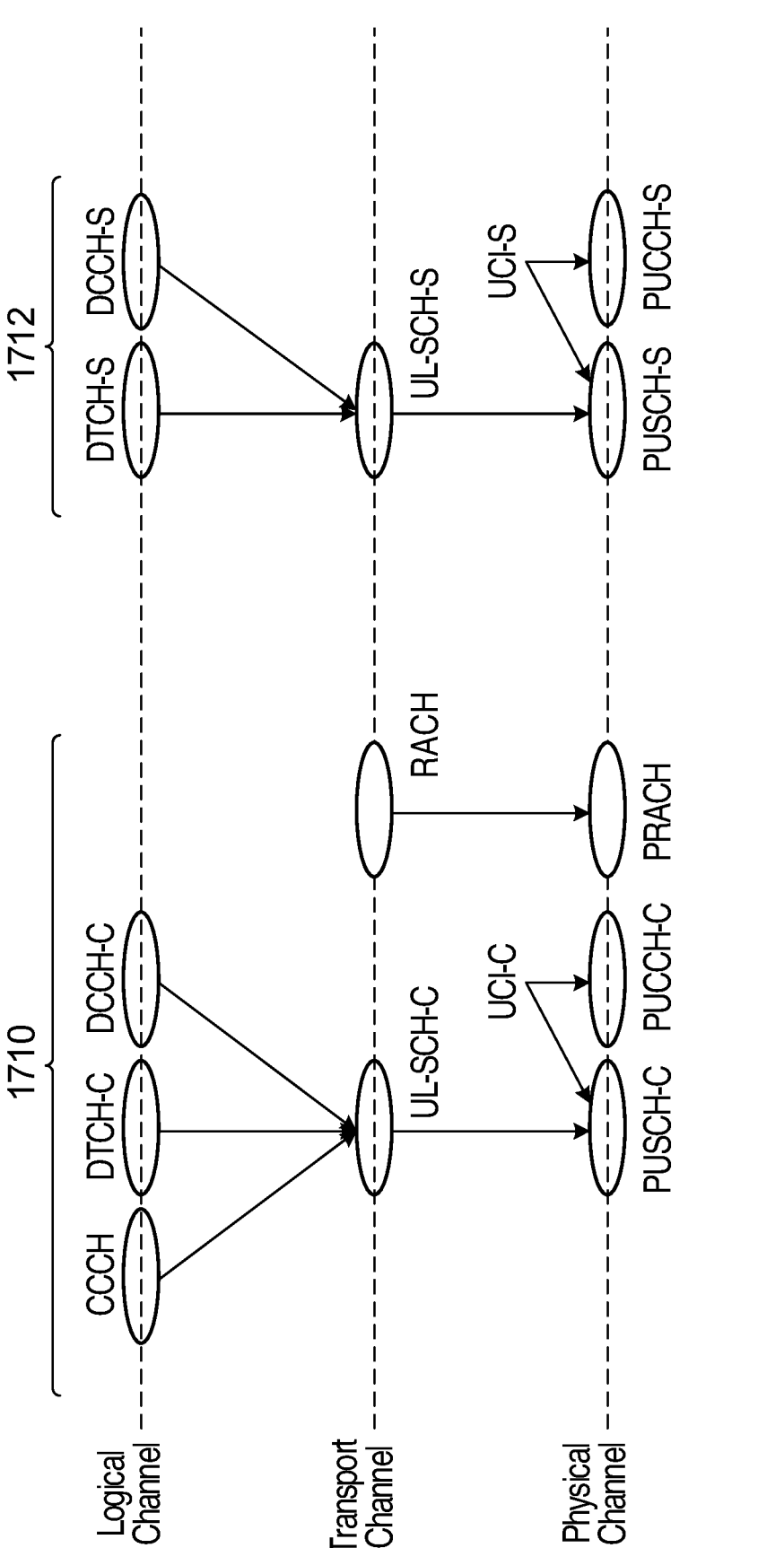

In a third example, depicted in FIG. 17, a channel set is provided for uplink communication, and only certain channels are duplicated for communication and sensing. The channels 1670 for communication include:

logical channels CCCH, DTCH-C, DCCH-C;
    transport channels UL-SCH-C, RACH;
    physical channels PUSCH-C, PUCCH-C, PRACH The channels 1612 for sensing include:

logical channels DTCH-S, DCCH-S;
    transport channels UL-SCH-S;
    physical channels PUSCH-S, and PUCCH-S.

Integration of Sensing and Communication—Mode 3

In some embodiments, communication and sensing are performed via carrier aggregation. This approach is referred to as "Mode 3" herein. In this embodiment, communication and sensing can be conducted at different frequency carriers. Note that this Mode 3 aspect can be combined with Mode 1 or Mode 2.

An example is shown in FIG. 18 where communication can be performed in a first frequency band/carrier f1 1800 in mmWave or lower frequency; radar link object detection is performed in a second frequency band/carrier f2 1802 in sub-THz spectrum; and imaging-based sensing can be performed in a third frequency band/carrier f3 1804 in the upper THz spectrum. Different bands can be used for different implementations.

In some embodiments, the different frequency bands for communication and sensing have an overlap in frequency.

In some embodiments, the frequency band(s) for communication are subsets of those for sensing, or vice versa.

In some embodiments, different bandwidth part (BWP) configurations, for example number of BWPs and parameters, are applied to the frequency bands for communication and sensing, regardless of whether they are the same frequency bands, partially overlapped frequency bands, or non-overlapping frequency bands.

The configuration for sensing BWPs can be different from that of communication BWPs.

In some embodiments, a carrier aggregation mechanism similar to that of 5G can be used for this purpose.

Signaling—Turn on/Off Sensing Functions on Demand

In some embodiments, some or all of a sensing function of a BS, and more generally of a device involved in cooperative sensing, can be turned on/off on demand, for example through RRC signaling or DCI signaling.

In some embodiments, in a device for cooperative sensing (such as a network device or UE), the sensing capability can be set by default (such as in a device with basic communication capability), or implicitly by some ID related to the device, or broadcasted to the device. The broadcasted capability may be broadcasted using various forms of signaling, at various signaling scales and time scales.

The on/off function can be made and signaled at different scales, e.g. per cell, per sensing BWP, per UE or per group of UEs, per (other) BS or per group of network devices.

A central control node may signal an on/off plan or status to the network device(s) and/or UE(s) in the collaborative sensing group, and/or to some sensing service controller. The signal can be of different time scales, e.g. when the network device is turned on, when a collaborative sensing group is formed and/or reformed and/or dismissed, when a sensing task is initiated and/or completed. This may be sent for example via broadcast signaling, or via cell or BWP specific semi-static RRC signaling, or via dynamic signaling with physical layer control signaling.

Similarly, in some embodiments, some or all of a sensing function of a UE can be turned on/off on demand.

Figure 19:
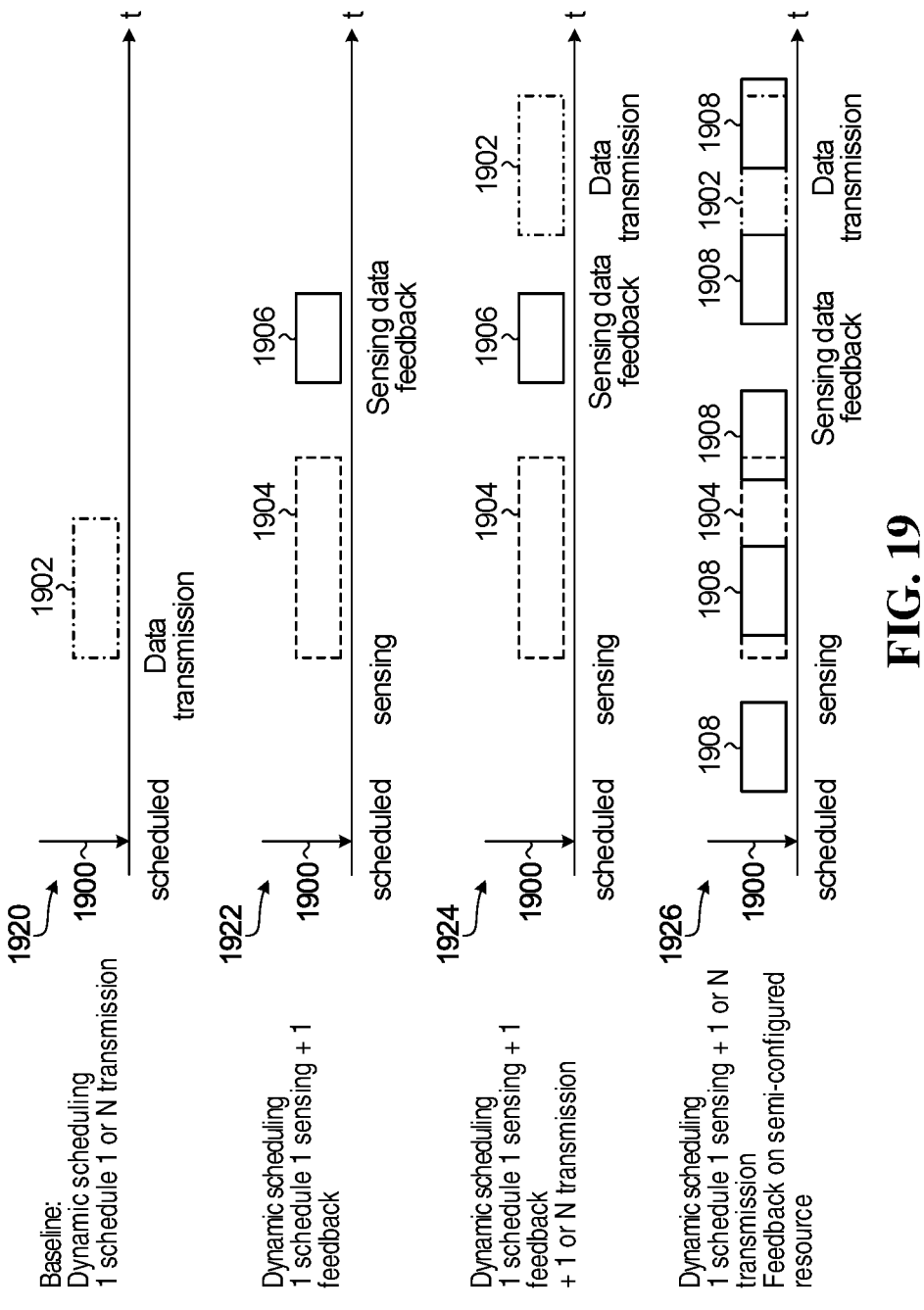
FIG. 19 shows a set of examples for jointly configuring/indicating sensing and communication resources.

Signaling—Configuration/Indication Signaling for Jointly Configuring/Indicating Sensing and Communication Resources FIG. 19 shows a set of examples for jointly configuring/indicating sensing and communication resources. The first example is generally indicated at 1920. This example involves a dynamic scheduling 1900 to schedule 1 or N data transmission(s) 1902.

The second example is generally indicated at 1922. This example involves a dynamic scheduling 1900 to schedule a period 1904 to perform sensing, and a period 1906 to transmit sensing data feedback.

The third example is generally indicated at 1924. This example involves a dynamic scheduling 1900 to schedule a period 1904 to perform sensing, and a period 1906 to transmit sensing data feedback, and 1 or N data transmission(s) 1902.

The fourth example is generally indicated at 1926. This example involves a dynamic scheduling 1900 to schedule a period 1904 to perform sensing, and 1 or N data transmission(s) 1902. Sensing data feedback is performed using a pre-configured resource 1908.

Further solutions are described below to address other aspects of implementing integrated sensing and communications in wireless networks of the future.

Radar sensing has been used for detecting a target's range (distance from the radar), velocity, and shape. For example, after a radar signal is transmitted, a reflection of that radar signal off of an object at a distance from the radar can be received and measured by the radar. Such reflection can indicate certain properties of the object, including its range, location, shape, and velocity. The range of the object can be determined based on the time-of-flight for the radar signal. The location of the object can be determined based on the range of the object and the direction that the radar signal was transmitted and received. For instance, beamforming can be used to transmit radar signals in different directions. The velocity or speed of the object can be determined based on a change in the object's position over time, or based on the Doppler shift of the received radar signal as can be understood by those skilled in the art.

In recent years, there have been proposals to integrate radar sensing with wireless communications. Radar sensing and communications can use the same hardware and the same waveform in order to perform in an integrated fashion. Known proposed solutions for radar sensing require either monostatic radar sensing with FDX capability at a sensing node (SeN), or multi-static radar sensing with HDX or FDX nodes.

A sensing node with a monostatic radar, which can only operate in the HDX mode, cannot detect and receive the reflected sensing signal when the node is transmitting. A conventional technique to perform monostatic radar sensing is to operate the radar cyclically alternating between transmission and reception, and such radars are known as pulsed radars. The radar signal transmitted by a pulsed radar has a waveform consisting of repeated pulses. Since the duty cycle, i.e. the ratio of the length of the transmission period to the total length of both transmission and reception periods, in a conventional pulsed radar system is typically very low, using the signal structure of such a system for integrated sensing and communication might result in very low spectral efficiency, which is not suitable for communications.

Due to some inherent limitations of pulsed radars, it remains challenging to design suitable signal structures and waveforms for pulsed or other monostatic radars for use in integrated communication and sensing.

In brief overview, an embodiment disclosed herein relates to methods, systems and devices for integrated communication and sensing in a wireless communications network, operated in a half-duplex mode and with the use of monostatic radars. The waveform of the radar pulse signal is designed and structured to improve or optimize system operation performance and efficiency. For example, a radio frequency (RF) pulse signal may be defined by a waveform for both communication and sensing in periodic sensing cycles. An electronic device may transmit the RF pulse signal in an active phase of a periodic sensing cycle and sense a reflection of the RF pulse signal reflected from an object in a passive phase of the sensing cycle. Waveform may be structured for carrying communication data between electronic devices. The sensed reflection of the RF pulse signal is at least a portion of the transmitted or reflected RF pulse signal, wherein the portion is equal to or greater than a threshold value for the object being within a sensing range of the electronic device. The electronic device may also receive a communication signal from another electronic device during the passive phase.

In some embodiments, the RF pulse signal, which may be a radar signal, may be structured to optimize the duty cycle of the radar so as to meet both communication and sensing requirements while maximizing operation performance and efficiency. In a particular embodiment, the pulse signal waveform is configured and structured so that the ratio of the duration of the active phase and the duration of the passive phase in a sensing cycle or subcycle is greater than a predetermined threshold ratio, and at least a predetermined proportion of the reflection reflected from targets within a given range is received by the radar.

In an embodiment disclosed herein, the RF pulse signal and its frame structure and waveform are designed and structured to address certain challenges in conventional radar systems. In general, the waveform can be represented by the pulse width (PW) or pulse duration ($\tau$), and pulse repetition interval (PRI) T or pulse repetition frequency (RRF) $f_p$. The duty cycle ($D_c$) of a radar is the product of the PW and RRF, or $D_c = \tau$ $f_p = \tau/T$.

For example, it has been recognized that a challenge in designing the frame structure and waveform for pulsed radars is that the reception time windows of the reflections are dependent on the target range, which can vary, and therefore not predictable. Thus, it is difficult to maximize the transmission time while ensure reception of the reflected signal, particularly if the target range needs to be unambiguously determined in a conventional radar system.

On the one hand, if the transmission period is too short, i.e. the pulse width is too narrow, the duty cycle will be very small. For example, if the pulse width is 1 ns and the desired radar range is 60 m, since it will require a reception period of at least 400 ns in order to ensure a target 60 m away can be sensed, the resulting duty cycle is only about 1/401. A small duty cycle indicates less efficient use of the radar, particularly when sensing and communication are integrated because the radar signal is also used for communicating data, and for communications purposes it is desirable and more efficient to have longer transmission time so more data can be transmitted. A smaller duty cycle means less time is available for transmission of data. A smaller duty cycle also means a lower average power output at a given peak radar power.

On the other hand, if the transmission period is too long, most of the reflected sensing signal would be missed, and most of the transmitted signal would be wasted for the purpose of sensing. For example, if the transmission period is 10 μs, which may be required if a Sensing Node (SeN) needs to transmit a cyclic prefix (CP) orthogonal frequency division multiplexing (OFDM) symbol (CP-OFDM symbol) of a length of 10 μs and the OFDM subcarrier spacing (SCS) equals to 120 kHz, about 96% of the reflection of the sensing signal from targets within the range of 60 m will be lost during the transmission period and cannot be received. The radar may not even be able to detect targets at closer ranges, such as targets that are only a few meters away from the SeN.

It has been recognized that more efficient signal design would be desirable for half-duplex monostatic sensing, so that efficient resource allocation and efficient signal processing can be balanced or optimized. In this regard, the present disclosure relates to aspects of signal design, including signal frame structure design, and waveform and numerology design.

In some embodiments, the signal is designed to achieve one or more of improved sensing performance, for example target positioning accuracy; and minimizing negative impact or effect, or interference, of sensing on other applications or functions performed by the sensing node or electronic device. For example, it may be desirable to reduce or minimize interference of sensing signal with adjacent communication bands, by minimizing the out-of-band sensing signal radiation.

In some embodiments, it may also be desirable to provide data and sensing signal multiplexing within the radar and signal designs described herein.

Conveniently, embodiments disclosed herein can address one or more of the shortcomings or problems in conventional monostatic sensing when integrated data communication, as will be further discussed below.

As alluded to above, embodiments disclosed herein relate to wireless communications networks operating in the half-duplex mode. A duplex communication system is a point-to-point system, in which two devices (or nodes) at different points, e.g. A and B, can communicate in both directions, e.g. from A to B and from B to A. A duplex system can be a full-duplex (FDX) system or a half-duplex (HDX) system. In FDX communication, communication can occur in both directions (e.g. from A to B and from B to A in the above example) using the same time and frequency resources, such as through different communication channels or using different hardware. In HDX communication, communications can still occur in each one of the two directions (e.g. from A to B, or from B to A, in the above example), but only in one direction at a time (e.g., in time division duplexing) or only in one frequency band at a time (e.g., in frequency division duplexing). In other words, when a communicating point is communicating in the HDX mode, it cannot both transmit and receive signals using the same time and frequency resources.

A challenge to configuring sensing signals in a wireless communication network is how to efficiently achieve the coexistence of sensing signals and communication signals. Sensing signals should be configured such that a sensing operation performed by one network entity does not significantly degrade the communications performance or the sensing performance of other network entities. By way of example, interference between sensing signals and communication signals should be limited.

There are fundamental limits on the range resolution and velocity resolution of a sensing signal such as a radar signal. These resolution limits depend on the transmission time ($T_w$), bandwidth (BW, also BW) and the carrier frequency ($f_c$) of the radar signal. These fundamental limits exist regardless of the waveform and transmission scheme of the radar signal. The range resolution ($\Delta R$) and velocity resolution ($\Delta v$) of radar sensing have the following respective lower limits:

$$\Delta R \geq \frac{c_0}{2BW}, \Delta v \geq \frac{c_0}{2T_w f_c},$$

where $c_0$ denotes the speed of light. Thus, increasing the bandwidth can improve the range resolution, and increasing the transmission time or carrier frequency can improve the velocity resolution.

For example, if a target is 300 meters away, a delay between a received signal reflected from the target and the transmitted signal is 2 μs; hence, the duration of the active phase needs to be less than 2 μs to ensure the reflection from the target can be received by the sensing node in the passive phase. In reality, the constraint on pulse duration is more severe as there are reflectors and targets closer to the sensing node than 300 meters. Limiting the duration of the pulse may reduce the ability to integrate sensing with communications signals and equipment, which currently mainly utilizes OFDM waveforms. For example, in order to accommodate a cyclic prefix (CP), the symbol duration for OFDM transmissions may need to be much longer than 2 μs. A narrow-time sensing pulse can limit the accuracy of target velocity estimation.

While it is possible to multiplex sensing signals and communication signals by using time domain multiplexing (TDM), there may be significant signal overhead for such multiplexing. It is thus desirable to reduce such signal overhead.

Some embodiments disclosed herein relate more specifically to signal frame and waveform design for the sensing and communication signals. The waveform design may include design features related to single-carrier, multi-carrier, ultra-wide band (UWB) pulse, or Frequency-Modulated Continuous Wave (FMCW) waveforms, or the like.

In an embodiment, integrated data communication and sensing is performed in a wireless communications network operating in a half-duplex mode. The method includes operating a first electronic device to communicate with at least one second electronic device in a half-duplex communication mode, wherein the first electronic device comprises a monostatic sensing node configured to cyclically alternate between operation in an active phase and operation in a passive phase for a plurality of cycles, each cycle comprising a plurality of communication and sensing subcycles. In the active phase of a communication and sensing subcycle, a pulse signal is transmitted from the sensing node. The pulse signal may comprise a waveform structured to carry communication data. In the passive phase of the communication and sensing subcycle, the sensing node receives a communication signal from the at least one second electronic device, and also senses reflections of the pulse signal reflected from objects within a given sensing range, for sensing the objects. The range may be defined by the distance (d) from the sensing node that is between a minimum distance ($d_{min}$) and a maximum distance ($d_{max}$), i.e. $d_{min} \le d \le d_{max}$. The pulse signal has a frame structure and a waveform that are designed or selected to optimize and balance sensing performance and efficient resource allocation.

For example, the signal may have a frame structure and waveform selected to balance the need to provide an efficient duty cycle of the signal and the need to ensure adequate reception of the reflections of the pulse signal for sensing purposes.

In one embodiment, the duration ($t_a$) of the active phase and the duration ($t_p$) of the passive phase in each subcycle may be selected so that the ratio of $t_a/t_p$ is greater than a predetermined threshold ratio, and the pulse signal may also have a pulse structure selected to allow at least a predetermined proportion ($\alpha$) of the reflected pulse signal to return to the sensing node during the passive phase when $d_{min} \le d \le d_{max}$. Generally, $0 < \alpha \le 1$. In some embodiments, $0 < \alpha < 1$. A smaller a will allow increased duty cycle, but if a is too small it may negatively affect the sensing performance. The value of a may represent the minimum proportion of a reflection received by the sensing node during the passive phase among all reflected signals. In some embodiments, the value of a may be selected so that the minimum proportion of any reflection received by the sensing node during the passive phase is still sufficient to provide effective and efficient sensing, or at least meet the minimum sensing requirements in the particular application.

It has been realized that to ensure efficient resource allocation, the duty cycle of the signal should be sufficiently high. In other words, the active phase, also referred to as the ON state or active sensing, and the passive phase, also referred to as OFF state or passive sensing, should be structured so that the ratio of the duration of the active phase over the duration of the passive phase in the signal cycles is not too small.

It has also been realized that to ensure efficient sensing, a minimum proportion of the reflected sensing signal should be received by the sensing node during the passive phase. The minimum proportion of received sensing signal should be sufficient to obtain the desired sensing parameters or information from the received reflection signal.

It may further improve performance if the active (ON) phase and the passive (OFF) phase are repeated in each sensing cycle to provide more robust range and Doppler estimation. That is, signals are transmitted and sensed over a plurality of sensing cycles, and each sensing cycle includes a plurality of subcycles, where each subcycle includes an active phase and a passive phase.

The signal may have different optional cycle structures.

In a first option, each of the active and passive phases has a fixed length of duration. That is, the duration of the active phases and the duration of the passive phases have the same or constant respective lengths over different subcycles or cycles. In some embodiments, the duration of the active phases and the duration of the passive phases have the same or constant respective lengths over different subcycles of a cycle, but are different over different cycles. The duration of the active phase and the duration of the passive phase may be the same or different, subject to the constraints discussed herein.

In a second option, one or both of the lengths of the active and passive phases may vary over different subcycles or cycles.

Figure 20A:
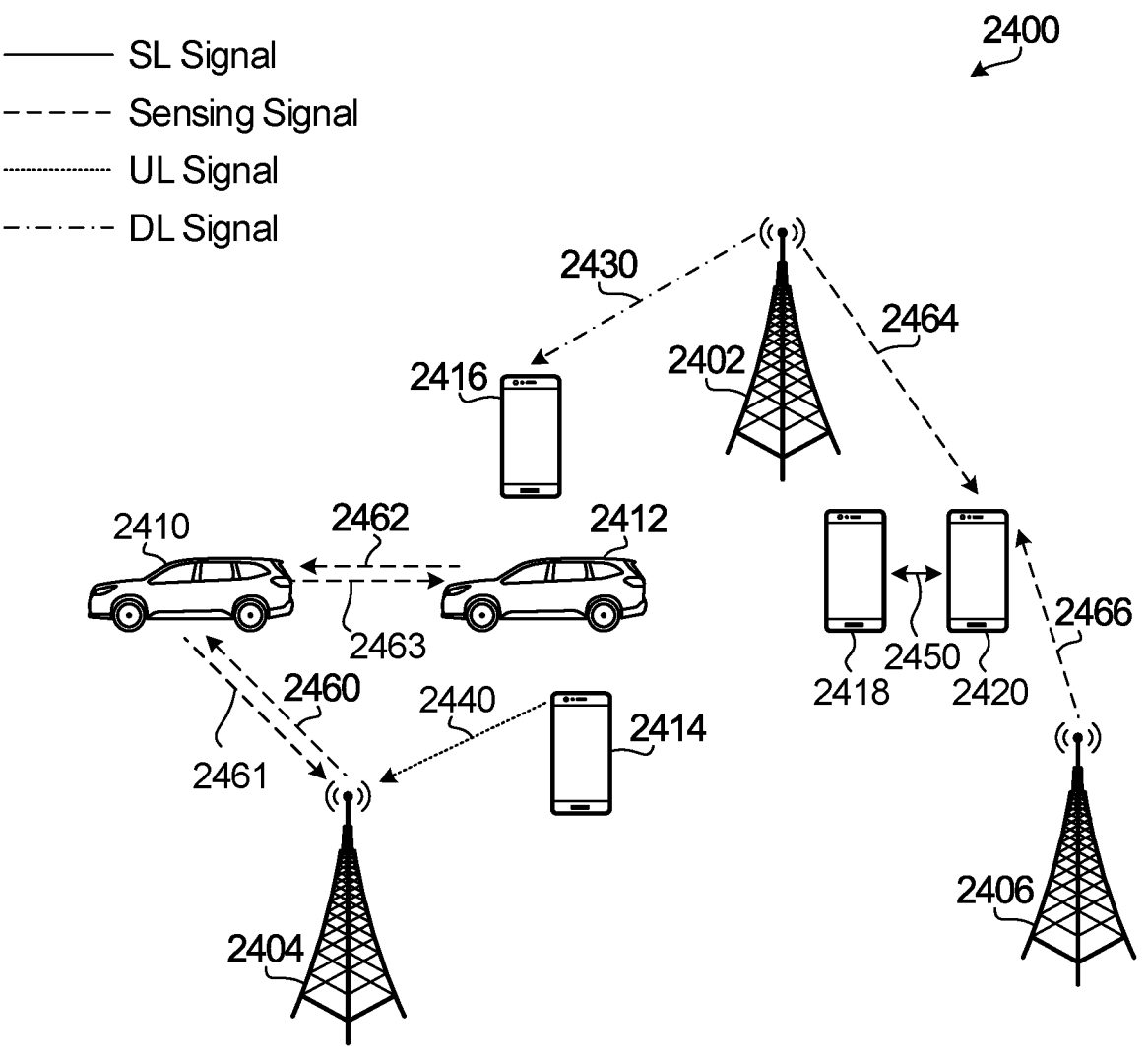
FIG. 20A is a schematic diagram illustrating a first example communication system implementing sensing according to aspects of the present disclosure.

FIG. 20A is a diagram illustrating an example communication system 2400 implementing integrated communication and sensing in a HDX mode using monostatic sensing nodes. The communication system 2400 includes multiple transmission and receive points (TRPs) 2402, 2404, 2406, and multiple UEs 2410, 2412, 2414, 2416, 2418, 2420. In FIG. 4A, for illustration purposes only, the UEs 2410, 2412 are illustrated as vehicles and the UEs 2414, 2416, 2418, 2420 are illustrated as cell phones, however, these are only examples and other types of UEs may be included in System 2400.

The TRP 2402 is a base station that transmits a downlink (DL) signal 2430 to the UE 2416. The DL signal 2430 is an example of a communication signal carrying data. The TRP 2402 also transmits a sensing signal 464 in the direction of the UEs 2418, 2420. Therefore, the TRP 2402 is involved in sensing and is considered to be both a sensing node (SeN) and a communication node.

The TRP 2404 is a base station that receives an uplink (UL) signal 2440 from the UE 2414, and transmits a sensing signal 2460 in the direction of the UE 2410. The UL signal 2440 is an example of a communication signal carrying data. Since the TRP 2404 is involved in sensing, this TRP is considered to be both a sensing node (SeN) and a communication node.

The TRP 2406 transmits a sensing signal 2466 in the direction of the UE 2420, and therefore this TRP is considered to be a sensing node. The TRP 2406 may or may not transmit or receive communication signals in the communications system 400. In some embodiments, the TRP 2406 may be replaced with a sensing agent (SA) that is dedicated to sensing, and does not transmit or receive any communication signals in the communication system 2400.

The UEs 2410, 2412, 2414, 2416, 2418, 2420 are all capable of transmitting and receiving communication signals on at least one of UL, DL, and SL. For example, the UEs 2418, 2420 are communicating with each other via SL signals 2450. At least some of the UEs 2410, 2412, 2414, 2416, 2418, 2420 are also sensing nodes in the communication system 2400. By way of example, the UE 2412 may transmit a sensing signal 2462 in the direction of the UE2 410 during an active phase of operation. The sensing signal 2462 may include or carry communication data, such as payload data, control data, and signaling data. A reflection signal 2463 of the sensing signal 2462 is reflected off UE 2410 and returned to and sensed by UE 2412 during a passive phase of operation. Therefore, the UE 2412 is considered to be both a sensing node and a communication node.

A sensing node in the communication system 2400 may implement monostatic or bi-static sensing. At least some of the sensing nodes such as UEs 2410, 2412, 2418 and 2420 may be configured to operate in the HDX monostatic mode. In some embodiments, all of the sensing nodes in the communication system 2400 may be configured to operate in the HDX monostatic mode.

In the case of monostatic sensing, the transmitter of a sensing signal is a transceiver such as a monostatic sensing node transceiver, and also receives a reflection of the sensing signal to determine the properties of one or more objects within its sensing range. In an example, the TRP 2404 may receive a reflection 2461 of the sensing signal 2460 from the UE 2410 and potentially determine properties of the UE 2410 based on the reflection 2461 of the sensing signal. In another example, the UE2 412 may receive reflection 2463 of the sensing signal 2462 and potentially determine properties of the UE 2410 based on the sensed reflection 2463.

In some embodiments, the communication system 2400 or at least some of the entities in the system may operate in a HDX mode. For example, a first one of the EDs in the system, such as the UEs 2410, 2412, 2414, 2416, 2418, 2420 or TRPs 2402, 2404, 2406, may communicate with at least another one (second one) of the EDs in the HDX mode. The transceiver of the first ED may be a monostatic transceiver configured to cyclically alternate between operation in an active phase and operation in a passive phase for a plurality of cycles, each cycle including a plurality of communication and sensing subcycles. During operation, in the active phase of a communication and sensing subcycle, a pulse signal is transmitted from the transceiver. The pulse signal is an RF signal and is used as a sensing signal, but also has a waveform structured to facilitate carrying communication data. In the passive phase of the communication and sensing subcycle, the transceiver of the first ED also senses a reflection of the pulse signal reflected from an object at a distance (d) from the transceiver, for sensing objects within a sensing range. In the passive phase, the first ED may also detect and receive communication signals from the second ED or possibly other EDs. The first ED may use the monostatic transceiver to detect and receive the communication signals. The first ED may also include a separate receiver for receiving the communication signals. However, to avoid possible interference, the separate receiver may also be operated in the HDX mode. In these embodiments, any of the sensing signals 2460, 2462, 2464, 2466 and communication signals 2430, 2440, 2450 illustrated in FIG. 20A may be used for both communication and sensing. In these embodiments, the pulse signal may be structured to optimize the duty cycle of the transceiver so as to meet both communication and sensing requirements while maximizing operation performance and efficiency. In a particular embodiment, the pulse signal waveform is configured and structured so that the ratio of the duration of the active phase and the duration of the passive phase in a sensing cycle or subcycle is greater than a predetermined threshold ratio, and at least a predetermined proportion of the reflection reflected from targets within a given range is received by the transceiver.

In an example, the ratio or proportion may be expressed as a time value; accordingly, the pulse signal in this example is configured and structured so that active phase time is a specific value or range of values, and the passive phase time is a specific value or values associated with the respective value or values of the active phase time. As a result, the pulse signal is configured such that the time value of the reflection is greater than a threshold value. The ratio or proportion may also be indicated or expressed as a multiple of a known or predefined value or metric. The predefined value may be a predefined symbol time, such as a sensing symbol time, as will be further discussed below.

The durations of the active and passive phases, and the waveform and structures of the pulse signal may also be otherwise configured according to embodiments described herein to improve communication and sensing performance. For example, constraints on the ratio of the phase durations may be provided to balance the competing factors of efficient use of the signal resources for communication and the sensing performance, as discussed above and in further details below.

Figure 20B:
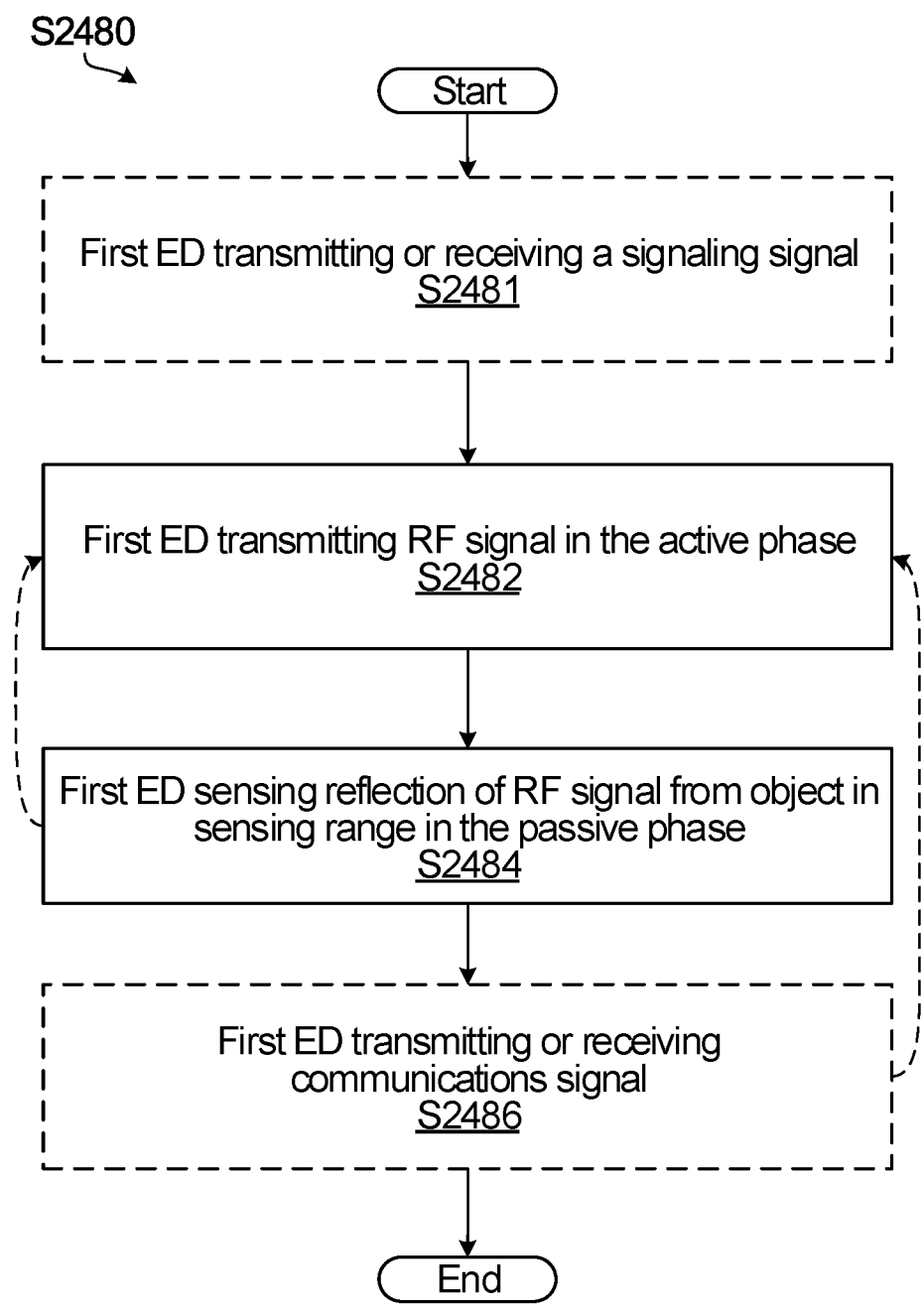
FIG. 20B is a flowchart illustrating an example operation process of an electronic device for integrated sensing and communication, according to an embodiment of the present disclosure.

An example of the operation process at the first ED is illustrated in FIG. 20B, as process S2480.

In process S2480, the first ED, such as the UE 2412, is operated to communicate with at least one second ED, which may be any one or more of BS 2402, 2404, 2406 or UE 2410, 2414, 2416, 2418, 2420. The first ED is operated to cyclically alternate between an active phase and a passive phase.

In the active phase, at S2482, the first ED transmits a radio frequency (RF) signal in the active phase. The RF signal may be a pulse signal suitable as a sensing signal. The pulse signal is beneficially configured to also be suitable for carrying communication data within the pulse signal. For example, the pulse signal may have a waveform structured to carry communication data.

In the passive phase, at S2484, the first ED senses a reflection of the RF signal reflected from an object, such as reflection 4263 from UE 2410.

The active phase and passive phase are alternately and cyclically repeated for a plurality of cycles. Each cycle may include a plurality subcycles. The active and passive phases and the RF signal are configured and structured to receive at least a threshold portion or proportion of the reflected signal during the passive phase when the object is within a sensing range, as will be further described below. As discussed earlier, in some embodiments, the threshold portion or proportion may be indicated or expressed as, or by, a known or predefined value or metric, or a multiple of a base value or reference value. An example metric or value is time, and the base value or metric may be a unit of time or a standard time duration.

In the passive phase, at S2484, the first ED may optionally be operated to receive a communication signal from one or more other EDs, which may include UEs or BS.

Optionally, the first ED may be operated to transmit a control signaling signal indicative of one or more signal parameters associated with the RF signal during the active phase at S2482.

Optionally, the first ED may be operated to receive a control signaling signal indicative of one or more signal parameters associated with the RF signal to be transmitted by the first ED, or a communication signal to be received by the first ED, during the passive phase. The first ED may process the control signaling signal and construct the RF signal to be transmitted in subsequent cycles.

In an example, the first ED may be operated to transmit or receive a control signaling signal at optional stage S2481, separately from the RF signal of S2482. The control signaling signal may include information, indications and parameters described elsewhere herein. For example, if the first ED receives a control signaling signal at either S2481 or S2484, the first ED may configure and structure the signal to be transmitted at S2482 based on the information or parameters indicated in the control signaling signal received by the first ED. The control signaling signal may be received from a UE or a BS, or any TP.

If the first ED transmits a control signaling signal, the control signaling signal may include information, indications, and parameters about the signal to be transmitted during the active phase at S2482. In this case, the control signaling signal may be transmitted to any other ED, such as a UE or a BS.

Alternatively or furthermore, the RF signal transmitted at S2482 may include a control signaling portion. The control signaling portion may indicate one or more of signal frame structure; subcycle index of each subcycle that comprises encoded data; and a waveform, numerology, or pulse shape function, for a signal to be transmitted from the first ED. The signaling portion may include an indication that a cycle or subcycle of the RF signal to be transmitted includes encoded data. The encoded data may be payload data or control data, or include both. For example, the signaling indication may include an indicator of a subcycle index, a frequency resource scheduling index, or a beamforming index, associated with the subcycle or the encoded data.

The process S2480 may begin when the first ED starts to sense or communicate with another ED. The process S480 may terminate when the first ED is no longer used for sensing, or when the first ED terminates both sensing and communication operations.

For example, as illustrated in FIG. 20B, in the process S2480, the first ED may continue, or start, to transmit or receive communications signals, at S2486, after termination of the sensing operations. After a period of communication only operation, the first ED may also resume sensing operations, such as restarting the cyclic operations at S2482 and S2484.

It is noted that the order of operations at S2481, S2482, S2484, and S2486 may be modified and vary from the order shown in FIG. 20B, and operations at S2481 and S2486 may be performed at the same time or integrated with operations at S2482 or S2484.

The signal sensed or received during an earlier passive phase may be used to configure and structure a signal to be transmitted in a later active phase, or for scheduling and receiving a communication signal in later passive phase. The received communication signal may be a sensing signal transmitted by another ED that also embeds or carries communication data, including payload data or control data.

Each of the first ED and second ED(s) may be a UE or a BS.

The signal received or transmitted by the first ED may include control signaling that provides information about the parameters or structure details of the signal to be transmitted by the first ED, or of a signal to be received by the first ED.

The control signaling may include information about embedding communication data in a sensing signal such as the RF signal transmitted by the first ED.

The control signaling may include information about multiplexing a communication signal and a sensing signal for DL, UL, or SL.

In the case of bi-static sensing, the receiver of a reflected sensing signal is different from the transmitter of the sensing signal. In some embodiments, a BS, TRP or UE may also be capable of operating in a bi-static or multi-static mode, such as at selected times or in communication with certain selected EDs that are also capable of operating in the bi-static or multi-static mode. For example, any or all of the UEs 2410, 2412, 2414, 2416, 2418, 2420 may be involved in sensing by receiving reflections of the sensing signals 2460, 2462, 2464, 2466. Similarly, any or all of the TRPs 2402, 2404, 2406 may receive reflections of the sensing signals 2460, 2462, 2464, 2466. While embodiments of this disclosure are primarily directed to problems in monostatic sensing, the embodiments can also be beneficial for bi-static or multi-static sensing, particularly to facilitate compatibility and reduce interference when used in a system with both monostatic and multi-static nodes.

In an example, the sensing signal 2464 may be reflected off of the UE 2420 and be received by the TRP 2406. It should be noted that a sensing signal might not physically reflect off of a UE, but may instead reflect off an object that is associated with the UE. For example, the sensing signal 2464 may reflect off of a user or vehicle that is carrying the UE 2420. The TRP 2406 may determine certain properties of the UE 2420 based on a reflection of the sensing signal 2464, including the range, location, shape, and speed or velocity of the UE 2420, for example. In some implementations, the TRP 2406 may transmit information pertaining to the reflection of the sensing signal 2464 to the TRP 2402, or to any other network entity. The information pertaining to the reflection of the sensing signal 2464 may include the time that the reflection was received, the time-of-flight of the sensing signal (for example, if the TRP 2406 knows when the sensing signal was transmitted), the carrier frequency of the reflected sensing signal, the angle of arrival of the reflected sensing signal, and the Doppler shift of the sensing signal (for example, if the TRP 2406 knows the original carrier frequency of the sensing signal). Other types of information pertaining to the reflection of a sensing signal are also contemplated.

The TRP 2402 may determine properties of the UE 2420 based on the received information pertaining to the reflection of the sensing signal 2464. If the TRP 2406 has determined certain properties of the UE 2420 based on the reflection of the sensing signal 2464, such as the location of the UE 2420, then the information pertaining to the reflection of the sensing signal 2464 may also or instead include these properties.

In another example, the sensing signal 2462 may be reflected off of the UE 2410 and be received by the TRP 2404. Similar to the example provided above, the TRP 2404 may determine properties of the UE 2410 based on the reflection 2463 of the sensing signal 2462, and transmit information pertaining to the reflection of the sensing signal to another network entity, such as the UEs 2410, 2412.

In a further example, the sensing signal 2466 may be reflected off of the UE 2420 and be received by the UE 2418. The UE 2418 may determine properties of the UE 2420 based on the reflection of the sensing signal, and transmit information pertaining to the reflection of the sensing signal to another network entity, such as the UE 2420 or the TRPs 2402, 2406.

The sensing signals 2460, 2462, 2464, 2466 are transmitted along particular directions, and in general, a sensing node may transmit multiple sensing signals in multiple different directions. In some implementations, sensing signals are used to sense the environment over a given area, and beam sweeping is one of the possible techniques to expand the covered sensing area. Beam sweeping can be performed using analog beamforming to form a beam along a desired direction using phase shifters, for example. Digital beamforming and hybrid beamforming are also possible. During beam sweeping, a sensing node may transmit multiple sensing signals according to a beam sweeping pattern, where each sensing signal is beamformed in a particular direction.

The UEs 2410, 2412, 2414, 2416, 2418, 2420 are examples of objects in the communication system 2400, any or all of which could be detected and measured using a sensing signal. However, other types of objects could also be detected and measured using sensing signals. Although not illustrated in FIG. 20A, the environment surrounding the communication system 2400 may include one or more scattering objects that reflect sensing signals and potentially obstruct communication signals. For example, trees and buildings could at least partially block the path from the TRP 2402 to the UE 2420, and potentially impede communications between the TRP 2402 and the UE 2420. The properties of these trees and buildings may be determined based on a reflection of the sensing signal 2464, for example.

In some embodiments, communication signals are configured based on the determined properties of one or more objects. The configuration of a communication signal may include the configuration of a numerology, waveform, frame structure, multiple access scheme, protocol, beamforming direction, coding scheme, or modulation scheme, or any combination thereof. Any or all of the communication signals 2430, 2440, 2450 may be configured based on the properties of the UEs 2414, 2416, 2418, 2420. In one example, the location and velocity of the UE 2416 may be used to help determine a suitable configuration for the DL signal 2430. The properties of any scattering objects between the UE 2416 and the TRP 2402 may also be used to help determine a suitable configuration for the DL signal 2430. Beamforming may be used to direct the DL signal 2430 towards the UE 2416 and to avoid any scattering objects. In another example, the location and velocity of the UE 2414 may be used to help determine a suitable configuration for the UL signal 2440. The properties of any scattering objects between the UE 2414 and the TRP 2404 may also be used to help determine a suitable configuration for the UL signal 2440. Beamforming may be used to direct the UL signal 2440 towards the TRP 2404 and to avoid any scattering objects. In a further example, the location and velocity of the UEs 2418, 2420 may be used to help determine a suitable configuration for the SL signals 2450. The properties of any scattering objects between the UEs 2418, 2420 may also be used to help determine a suitable configuration for the SL signals 2450. Beamforming may be used to direct the SL signals 2450 to either or both of the UEs 2418, 2420 and to avoid any scattering objects.

The properties of the UEs 2410, 2412, 2414, 2416, 2418, 2420 may also or instead be used for purposes other than communications. For example, the location and velocity of the UEs 2410, 2412 may be used for the purpose of autonomous driving, or for simply locating a target object.

The transmission of sensing signals 2460, 2462, 2464, 2466 and communication signals 2430, 2440, 2450 may potentially result in interference in the communication system 2400, which can be detrimental to both communication and sensing operations.

In some embodiments, the cycle length and the lengths of the active phase and passive phase may be fixed or remain constant over all subcycles of the same sensing cycle. In this case, the signal is characterized or can be defined using parameters that define the duration of the active ("ON") and passive ("OFF") phases. These parameters may be determined based on the characteristics of the environment, as will be explained next.

Figure 21:
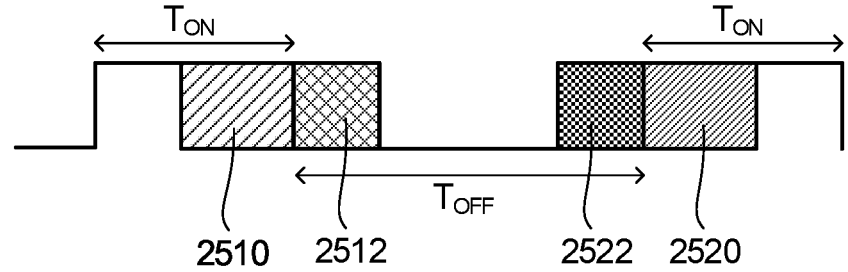
FIG. 21 is a schematic diagram illustrating a signal structure with a fixed cycle length according to an example embodiment of the present disclosure.

An example signal configuration and structure with a fixed cycle length is illustrated in FIG. 21. As depicted in FIG. 21, "$T_{on}$" represents the duration of the active phase, i.e., $T_{on}=t_a$, and "$T_{off}$" represents the duration of the passive phase, i.e., $T_{off}=t_p$.

Normally, for a certain region of interest, the statistics of the target locations (location map) is available and therefore, one can determine the expected target ranges, as being a distance between a minimum sensing range $d_{min}$ and a maximum sensing range $d_{max}$.

For a given ratio of $$r = \frac{d_{max}}{d_{min}}$$

and $\alpha$, the relationship between $t_a$ and $t_p$ is $$t_a \leq \frac{2d_{min}}{c \cdot \alpha},$$

$$t_p + (1 - \alpha)t_a \geq \frac{2d_{max}}{c},$$

where c denotes the speed of light. It follows that $$\frac{t_p}{t_a} \geq \alpha\left(r - \frac{1 - \alpha}{\alpha}\right) = [\alpha r - (1 - \alpha)].$$

As discussed earlier, a is the acceptable minimum proportion of the reflected signal that is still sufficient to provide the needed information to meet the desired or minimum sensing performance requirements.

The above relationship may be understood by reference to FIG. 21. In particular, the shaded time window section 2510 in FIG. 21 indicates the time window in which a reflection of transmitted signal reflected off a target object at the distance $d_{min}$ may be possibly returned to the sensing node (without any deflection). As can be understood, the length of the reflection window section 2510 is the same as the length of the active phase ($T_{on}$). The reflection window 2510 has a portion 2512 falling in the passive phase ($T_{off}$). The portion 2512 represents the smallest portion of the reflection signals that will be received from targets in the sensing range where a leading portion of the reflection will fall within the active phase and be missed. Therefore, the portion 2512 should at least be equal to $\alpha T_{on}$. The leading edge of section 2510 is delayed from the leading edge of the active phase ($T_{on}$) by the same time period as portion 2512, i.e., at least equal to $\alpha T_{on}$. The shaded time window section 2520 in FIG. 21 indicates the time window in which a reflection of transmitted signal reflected off a target object at the distance $d_{max}$ may be possibly returned to the sensing node (without any deflection). The length of reflection 2520 is also the same as the length of the active phase ($T_{on}$). The reflection 2520 has a portion 2522 falling in the passive phase ($T_{off}$). The portion 2522 represents the smallest portion of the reflection signals that will be received from targets in the sensing range where a trailing portion of the reflections will fall within the next active phase and be missed. Therefore, the portion 2522 should also at least be equal to $\alpha T_{on}$. The leading edge of section 2520 is thus ahead of the trailing edge of the passive phase by the same time period as portion 2522, at least equal to $\alpha T_{on}$, and delayed from the leading edge of the active phase by at least $T_{on}+T_{off}-\alpha T_{on}=(1-\alpha)T_{on}+T_{off}$.

Reflections 2510 and 2520 thus represent two worst case scenarios where the missing reflection portion is the maximum missed portion for all reflections from targets in the sensing range, or in other words, the received reflection portion is at the minimum.

Thus, to ensure at least the a proportion of any transmitted signal in a subcycle can be sensed when it is reflected from a target within the given range d, $d_{min} \leq d \leq d_{max}$, the passive phase ($T_{off}$) must be long enough to cover both the trailing a proportion 2512 of section 2510 and the leading a proportion 2522 of section 2520.

For given $d_{min}$, the least time it takes for the sensing signal to travel from the sensing node to a target in the range and for the reflection to travel back from the target to the sensing node is $2d_{min}/c$. For given $d_{min}$ and $\alpha < 1$, in order for the reflection to be received in the immediate next passive phase, the length of $T_{on}$ ($t_a$) must be less than or equal to $2d_{min}/(c\alpha)$, i.e., $t_a \leq 2d_{min}/(c\alpha)$. The upper limit for the length of the active phase $t_a$ is therefore $2d_{min}/(c\alpha)$. Or, inversely, for given $t_a$ and $\alpha$, $d_{min} \geq t_a c\alpha/2$, there is a lower limit on the sensing range.

For given $d_{max}$, $\alpha$, and $t_a$, in order for the leading a proportion 2522 of section 2520 to fall within the passive phase (during $T_{off}$) of the cycle/subcycle, the length of the passive phase ($t_p$) should be greater than or equal to $(2d_{max}/c - (1-\alpha)t_a)$. That is, $$t_p \geq 2d_{max}/c - (1-a)t_a, \text{ or } t_p/t_a \geq [ar - (1-a)].$$

Combining the above conditions for $t_a$ and $t_p$, the relationships among the parameters can be expressed as $$t_a \leq 2d_{min}/(ca), \text{ and } t_p \geq [ar - (1-a)]t_a.$$

The parameters $t_a$ and $t_p$ can thus be determined or selected once $\alpha$, $d_{min}$ and $d_{max}$ are known or obtained.

In different embodiments, different sensing cycles may have different values of $t_a$ and $t_p$ even though the lengths of the active and passive phases in each cycle are fixed.

In embodiments involving the use of beamforming and beam sweeping patterns for communication and sensing, the values of $t_a$ and $t_p$ may be different for different beams in a given beam sweeping pattern.

Conveniently, such embodiments provide a simple design, and less signaling overhead is required to communicate the signal parameters.

In some embodiments, the signal may be structured to have multiple subcycles in each communication and sensing cycle, where the subcycles have different or variable cycle lengths. In these embodiments, the signal may be defined by specifying the durations of the active and passive phases for different subcycles and cycles. Advantageously, because each sensing cycle has multiple subcycles and the durations of active (ON) and passive (OFF) phases can be different, these cycle lengths can be selected to ensure that the transmission in at least one subcycle can be sensed/received completely. Further, with variable cycle lengths, it is not necessary to have any prior knowledge of the environment statistics.

Figure 22:
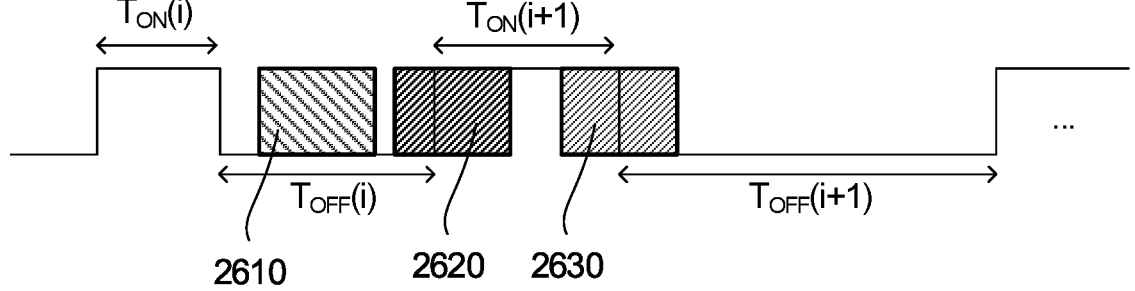
FIG. 22 is a schematic diagram illustrating a signal structure with variable cycle lengths according to an example embodiment of the present disclosure.

FIG. 22 illustrates an example signal structure where the lengths of the active phases ($T_{on}$) in different subcycles are different. The subcycles may be sequentially indexed with an index number i, and represented by the expression $t_a(i)$.

In FIG. 22, two subcycles, subcycle i and subcycle (i+1) are shown, with respective phase lengths $t_a(i)$ and $t_a(i+1)$. Time windows 2610, 2620 and 2630 represent different reflections of signals transmitted during active phase (i) and received at different time frames. The sufficient condition to receive at least one transmission completely is to have:

$$t_p(i) = t_p(i+1) \tag{1}$$

$$t_p(i+1) = t_p(i) + t_a(i) + t_a(i+1) = 2t_p(i) + t_p(i-1). \tag{2}$$

A solution to Equation (2) is, for any given $t_p(1)$, $t_p(i) = t_p(1)(1+\sqrt{2})^{i-1}$. The duty cycle ratio ($D_c$) is $$D_c = \frac{t_a}{t_p + t_a} = \frac{1}{2 + \sqrt{2}} \approx 29.29\%.$$

In the above embodiment, the conditions are set conservatively to ensure that there is no loss in the reception of reflections for at least one subcycle. In different embodiments where some loss (such as a $(=1-\alpha)$ portion of the reflected signal) is permissible, the lengths of the active and passive phases can be determined using the following recursive equations:

$$t_a(i+1) = [(1-\alpha)t_a(i) + t_p(i)]/\alpha, \tag{3}$$

$$t_p(i+1) = 2t_p(i) + t_a(i). \tag{4}$$

With variable phase (cycle or subcycle) length, sensing performance may be improved as it is possible to obtain full sensing signal reception in such embodiments, and it is not necessary to obtain information about the environment statistics, including the distance range of the targets in the environment.

In some applications, at a receiving node, during each passive sensing phase (or OFF cycle) of each ON/OFF cycle (or subcycle), some transmissions from a transmitting node will be detected by the receiving node (completely or partially). In order to have accurate estimate of the location of the object (based on delay), the receiver needs to know in which subcycle a particular received transmission was transmitted. The reason is that it is possible that a transmission in one subcycle is detected in a different subcycle.

Figure 23:
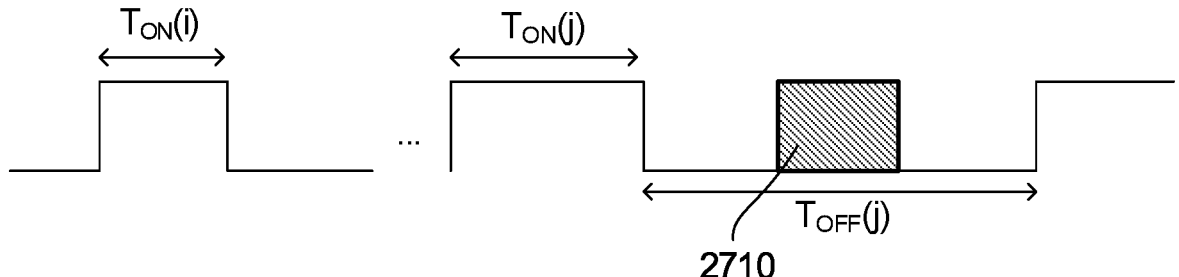
FIG. 23 is a schematic diagram illustrating a signal structure wherein a transmission is received in a different cycle, according to an example embodiment of the present disclosure.

For example, as shown in FIG. 23, the received signal 2710, which is received during the passive (OFF) phase of subcycle j, may possibly be transmitted during the active (ON) phase of subcycle j, $t_a(j)$, or subcycle i, $t_a(i)$, or another subcycle before subcycle j. Therefore, designing the sensing signal in each subcycle differently would provide a way to facilitate detection by allowing easy or convenient identification of the detected signal.

Using the example signal shown in FIG. 23 to illustrate, when the signal lengths (the lengths of the active phase) from different subcycles, such as subcycle i and subcycle j, are different, it can be conveniently determined that signal 2710 is transmitted during subcycle i based on the length of the detected signal 2710 and a determination that the length of signal 2710 matches the length of the active phase $t_a(i)$ of subcycle i. A possible advantage of using signals of variable cycle length is thus that as the duration of the active phase varies and is different from subcycle to subcycle, the different cycle lengths can be used to uniquely identify the particular subcycles, and a receiver of the signal can use the length information to determine the subcycle index of the associated subcycle by matching the cycle lengths.

In some embodiments, the signal frame structures may vary from cycle to cycle or from subcycle to subcycle, or the sensing sequence may be cycle-dependent. That is, the sensing signal in different cycles can have different sequences. In some embodiments, the sensing sequence may also be subcycle-dependent.

As an illustrative example, different ZC sequences or pseudo-noise (PN) sequences, such as with different lengths or different roots/generative polynomials, may be used in different subcycles to differentiate and identify the sub-cycles. Under this approach, even if only a portion of a transmitted or reflected signal is detected, the subcycle associated with the signal can be identified by analyzing the symbol sequences in the signal. In addition, when multiple transmissions are received completely (or even partially), sensing diversity may be achieved by combining the detected signals over different subcycles. If the receiver knows which received signal portion belongs to which subcycle of transmission, the reception performance can be improved and simplified. It may also help to improve Doppler estimation based on the received signals if the receiver can detect signals transmitted in consecutive sub-cycles and estimate the differential phase rotation between the pulses in one subcycle (intra-subcycle) and in consecutive subcycles (inter-subcycle). The sensing performance may be further improved by including more subcycles in each transmission or sensing cycle.

In some embodiments, it is possible to design a sequence for the entire set of active phases (or the "ON" cycles, e.g., $t_a(1), \ldots, t_a(M)$) and use a portion of the sequence during each subcycle. In this case, each subcycle may have a different sequence, from a different portion of the full sequence.

In some further embodiments, different sensing subcycles in a sequence of sensing subcycles may each have a fixed total cycle length. In this case, if the total duration of a sensing cycle is represented by $T_{se}$ and the number of subcycles is represented by M, then $T_{se}=M(t_a+t_p)$. Once $t_a$ and $t_p$ are determined or obtained based on a method described herein, a linear relationship between $T_{se}$ and M can be determined. Thus, in this case if the value of one of $T_{se}$ and M is known, the value of the other one can be readily determined.

In some embodiments, the total lengths of the subcycles may vary. In this case, in order to obtain at least one full reception of the signal transmitted during a transmission (active) phase or subcycle, the following relationship should be satisfied according to equations (1) and (2) above:

$$T_{se} = t_a(1)\left[\left(1 + \sqrt{2}\right)^{M+1} - \sqrt{2} - 1\right], \qquad (5)$$

where $t_a(1)$ is the duration of the active phase in the first subcycle, subcycle (1).

In Equation (5), there are 3 design parameters, $t_a(1)$, $T_{se}$ and M. From any two of these parameters, the third one may be determined based on Equation (5). For example, given $t_a(1)$ and $T_{se}$, the number of sub-cycles in each cycle can be calculated by:

$$M = \left\lceil \frac{\log\left(\frac{T_{Se}}{t_a(1)} + \sqrt{2} + 1\right)}{\log(\sqrt{2} + 1)} \right\rceil - 1.$$

Normally, $t_a(1)$ may be specified based on the sensing bandwidth, expected target distance, the sensing power, and one or more performance metrics such as sensing diversity or accuracy of velocity estimation based on the Doppler effect.

In some embodiments, $t_a(1)$ may be selected under the limiting condition that $t_a(1) \le (2d_{min}/c)$, where $d_{min}$ is the minimum detectable distance and c is the velocity of light, if the intention is to use the first subcycle in the signal cycles for detection of the closest targets. As a specific example, if the minimum detection range is 3 meters, $d_{min}=3$ m, $t_a(1)$ $\le 20$ ns.

In some embodiments, $T_{se}$ may be determined based on certain system parameters and requirements, such as sensing transmit power, sensing bandwidth, the number of beams (for beam steering to cover a given region), sensing over-head, one or more sensing performance metrics (e.g. posi-tioning accuracy), or the like.

In some embodiments, the frame structure of the trans-mitted signal may be designed or configured to facilitate or improve performance of integrated functions of communi-cation and sensing, such as to facilitate sensing and provide related signaling support. In addition, the frame structure of the transmitted signal may be designed or configured to minimize the negative impact to communications perfor-mance and maximize the adaptability to the already existing frame structure and signal design for communications.

For example, a "special frame" may be constructed, and explicitly defined for the active and passive phases in a cycle or subcycle of the transmitted sensing signal. The special frame may be defined based on the duration of the active and passive phases in terms of pre-defined units.

In some embodiments, an option is to define a "virtual" sub-carrier spacing (SCS) or "sensing" SCS, which may be very large, such as on the order of hundred MHz or more. The sensing SCS may be equal to a sensing bandwidth part (BWP). A BWP is the smallest bandwidth allocated for sensing. In practice, multiple BWPs may be allocated and used in combination for sensing. In this case, a basic sensing symbol may be defined as the inverse of the sensing SCS. This is to get the required time granularity for ON/OFF pattern. This way, the duration of all the ON and OFF periods (corresponding to active and passive phases) can be represented by multiples of the defined basic sensing sym-bol.

Defining a virtual SCS or sensing SCS does not imply or require that only multi-carrier transmission is permitted. Rather, single-carrier transmission may be included as a special case of multi-carrier transmissions where the SCS is equal to the entire transmission bandwidth.

In cases where the signal waveform is a single-carrier waveform, an alternative embodiment would be to define the basic sensing symbol length directly, e.g., $$T_{sym,se} = T_{sym,base} \cdot 2^{-n},$$

where $T_{sym,se}$ is the basic sensing symbol length for sensing and $T_{sym,base}$ is the symbol length for commu-nications, and n can be calculated from $n = \lceil \log_2(BW \cdot T_{sym,base}) \rceil$. As can be appreciated, this example follows the concept of scalable numerology, by scaling with a power of 2. The same method can be applied to multi-carrier waveform where $$T_{sym,se} = T_{sym,base} \cdot 2^{-n}, \text{ in which } n = \lfloor \log_2(SCS \cdot T_{sym,base}) \rfloor.$$

Figure 24:
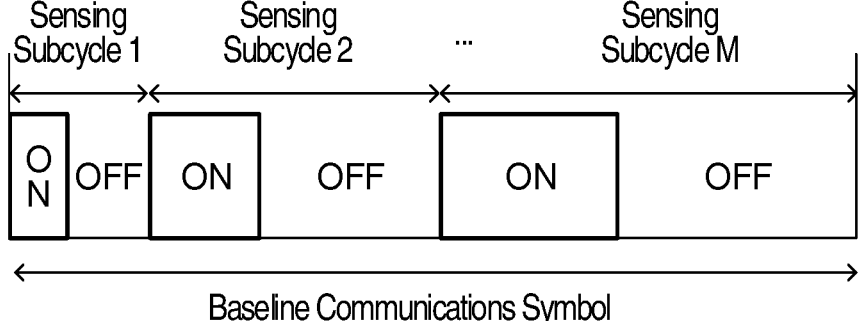
FIG. 24 is a schematic diagram illustrating a signal structure wherein sensing subcycles are aligned with a baseline communication symbol, according to an example embodiment of the present disclosure.

It is recognized that the timing granularity for sensing is much larger than for communications. Therefore, it may not be possible to align all active and passive phases in sensing with regular communications symbols. However, the sensing signal may be configured so that a selected number of the active and passive phases in the sensing signal are aligned with the boundaries of a communication symbol. This has the benefit of aligning of the communications/sensing transmission of one TRP with other TRPs in the network. An example is illustrated in FIG. 24, where the sensing sub-cycles 1, 2, . . . , M are aligned with a baseline communication symbol. It should be appreciated using this frame structure definition for communications and sensing signals, it may not be possible to embed or multiplex DL or UL communications data into the sensing signal.

Another aspect of the frame structure and numerology design for sensing signal is to use time space resource to replace frequency space resources. For example, in this regard a sensing BWP may be first defined and the numerology (basic sensing symbol time) may be subsequently defined and structured accordingly.

It has been recognized that a UE may not have the full capability of receiving and processing the entire sensing bandwidth. For example, the whole sensing bandwidth may be 1 GHz but some UEs can only process signals with a bandwidth of up to 250 MHz. In this case, if the sensing signal were to be transmitted with a single-carrier 1 GHz bandwidth, the UE would not have the frequency granularity to process it. However, if the sensing signal is transmitted as 4 separate sensing BWPs, with or without hopping, the UE can receive and process the entire signal bandwidth. In this case, the frequency hopping pattern can also be regarded as frame structure parameter and should be specified in addition to other sensing signal parameters.

By defining such frame structures and numerology, it is possible to map system parameters/requirements to sensing signal parameters.

Figure 20C:
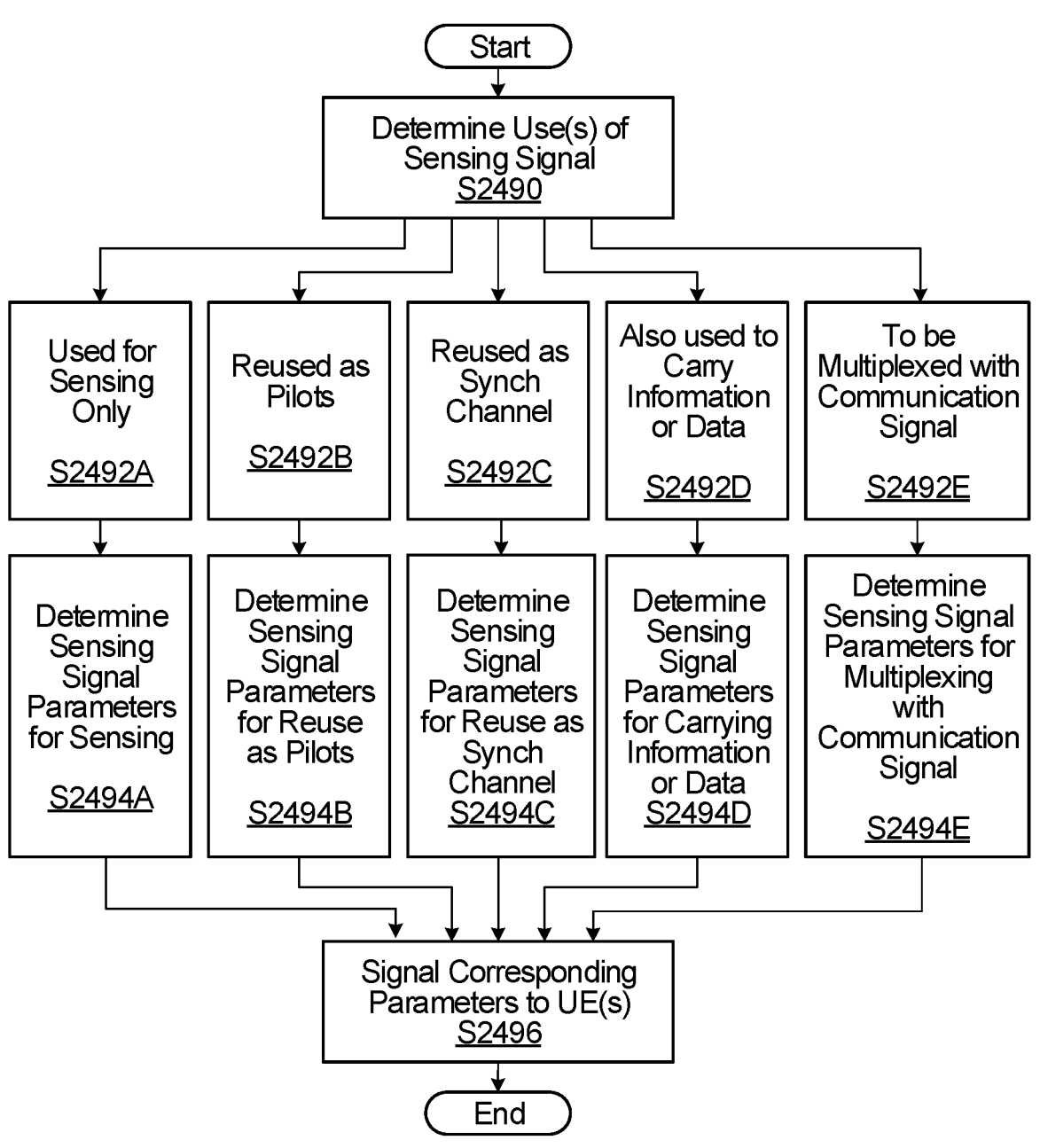
FIG. 20C is a flow chart illustrating an example operation process of an electronic device, according to an embodiment of the present disclosure.

The sensing signal may be configured for one or more purposes, and different sensing signal parameters may be signaled to an electronic device based on the different purposes or uses of the sensing signal, as illustrated in FIG. 20C.

At S2490, the purposes or uses of the sensing signal is determined, such as by a network entity, which can be a network device in a network, or a UE, or BS.

In some embodiments, the sensing signal is used only for a sensing purpose, as illustrated at S2492A in FIG. 20C. In this case, the frame structure should be defined in such a way to reserve certain time slots for sensing-only. A non-limiting example in which the transmission frame includes consecutive slots/symbols of UUUUSSSSSSDDDD, where U denotes the uplink slots or symbols, S denotes the sensing-only slots/symbols and D denotes the downlink slots/symbols. It should be understood that this example is merely for illustration, and frame structures with other combination and ordering of U, S, and D slots/symbols are possible. For example, the frame structure may be SSDSUSDDSUSU, or DDSSUUSDDUUSS, or the like.

In some embodiments, the configuration of the S symbols/slots can be different from the D and U symbols/slots. For example, the duration of the S symbols/slots can be chosen shorter than the duration of D or U symbols/slots. In some embodiments, S slots may be configured not to include synchronization (SYNCH) channel and/or basic broadcast channel. It can be understood that UE may not need to do blind control signal detection in S slots and may not transmit anything in S slots.

In some embodiments, the sensing signal may be reused as reference signals or pilots (such as common pilot) for channel measurement purpose, as illustrated at S2492B in FIG. 20C. An example frame in which the frame structure includes the symbol/slots of DDDSDDDSUUUU where S symbols/slots contain reference signals which are used for channel measurements at the UE side. In this case, the UE may need to know the sensing signal parameters including parameters for the frame structure, such as the sensing symbol/slot indices and sensing symbol/slot duration, waveform type, waveform parameters, pilot sequence and the like.

In some other embodiments, the sensing signal may be reused as a synchronization (SYNCH) channel, as illustrated at S2492C in FIG. 20C. An example frame in which the frame structure includes the symbol/slots of SSSSDDDD-UUUU, where the S symbols/slots can be reused as a SYNCH channel. In this case, the UE may need to know the sensing signal parameters including the BW of the SYNCH signal, the frame structure such as the sensing symbol/slot indices, the SYNCH channel indices among the sensing symbols/slots, the sensing symbol/slot duration, the waveform type, waveform parameters, the SYNCH channel sequence, and the like.

In some embodiments, when the sensing signal is transmitted by a UE, the sensing signal can be reused as initial access channel. For example, a slot/symbol in the frame structure may provide an initial access channel. In this case, the UE may need to know the sensing signal parameters including the BW of the initial access signal, frame structure including the sensing symbol/slot indices and the initial access channel indices among the sensing symbols/slots, sensing symbol/slot duration, waveform type, waveform parameters, initial channel sequence, and the like. In some embodiments, this information may be signaled by the network to the UE. In some other embodiments, a part of the information may be obtained by the UE through a mapping function between UE identification (id) and the parameter. For example, an initial access sequence can be obtained by the UE through a mapping function between the UE id and the initial access sequence.

In some embodiments, when the sensing signal is transmitted by a UE, the sensing signal can also carry information or communications data such as signaling data, control data, or payload data, as illustrated at S2492D of FIG. 20C. The communications data may be embedded in the sensing signal by any suitable multiplexing technique, as illustrated at S2492E of FIG. 20C. An example frame has M slots/symbols for sensing signals multiplexed with communications data. Some of the sensing symbols/slots may be used for sensing only (denoted as S), while other sensing symbols/slots are multiplexed with communications data.

In some embodiments, when the sensing signal is transmitted by a UE, the sensing signal can also carry embedded communications data. Some of the sensing symbols/slots may be used for sensing only, while other sensing symbols/slots are used to embedding communications data.

While it is not necessary for target sensing, the sensing signal may nonetheless be configured to carry information and data. For example, a TP operating in the HDX monostatic mode may embed data in the sensing signal transmission so that UEs can receive and decode the signal to obtain the transmitted data and information. Such an embodiment may save the overhead of sensing by performing both functionalities of communications and sensing simultaneously. When the same node transmits the sensing signal and communication signal, and processes the reflection of the sensing signal, the node would already have knowledge of the transmitted communications/sensing signal, embedding communications data in the signal does not affect the sensing performance.

For example, the sensing signal may include broadcast information intended for all UEs in a coverage area. The sensing signal may also include multicast or groupcast information or data. In some embodiments, the sensing signal may include unicast data and information if beamforming is applied.

In some situations, the TP can use the sensing signal to send location-dependent information to the UEs in a given area, which would be of interest to all UEs in the area. In such a case, the UEs need to know the configuration details of the sensing signal in order to decode the signal, and refrain from transmitting during the transmission period(s) of the TP. This requirement would need to be addressed by the signal design or configuration.

For example, the structure of the signal should allow convenient and reliable detection of a sufficient portion of the transmitted signal so that the transmitted data or information can be communicated to from the TP to the UEs.

In some embodiments, when only very limited information is to be carried by the sensing signal, a SeN can use different sensing sequences to communicate this information. For example, a TP can select the sensing sequence from a set of sensing sequences, $S=\{S_1, S_2, \ldots, S_2^M\}$, to carry M bits of information. In this case, a receiver of the information may need to have knowledge of the set of sensing sequences S, or an indication of the set. In some embodiments, a plurality of sensing sequences may be transmitted to carry more information. For example, if N sequences are transmitted each containing M bits of information, the total of N*M bits can be carried in the sensing signal.

It is recognized that the timing granularity for sensing is much larger than for communications and hence the duration of the basic sensing symbol is much shorter than the regular communications symbol duration defined, for example, in NR (New Radio). If communications data is to be embedded in the sensing signal, the communications symbol should not be longer than the duration of the active phase when the node is transmitting the communications/sensing signal, and the duration of the communications symbol should not be longer than the duration of the passive phase when the node is receiving the communications/sensing signal.

In some embodiments, sensing-specific or special communications frame structure can be defined for the transmission frames sensing is performed. As an example, sensing-specific or special communications frame structure and numerology can be defined to follow the sensing frame structure such that each DL symbol follows the corresponding active phase and each UL symbol follows the corresponding passive phase. This way, when a TRP is performing active sensing, the TRP can embed DL data into the sensing signal, and during the passive sensing phase, the TRP can simultaneously detect reflection of sensing signal and UL data. This way, communications signal follows the same frame structure and numerology as the sensing signal, which simplifies signaling, transmission, and reception of the signals.

Another aspect to be considered when embedding data into the sensing signal is that sensing and communications performance optimization may require different parameter settings. For instance, when a single-carrier waveform is used for communications/sensing, partial overlapping between base pulse shaping functions may improve the sensing performance but may have a negative impact on the communications performance due to intersymbol interference (ISI). Therefore, to embed communicate data and information in the sensing signal with a single-carrier waveform where the base functions partially overlap, an upper threshold for the partial overlap ratio may be set to limit or minimize ISI. In addition, the pulse shaping functions may be selected or structured to limit or minimize interference to neighboring pulses in the time domain.

In some embodiments, when a multi-carrier waveform, such as CP-OFDM, is used for communications/sensing, the parameters of the signal design including the CP length may be designed or selected according to the requirement of the communications/sensing performance.

In some embodiments, depending on the durations of the active and passive phases in a sequence of cycles with subcycles, a first subset of the subcycles may be configured to carry information for the UEs and a second subset of the subcycles may be configured to carry no information or data.

With such configurations of the sensing signal to carry data or information, signal resources are more efficiently utilized.

In some embodiments, data may be included in the sensing signal by multiplexing, such as for communicating data to UEs. In this context, multiplexing refers to including communication data in a transmission frame of a sensing signal that is originally envisioned for sensing operation. Such communication may be desired, for example, in cases of urgent data transmission to selected UEs. For example, in an urgent situation, the sensing signal may be reconfigured temporarily to embed the data to be sent to the UEs. In such a case, the SeN or TP transmitting the signal does not need to decode the reflected signal, and sensing performance is not compromised by embedding the data in the sensing signal.

As an example, in some embodiments, communication of data and sensing signal with multiplexing may be carried out through a downlink (DL) data transmission, such as from a TP (e.g. a base station) to one or more UEs. The TP may construct the sensing signal based on any suitable method or technique as described herein. Depending on the resource allocation for the UEs scheduled to receive DL transmission data, the sensing signal may be filtered before transmitted through the DL channel to reduce or avoid interference with the DL signals received by the UE(s). Such filtering is also referred to as "puncturing" of the sensing signal by data. Puncturing can be done in the frequency domain or in the time domain. The data transmitted with the sensing signal to the scheduled UEs can include either or both of control data and payload data. In some embodiments, the TP may send a notification to the UE(s) indicating the upcoming scheduled transmission over the current or upcoming sensing cycle or subcycle, which may indicate one or more of, for example, the sensing subcycle index, time resource scheduling index, frequency resource scheduling index, beamforming index, and the like. This notification can be provided by dynamic signaling (L1 signaling). In different embodiments, this notification may be sent over the same or a different carrier/link than the carrier/link for the data/sensing transmission. In some embodiments, an allocated frequency and time resource for data transmission may be pre-selected/determined, and the UE(s) can monitor the particular allocated resource to determine if there is any upcoming transmission of a sensing signal with data.

In some embodiments, communication of data and sensing signal with multiplexing may be carried out through an uplink (UL) data transmission. The UE may perform UL data transmission during the passive phase (OFF cycles) at TP, and the TP may perform both UL and sensing detection at the same time during the passive phase. It is possible for the TP, or the network, to select or define some subcycles in each cycle for UL data transmission, and the UE can then be scheduled, or be configured to perform, UL transmission during these selected subcycles. Such an approach may be taken for UL grant-free or configured grant transmission, which is delay sensitive and should be transmitted as soon as possible. For UL transmission to be performed in only designated subcycles, the UE needs to know which subcycles are designated and configured for UL transmission, and the configuration/frame structures of these designated sub-cycles. Such information can be signaled to the UE(s) through a higher layer signaling, such as RRC or MAC-CE. In some embodiments, more detailed information including the time/frequency transmission resource, beamforming information, power control, and modulation and coding scheme (MCS) of the UL transmission can also be determined and communicated to the UE. The detailed information may be communicated to the UE(s) through dynamic signaling, such as L1 signaling, or through a higher layer signaling.

In some embodiments, communication of data and sensing signal with multiplexing may be carried out through a sidelink (SL) data transmission. In case the SL signal is transmitted from the UE performing the sensing transmission, the multiplexing procedure and signaling follows the sensing and DL data multiplexing. In case the SL signal is received by the UE performing the sensing detect, the multiplexing procedure and signaling follows the sensing and UL data multiplexing. In case the sensing signal is transmitted from another node (other UE or a TP), multiplexing might not be required in some scenarios, including when the receiver of the sensing signal is sufficient far from the transmitter of the SL signal. For example, if the TP is performing sensing and it is far from the SL transmitter, the SL signal does not affect the sensing performance, and hence the SL signal transmission may not change. However, if SL transmission might affect the sensing reception, the SL transmission may be scheduled for transmission during the active phases of the sensing transmission. In some embodiments, the SL transmission may be scheduled to take place during a subset of subcycles of sensing transmission frame. For SL transmission to be performed in only designated subcycles, or active phases of selected subcycles, the UEs need to know which subcycles are designated and configured for SL transmission, and the configuration/frame structures of these designated subcycles. Such information can be signaled to the UEs through a higher layer signaling, such as RRC or MAC-CE. In some embodiments, more detailed information including the time/frequency transmission resource and power control, and modulation of the SL transmission can also be determined and communicated to the UEs. The detailed information may be communicated to the UEs through dynamic signaling, such as L1 signaling, or through a higher layer signaling.

Communication of data and sensing signal with multiplexing may improve resource efficiency and interference management.

The sensing signal may be further constructed or configured to address various technical problems that may arise. For example, a potential problem that may arise is that, for a given sensing bandwidth (BW) and frame structure based on pulse sensing, where $t_a$ may indicate the duration of the active phase in a particular subcycle, or the total duration of all active phases in all subcycles within a given cycle, i.e.

$$t_a = \sum_{i=1}^{M} t_a(i),$$

how to configure the sensing signal s(t) to provide satisfactory or improved sensing performance, particularly range resolution, with a minimum out-of-band leakage or equivalently spectrum localization.

As can be understood, spectrum localization may mainly depend on the waveform and pulse shaping of the sensing signal.

The range accuracy performance depends on the characteristics of the signal autocorrelation function $R_s(\tau)$, which may be expressed as:

$$R_s(\tau) = \int_{-\infty}^{\infty} s(t - \tau)s^*(t)dt.$$

More generally, to also take into account of the Doppler effect, a suitable metric for assessing autocorrelation is the ambiguity function given by:

$$\chi(\tau, f_d) = \int_{-\infty}^{\infty} s(t - \tau)e^{j2\pi f_d t}s^*(t)dt,$$

where $f_d$ is the Doppler frequency. The ambiguity function $\chi(\tau, f_d)$ reduces to the autocorrelation function $R_s(\tau)$ when the Doppler shift is zero, i.e., when $f_d=0$, $R_s(\tau)=\chi(\tau, 0)$. To improve range accuracy, it is desirable to reduce $R_s(\tau)$ for $\tau \neq 0$ to a very small value.

In embodiments where a node is operated to receive communication and sensing signals in a HDX monostatic mode, a portion of the signal transmitted to the node from another node can be missed at the node (i.e. not received) when the node is in its active phase (transmitting phase). In this case, a more proper metric may be an aperiodic autocorrelation function, which may be expressed as $r_s(\tau)$, $r_s(\tau)=\int_{T_{off}} s(t-\tau)s^*(t)dt$, where the integration is over the passive phase during which the SeN can listen to the reflected signal.

It is desirable to provide a signal structure or configuration, which is flexible to provide the needed sensing parameters even when a portion of the reflected signal is missed and not detected/sensed by the SeN during the passive phases. In other words, the signal is structured so that the needed parameters are provided by a portion of the signal that will be received by the SeN during a passive phase. Such a portion in the signal can be located at the end of the signal or at the beginning of the signal depending on the target distance.

Regardless of the signal shape, a signal with a bandwidth of BW can have N degrees of freedom available for signal design, where $N=BW*t_a$. For example, if BW=1 GHz and $t_a$=100 ns, there are 100 degrees of freedom for the signal design. That is, the signal can be characterized by 100 mutually orthogonal signal structures over the time period of 100 ns ($t_a$). In the mathematical form, $$s(t) = \sum_{n=1}^{N} c_n s_n(t),$$

where $$\int_{t_a} s_n(t) s_m^*(t) dt = 0 \text{ for } n \neq m,$$

where $c_n$ represents the weighting symbols (symbol sequence). As will be discussed later, the orthogonality condition may be relaxed in some embodiments.

The design parameters for a signal used in a HDX monostatic system can thus include base functions $$\left( \{s_n(t)\}_{n=1}^{N} \right)$$

and weighting symbols $$\left( \{c_n(t)\}_{n=1}^{N} \right),$$

which may also be referred to as the "sensing signal sequence."

The weighting symbols $$\{c_n(t)\}_{n=1}^{N}$$

can affect both autocorrelation and spectrum shape, but their main impact would be on autocorrelation, particularly aperiodic autocorrelation.

Once an optimized set of the weighting symbols and aperiodic autocorrelation functions are determined, the optimized weighting symbols and autocorrelation functions may be saved and stored for further use in different applications.

While other, or more optimal, signal sequences may be determined and used depending on the particular applications in various embodiments, some example sequences, such as the ZC sequences, are discussed next for illustration purposes.

For a single-carrier waveform, the orthogonality domain of the base function is in the time domain. In other words, each function $s_n(t)$ spans only a portion of the time duration: span($s_n(t)$)=[$t_{n,1}$, $t_{n,2}$] such that $$\bigcup_{n=1}^{N} \text{span}(s_n(t)) = t_a.$$

In case of orthogonal base functions, span($s_n(t)$)∩span($s_m(t)$)=ϕ.

Figure 25:
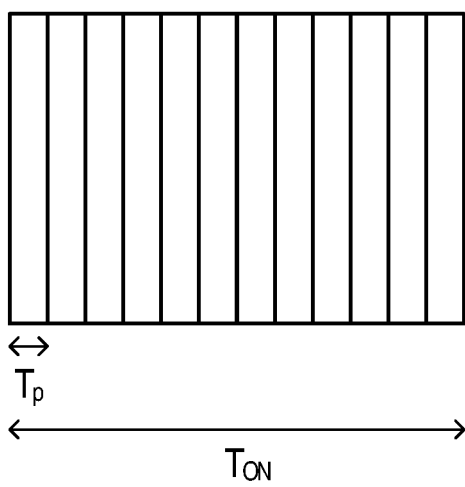
FIG. 25 is a schematic diagram illustrating a single-carrier signal waveform with no overlap between adjacent pulses.

One way to provide the above properties is to divide the active phase ($T_{on}$) into N equal time slots and construct the sensing signal as $$S(t) = \sum_{n=1}^{N} c_n S_p(t - nT_p),$$

where $S_p$ is an ultra-narrow pulse signal with duration $$T_p = \frac{T_{ON}}{N},$$

as illustrated in FIG. 25 with N=12.

For communication purposes, it is desirable to receive all of the information carried by a transmitted signal, and any interference between the base functions can be destructive and should be avoided. For this reason, it may be desirable to use orthogonal (or semi-orthogonal) base functions with no or only minimal overlap for communications. For radar-based sensing, however, it is not necessary to receive, for example, all the symbols carried by the signal and it may be sufficient to be able to obtain certain information for assessing some properties of the signal. Therefore, the orthogonality conditions can be more relaxed for sensing purposes.

Figure 26:
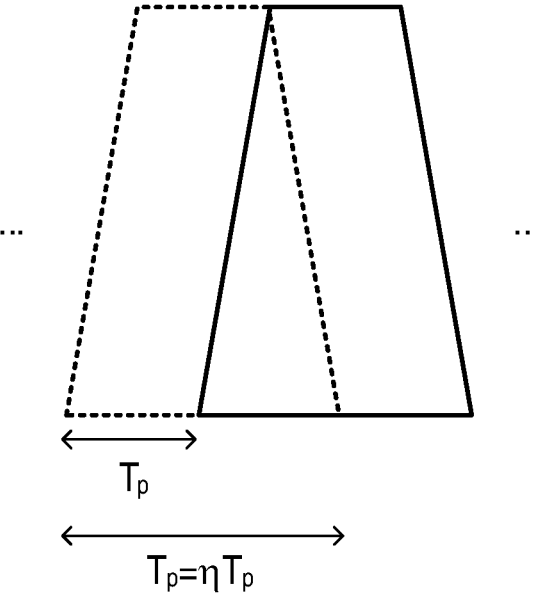
FIG. 26 is a schematic diagram illustrating a single-carrier signal waveform with overlapping of pulses.

Accordingly, in some embodiments, the signal may be configured to have pulse shapes that partially overlap, as illustrated in FIG. 26. In this case, the signal may be expressed as:

$$S(t) = \sum_{n=1}^{N} c_n S_p(t - nT_p),$$

where $S_p$ is the prototype function with duration $T_w = \eta T_p$, and $$T_p = \frac{t_a}{N}.$$

The parameter $\eta$ may be referred to as a time stretching factor, which indicates the extent of overlap between adjacent base functions.

The shape of $S_p$ determines the frequency spectrum, and can be selected by those skilled in the art. In some embodiments, $S_p$ may be a Gaussian function such as those used in ultra-wideband (UWB) pulses), a sinc function, or a raised cosine function, or the like.

Allowing the signal base functions $S_n(t)$ to partially overlap in time would provide more efficient use of the time resources in the context of integrated communications and sensing signal for HDX monostatic operation.

Conveniently, the partial overlap of the signal base functions allows extension of the time duration of useful signal and more fuller or efficient use of the available time resource, and allows designing pulse shaping filters to control the out of band leakage.

In some embodiments, the sensing signal may have a configurable multi-carrier waveform. The sensing signal may be configured with filtered-CP-OFDM and configurable CP length.

In a multi-carrier waveform, the base functions can be expressed as:

$s_n(t) = c_n \exp(j2\pi n\Delta ft) S_p(t)$, for $0 \leq t \leq T_{on}$, where $$\Delta f = \frac{1}{T_{ON}}.$$

The prototype function $S_p(t)$ may be optimized for spectrum localization.

With a multi-carrier waveform, all base functions can completely overlap with each other in the time domain, but they are mutually orthogonal over the time span of $0 \le t \le t_a$.

In the above expressions of the base functions, $s_n(t)$ are continuous functions. In practice, sampled versions of $s_n(t)$ will be constructed and transmitted, which is equivalent to inverse fast Fourier transformation (IFFT) of the symbol sequence $c_n$. In addition, a CP can be inserted after IFFT.

For HDX monostatic sensing, a portion of the sensing signal may be missed when the SeN is in the active phase. Thus, the signal structures for HDX monostatic sensing need to be configured differently to account for such missed signal portion, as compared with normal communications transmission or full-duplex sensing, where the entire signal can be received and processed at the receiver side. For example, cyclic-prefix (CP) may not be necessary, as a CP may be completely missed in any event. In some embodiments, however, CP may be used to provide better range response or frequency localization.

Thus, in some embodiments, the multi-carrier waveform may be structured to include configurable filtered-CP-OFDM, where the CP length is adjustable to balance the tradeoff between sensing performance (aperiodic autocorrelation function) and spectrum localization, and filtering is performed to further enhance spectrum localization.

Figure 27:
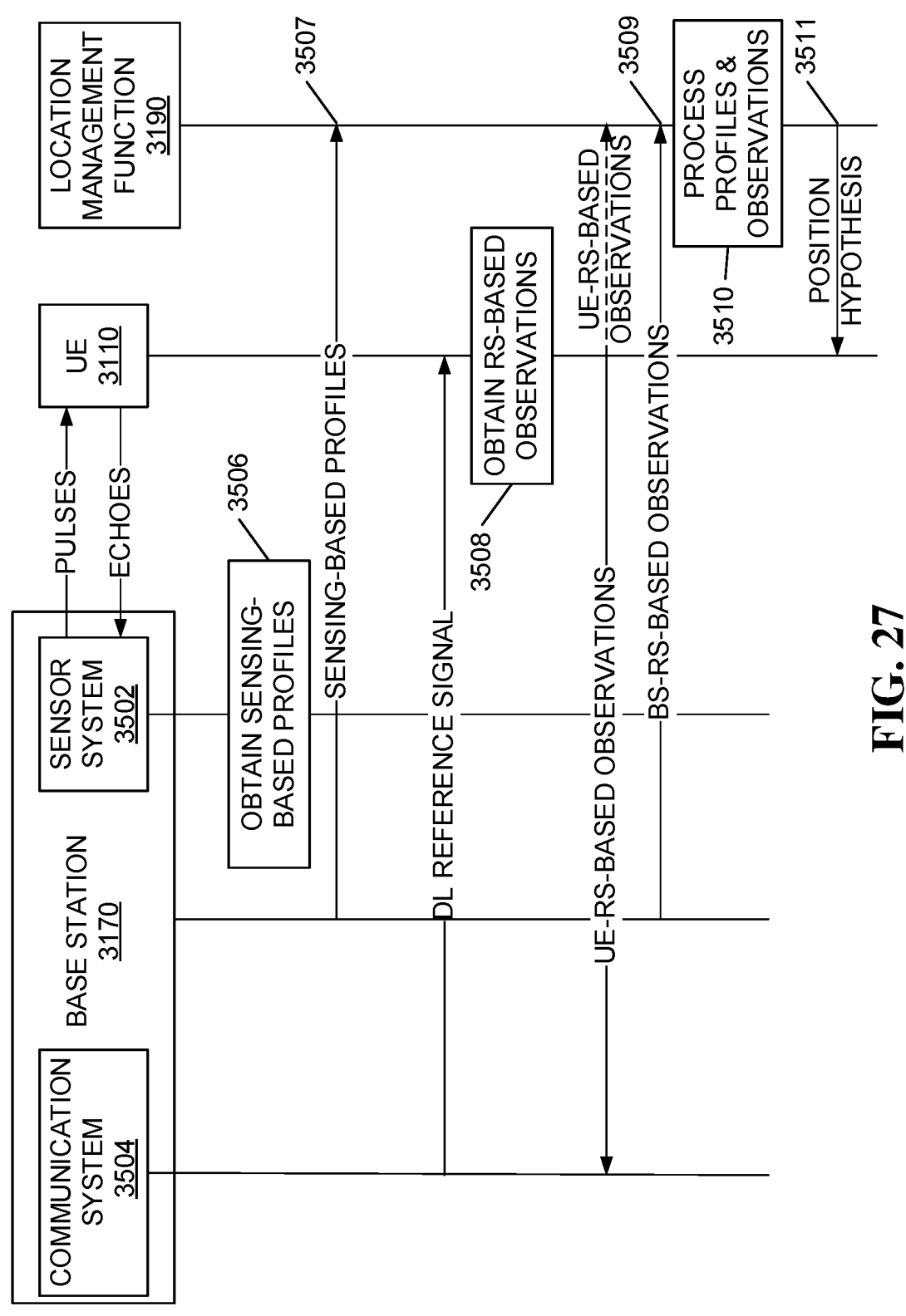
FIG. 27 illustrates, in a flow diagram, interaction between elements of the network of FIG. 1, including an example base station, an example user equipment and an example location management function, in accordance with aspects of the present application.

FIG. 27 illustrates, in a flow diagram, interaction between a base station 3170, a UE 3110 and the location management function 3190. The base station 3170 includes a sensor system 3502 and a communication system 3504.

Determining a position for a particular UE 3110 using a sensing-based system is hindered in view of the existence of multiple agents in the environment. In practice, a given cellular communications network is packed with many UEs 3110. A position is to be determined for each of the UEs 3110.

Using a sensing-based system (such as a radar system) external to a cellular communication system may be seen to allow for a determination of a position for a particular UE 3110.

Unfortunately, sensing-based system observations, such as radar echoes, provide little information that can be usefully exploited to infer an identity of a particular UE 3110 associated with a particular radar echo. That is, given multiple radar echoes received from multiple UEs 3110, it is expected that there will be ambiguity regarding which radar echo to associate with which UE 3110 and vice versa.

When there is an incorrect association of observations to a particular UE 3110, effects on the accuracy of position estimation for the particular UE 3110 can be expected. Indeed, some of the effects on the accuracy may be characterized as catastrophic. Inaccurate position estimation may be shown to result in erratic jumping (ranging from tens of meters to hundreds of meters) of the estimated position of the particular UE 3110 at consecutive times. Such position jumping cannot be physically justified given the limited kinematics of UEs 3110 in general.

Conventional methods involving a BS 3170 and a UE 3110 exchanging DL and UL reference signals in a cellular communication system to allow for a determination of a position for the UE 3110 are well-known. Similarly, methods of using a sensing-based system (such as a radar system) separate from a cellular communication system to allow for a determination of a position for a UE 3110 are also well-known. Furthermore, methods that combine reference signal exchanging methods and hardware-based sensing-based system methods have been gaining research attention.

It may be shown that implementing methods that combine reference signal exchanging methods and hardware-based sensing-based system methods is not straightforward. Indeed, reference signal exchanging methods and hardware-based sensing-based system methods may be seen to rely upon fundamentally distinct technologies.

In overview, according to aspects of the present application, a location management function receives, from a sensor system, a sensing-based profile from which a sensing-based observation of a UE may be determined and receives, from a communication system, a reference-signal-based observation of the UE. The location management function may derive, from the sensing-based observation, a particular position hypothesis and may determine, from the reference-signal-based observation, UE identity information for the UE. By processing the reference-signal-based observation in conjunction with the sensing-based observation, the location management function may determine an association between the sensing-based observation and the reference-signal-based observation. The location management function may then transmit, to the UE having the UE identity information determined from the reference-signal-based observation, an indication of the particular position hypothesis that is associated to that UE, where the particular position hypothesis has been derived from the sensing-based observation.

According to aspects of the present application, a sensor system radiates a pulse of energy and receives echoes of the pulse from one or more UEs 3110. Due to the shared nature of the wireless medium over which the pulse travels, it is clear that a single pulse can result in radar echoes returned from more than one of the UEs 3110. The sensor system records each of the radar echoes to allow for processing. The processing of the information in these recorded radar echoes leads to a condensing of the information down to a limited set of features. The features may, for example, include: round-trip delay; angle of arrival; Doppler shift; and received power. These features may be referenced as "observations" hereinafter.

In general terms, location determination begins with a sensing episode, continues with a reference signal exchanging episode, proceeds with a processing episode and concludes with a location indication episode. Notably, the sensing episode and the reference signal exchanging episode may occur in any order and may even occur contemporaneously.

Initially, the sensor system 3502 transmits a sensing signal, which may, for example, be a radar pulse. During the sensing episode, the sensor system 3502 receives echoes, of the sensing signal, from the UE 3110 and from other objects in the environment of the communication system 3100.

The sensor system 3502 may then obtain (step 3506) sensing-based profiles. The sensing-based profiles may be representative of geometric range measurements and/or angle measurements. Recall that radar-based sensor systems often use a transceiver (not specifically shown) that continuously rotates 360 degrees about a central axis. Notably, radar-based sensor systems do not necessarily rotate mechanically to steer the direction of a beam. In other radar-based sensor systems, the beam may be rotated electronically while the hardware remains static. The geometric range measurements may be understood to relate to a distance between the transceiver and the origin of the echoes. The angle measurements may be understood to relate to a span of angles offset from a reference angle on the circle around the central axis, where the origin of the echoes may be characterized by the span of angles in which the echoes are received. Upon completion of the obtaining (step 3506) of the sensing-based profiles, the BS 3170 transmits the sensing-based profiles to the location management function 3190. The location management function 3190 obtains (step 3507) the sensing-based profiles. In the context of the LMF 3190 obtaining (step 3507) the sensing-based profiles, the BS 3170 may be generically called a profile origin.

During normal operation, the communication system 3504 transmits downlink (DL) reference signals that may be received and processed by various entities in the communication system 3100, including the UE 3110. The DL reference signals are typically high-power and wideband signals.

Upon receipt of the DL reference signals, the UE 3110 may obtain (step 508) UE reference-signal-based (UE-RS-based) observations. The UE 3110 may then transmit an uplink (UL) reference signal to the base station 3170. The UL reference signal may include the UE-RS-based observations and an indication of the identity of the UE 3110. Alternatively, or additionally, the UE 3110 may transmit the UE-RS-based observations to the location management function 3190 along with the indication of the identity of the UE 3110. The location management function 3190 obtains (step 3509) the BS-RS-based observations.

The communication system 3504 receives the UE-RS-based observations from the UE 3110. Conveniently, as discussed hereinbefore, the UE-RS-based observations include UE identity information for the UE 3110 at which the UE-RS-based observations have been obtained. Responsive to receiving the UE-RS-based observations, the base station 3170 may obtain BS-RS-based observations. The base station 3170 may then transmit the BS-RS-based observations to the location management function 3190. Conveniently, the BS-RS-based observations include the UE identity received as part of the UE-RS-based observations.

Upon having received both the sensing-based profiles and the RS-based observations, the location management function 3190 may process (step 510) the profiles and the observations.

The processing (step 3510) of the sensing-based profiles may be accomplished, in one aspect, by way of a Doppler analysis. The Doppler analysis may be used, by the location management function 3190, to separate echoes originating at the (mobile) UE 3110 from echoes originating at (static) clutter in the environment. The echoes originating at the (mobile) UE 3110 may be regarded as foreground signals. The echoes originating at the (static) clutter may be regarded as background signals.

On the basis of combining the geometric range measurements and the angle measurements, sensing-based observations may be determined on the basis of the profiles and the location management function 3190 may derive, from the sensing-based observations, a position to associate with the UE 3110 that was the origin of the echoes.

The processing (step 3510) of the sensing-based profiles and the BS-RS-based observations may involve determining sensing-based observations on the basis of the sensing-based profiles and may, subsequently, lead to matching a particular one of the BS-RS-based observations to a particular one of the sensing-based observations. Notably, since the position has been derived from the sensing-based observations and the UE identity information has been determined from the BS-RS-based observations, the processing (step 3510) may, in part, include associating the position, which was derived from the particular sensing-based observation, with the UE identity information, which was determined from the particular BS-RS-based observation.

The location management function 3190 may then transmit (step 3511), to the UE 3110 having the UE identity information determined from the reference-signal-based observation, an indication of the position derived from the sensing-based observation. Notably, indication of the position is not necessarily intended for transmission (step 3511) to the UE 3110. Instead, the indication of the position can be used for other tasks. The other tasks include predicting future mobility of the UE 3110. The other tasks include management of beams transmitted from the BS 3170. Beam management is discussed hereinafter.

The sensing-based observations may, for one example, be Round Trip Time, RTT, measurements. In such a case, for matching purposes, it is convenient that the BS-RS-based observations are also RTT measurements.

RTT may be considered to be the time taken by a signal to travel from the BS 3170 to the UE 3110 and then back to the BS 3170. For the sensor system 3502, in one example, the outbound signal is a radar pulse and the inbound signal is an echo of the radar pulse. For the communication system 3504, the outbound signal is the DL reference signal and the inbound signal is the UL reference signal including the UE-RS-based observations.

Figure 28:
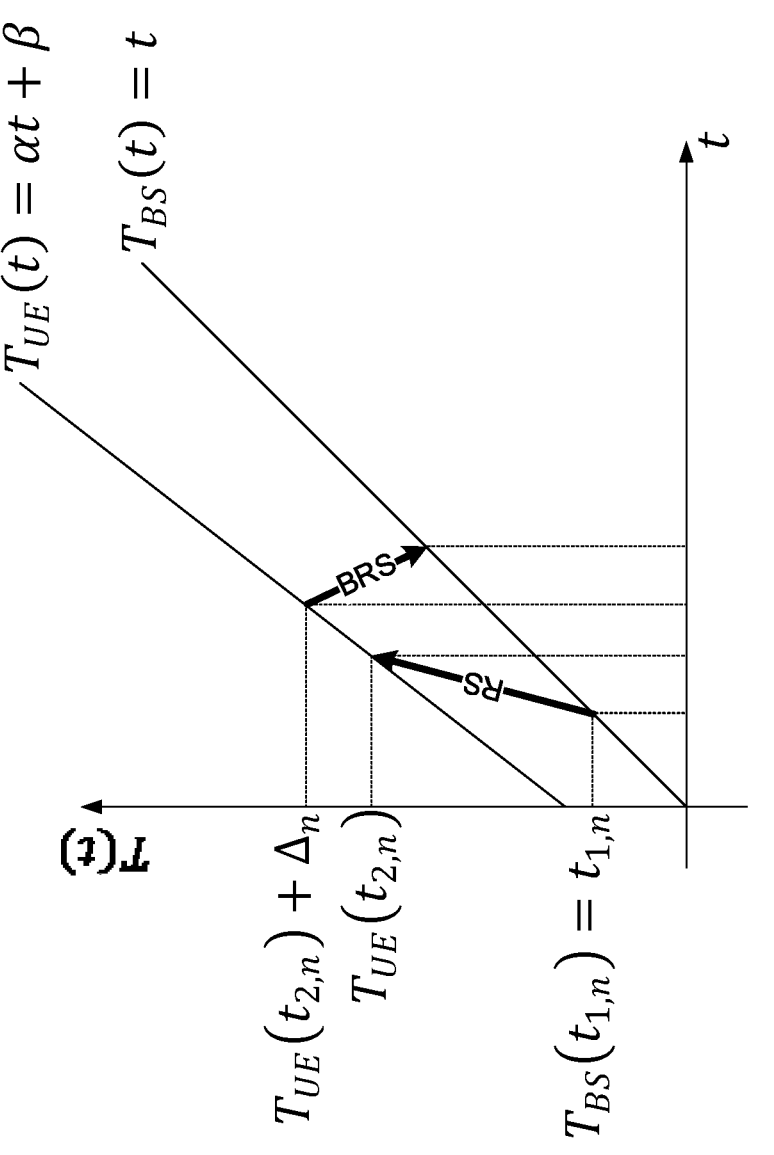
FIG. 28 illustrates a plot used to explain clock bias.

In FIG. 27, there is only one BS 3170 in the network. Accordingly, it may be considered that measurements carried out at the BS 3170 will be affected by a clock bias. The clock bias may be understood through a review of a plot illustrated in FIG. 28. The plot illustrated in FIG. 28 includes a first line, $T_{BS}(t)$, representative of a base station time frame and a second line, $T_{UE}(t)$, representative of a user equipment time frame. The first line is described by a first function, $T_{BS}(t)=t$. The second line is described by second function, $T_{UE}(t)=\alpha t+\beta$, where $\alpha$ represents UE clock skew and $\beta$ represents the UE clock bias.

A reference signal transmitted, by the BS 3170, at a time $t_{1,n}$ arrives at the UE 3110 at a time $t_{2,n}=t_{1,n}+\tau$, where $\tau$ is a one-way propagation delay. The UE 3110 receives the DL reference signal, processes the DL reference signal, accesses data to obtain UE-RS-based observations and transmits an UL reference signal, including the UE-RS-based observations, to the base station 3170. These four actions each contribute to a UE delay, $\Delta_n$, where $$\Delta_n =$$

$$\text{reception delay} + \text{processing delay} + \text{access delay} + \text{transmission delay}.$$

The UL reference signal transmitted, by the UE 3110, at a time $t_{3,n}$ arrives at the BS 3170 at a time $t_{4,n}=t_{3,n}+\tau$.

The communication system 3504 may determine a reference signal round trip time, $RTT_p$. Determining the $RTT_p$ at the communication system 3504 involves obtaining a difference between the time the DL reference signal was sent (time $t_{1,n}$) and the time the UL reference signal was received (time $t_{4,n}$). That is, $$RTT_p = t_{4,n} - t_{1,n}$$

$$= t_{3,n} + \tau - (t_{2,n} - \tau)$$

-continued $$= 2\tau + t_{3,n} - t_{2,n}$$

$$= 2\tau + \frac{\Delta_n}{\alpha}.$$

In the case of obtaining (step 3506) a sensing-based round trip time, $RTT_s$, it is notable that there are no delays at the UE 3110, since the radar pulse is merely reflected, not processed. It follows that an echo departs from the UE 3110 as soon as the radar pulse arrives at the UE 3110 and $RTT_s=2\tau$. If the sensing-based round trip time, $RTT_s$, is considered in terms of the RS-based round trip time, $RTT_p$, then it may be considered that $\Delta_n=0$ for $RRT_s$ estimation. It may further be considered that the accuracy of the processing (step 3510) of the profiles (to determine sensing-based observations) and the observations to find matches between the sensing-based observations ($RTT_s$) and the RS-based observations ($RTT_p$) would be expected to improve as the UE delay, $\Delta_n$, component of the RS-based observations approaches zero.

Depending on hardware speed, access mechanism and how much processing is performed on the received data inside a protocol stack at the UE 3110, the UE delay, $\Delta_n$, can be a few orders of magnitude larger than the one-way propagation delay, $\tau$. This leads, problematically, to an expectation that $RTT_p \gg RTT_s$.

However, aspects of the present application relate to the UE 3110 determining an estimate, $$\Delta'_n,$$

for the value of the UE delay, $\Delta_n$, and reporting the estimate, $$\Delta'_n,$$

to the location management function 3190. Subsequent to receiving the estimate, $$\Delta'_n,$$

the processing (step 3510) of the profiles and the observations at the location management function 3190 may involve applying a correction to the BS-RS-based observations, $RTT_p$. The location management function 3190 may determine a corrected version, $$RTT'_p,$$

of the BS-RS-based observations $RTT_p$ by subtracting the estimate, $$\Delta'_n,$$

therefrom, i.e., $$RTT'_p = RTT_p - \Delta'_n.$$

The location management function 3190 may then attempt to find matches between the corrected RS-based observations, $$RTT'_{p'}$$

and the sensing-based observations $RTT_s$.

Moreover, if the BS 3170 has an estimate, $\alpha'$, of the UE clock skew, $\alpha$, a more accurate correction to the RS-based observations may be determined from $$RTT''_p = RTT_p - \frac{\Delta'_n}{\alpha'}.$$

In aspects of the present application, the estimate, $\alpha'$, of the UE clock skew, a, may be determined by the UE 3110. In other aspects of the present application, the estimate, $\alpha'$, of the UE clock skew, $\alpha$, may be determined through a network-wide synchronization process.

As described hereinbefore, the LMF 3190 receives the sensing-based profiles and the BS-RS-based observations, $RTT_p$. The processing (step 3510) of the sensing-based profiles and the BS-RS-based observations may involve determining sensing-based observations, $RTT_s$, on the basis of the sensing-based profiles and may, subsequently, lead to matching a particular one of the BS-RS-based observations, $RTT_p$, to a particular one of the sensing-based observations, $RTT_s$.

According to aspects of the present application, in situations wherein the BS 3170 and the UE 3110 are suitably synchronized, one-way RS-based observations may be received and processed by the LMF 3190. That is, the LMF 3190 may receive observations based on only a DL reference signal (from BS 3170 to UE 3110) and/or only a UL reference signal (from UE 3110 to BS 3170). When processing (step 3510) observations in such a case, the LMF 3190 may be expected to match the one-way RS-based observations to a value representative of half of the sensing-based observations, $RTT_s$.

In the preceding, a position hypothesis for the UE 3110 was derived using sensing at only one BS 3170. This may be called "mono-static sensing." In aspects of the present application, a position hypothesis for the UE 3110 may be derived using two BSs 3170. This may be called "bi-static sensing."

In scenarios wherein communications subsystems and sensing subsystems use a unified, wide-pulse, wideband waveform, such as is used in an OFDM context, and wherein the base stations do not have full-duplex radios, the mono-static configuration may run into a problem. The problem may relate to a power gap between the transmitted pulse and the received echoes. Often the power in the transmitted pulse is so strong and the power in the received echoes is so weak that, no matter how isolated the transmit/receive chains are, even a small leakage/induction from the transmit side to the receive side results in a complete swamping of the received echoes. To solve this issue, the bi-static sensing configuration can be used. In the bi-static sensing configuration, the transmission point ("TP," e.g., the BS 3170) that transmits the sensing signal (the pulse) is different from the TP at which the echo is received. This way, the radio of the receive side is not swamped by the high power signals of the transmit side, as there is large distance between the transmit side and the receive side.

The range data that is obtained based on profiles obtained at the TP at which the echo is received may not be called RTT, because the pulse has not made a "return" trip. Instead, the range data obtained based on profiles obtained at the TP at which the echo is received may be called bi-centric range (BCR) data. When BCR data is generated in during the sensing episode, it follows that an equivalent quantity should be generated during the reference signal exchanging episode. Equivalent quantities facilitate matching in the observation processing step. Collection of BCR data is illustrated in a flow diagram in FIG. 29. A first BS 3170A transmits a downlink reference signal (DL-RS). Responsive to receiving the DL-RS, a UE 3110 transmits an uplink reference signal (UL-RS) to a second BS 3170B. In a manner familiar from the first embodiment above, it is preferable to minimize an intra-UE delay.

In one aspect of the present application, intra-UE delay is minimized by an immediate piggybacking of the UL-RS to the DL-RS. In another aspect of the present application, the effect of intra-UE delay on accuracy of BCR data may be minimized by the UE 3110 accurately gauging and reporting intra-UE delay to the location management function 3190, so that BS-RS-based observations may be calibrated.

Figure 29:
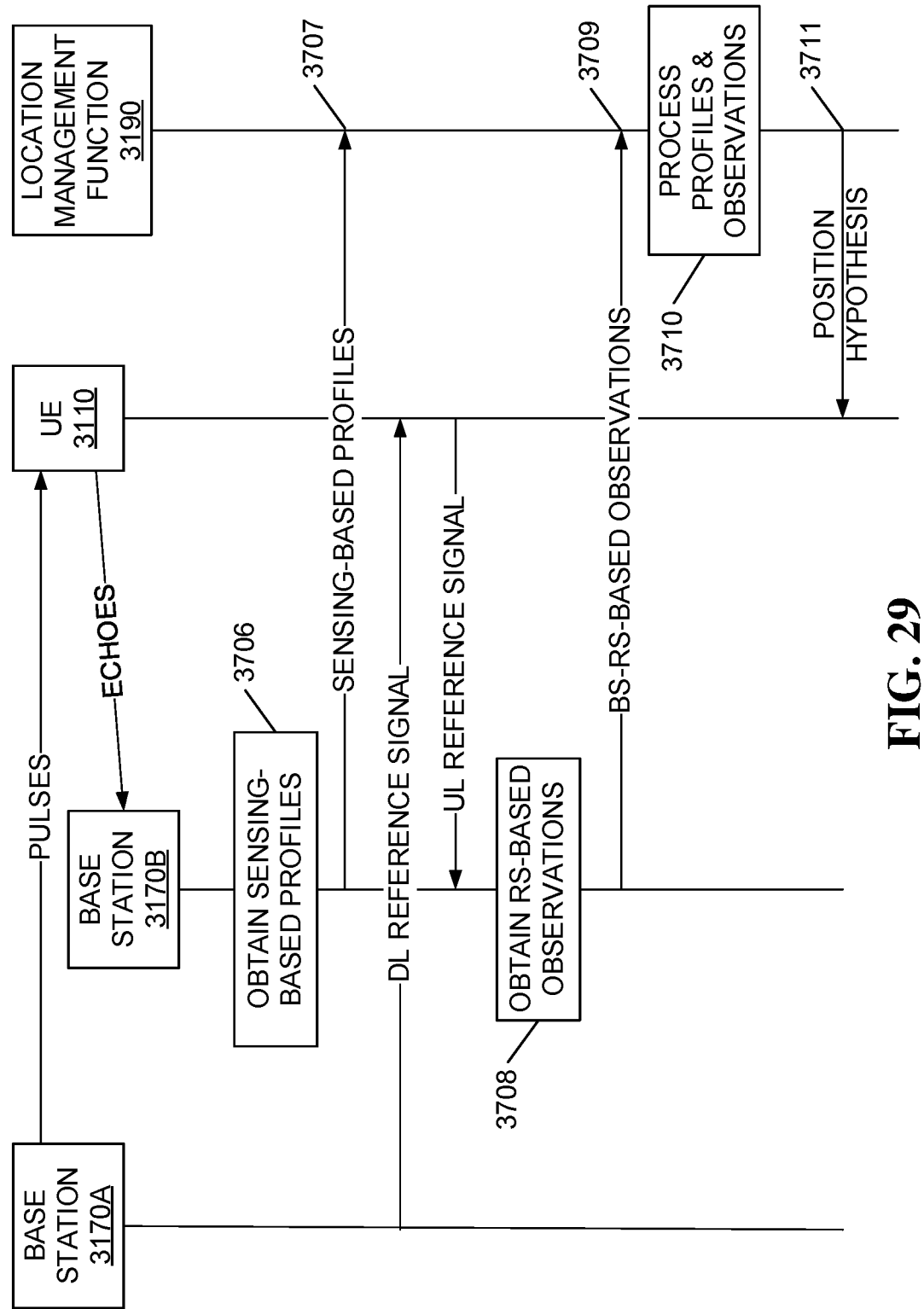
FIG. 29 illustrates, in a flow diagram, interaction between elements of the network of FIG. 1, including two base stations, a user equipment and the location management function, in accordance with aspects of the present application.

In the flow diagram of FIG. 29, interaction is illustrated between the first base station 3170A, the second base station 3170B, the UE 3110 and the location management function 3190. Although not specifically illustrated, the first base station 3170A and the second base station 3170B may be understood to include a sensor system similar to the sensor system 3502 in FIG. 27. Although not specifically illustrated, the first base station 3170A and the second base station 3170B may be understood to include a communication system similar to the communication system 3504 in FIG. 27.

Initially, the first base station 3170A transmits a sensing signal, which may, for example, be a radar pulse. During the sensing episode, the sensor system of the second base station 3170B receives echoes, of the sensing signal, from the UE 3110 and from other objects in the environment of the communication system 3100.

The sensor system may then obtain (step 3706) sensing-based profiles. Upon completion of the obtaining (step 3706) of the sensing-based profiles, the second base station 3170B transmits the sensing-based profiles to the location management function 3190. The location management function 3190 obtains (step 3707) the sensing-based profiles. In the context of the LMF 3190 obtaining (step 3707) the sensing-based profiles, the BS 3170 may be generically called a profile origin.

The first BS 3170A transmits a downlink (DL) reference signal that may be received by the UE 3110. The DL reference signal may be a high-power wideband signal. The UE 3110 is, according to aspects of the present application, configured to receive the DL reference signal and generate an upload (UL) reference signal (RS). The UE 3110 then transmits the UL-RS to the second BS 170B.

The communication system of the second BS 3170B receives the UL reference signal (RS) from the UE 3110. Conveniently, as discussed hereinbefore, the UL-RS includes identity information for the UE 3110 at which the UL-RS has been generated. Responsive to receiving the UL-RS, the communication system obtains (step 3708)

BS-RS-based observations. On the basis of a particular BS-RS-based observation, the communication system may determine the identity information for the UE 110 and associate the identity information with the particular BS-RS-based observation.

At least some of the BS-RS-based observations obtained, by the communication system in step 3708, are of the same type and from the same UE 3110 (in the context of multiple UEs 3110) as at least some of the sensing-based observations that may be determined on the basis of the sensing-based profiles obtained, by the sensing system, in step 3706. Upon completion of the obtaining (step 3708) of the BS-RS-based observations, the second BS 3170B transmits the BS-RS-based observations to the location management function 3190. The location management function 3190 obtains (step 3709) the BS-RS-based observations.

The location management function 3190 processes (step 3710) the sensing-based profiles, obtained in step 3707, to determine sensing-based observations and derive a position for the UE 3110. The processing (step 3710) of the sensing-based profiles may be accomplished, in one aspect, by way of a Doppler analysis. The location management function 3190 may use Doppler analysis to separate echoes from the (mobile) UE 3110, which echoes may be regarded as fore-ground signals, from echoes from (static) clutter in the environment, which echoes may be regarded as background signals.

The location management function 3190 also processes (step 3710) the BS-RS-based observations, obtained in step 3709, to determine, from the BS-RS-based observations, UE identity information for the UE 3110.

On the basis of the same observations, the processing (step 3710), by the location management function 3190, may involve obtaining sensing-based observations from the sens-ing-based profiles and may, subsequently, lead to a matching of certain of the BS-RS-based observations to certain of the sensing-based observations. Notably, since the sensing-based observations are associated with a position hypothesis and the RS-based observations are associated with UE identity information, the matching (step 3710) may be used to associate the position with the UE identity information.

The location management function 3190 may then trans-mit (step 3711), to the UE 3110 associated with the UE identity information, an indication of the position. Notably, indication of the position is not necessarily intended for transmission (step 3711) to the UE 3110. Instead, the indi-cation of the position can be used for other tasks. The other tasks include predicting future mobility of the UE 3110. The other tasks include management of beams transmitted from the BS 3170. Beam management is discussed hereinafter.

Accordingly, it can be seen that the bi-static sensing configuration can be used so that the radio of the receive side is not swamped by the high power signals of the transmit side.

Figure 30:
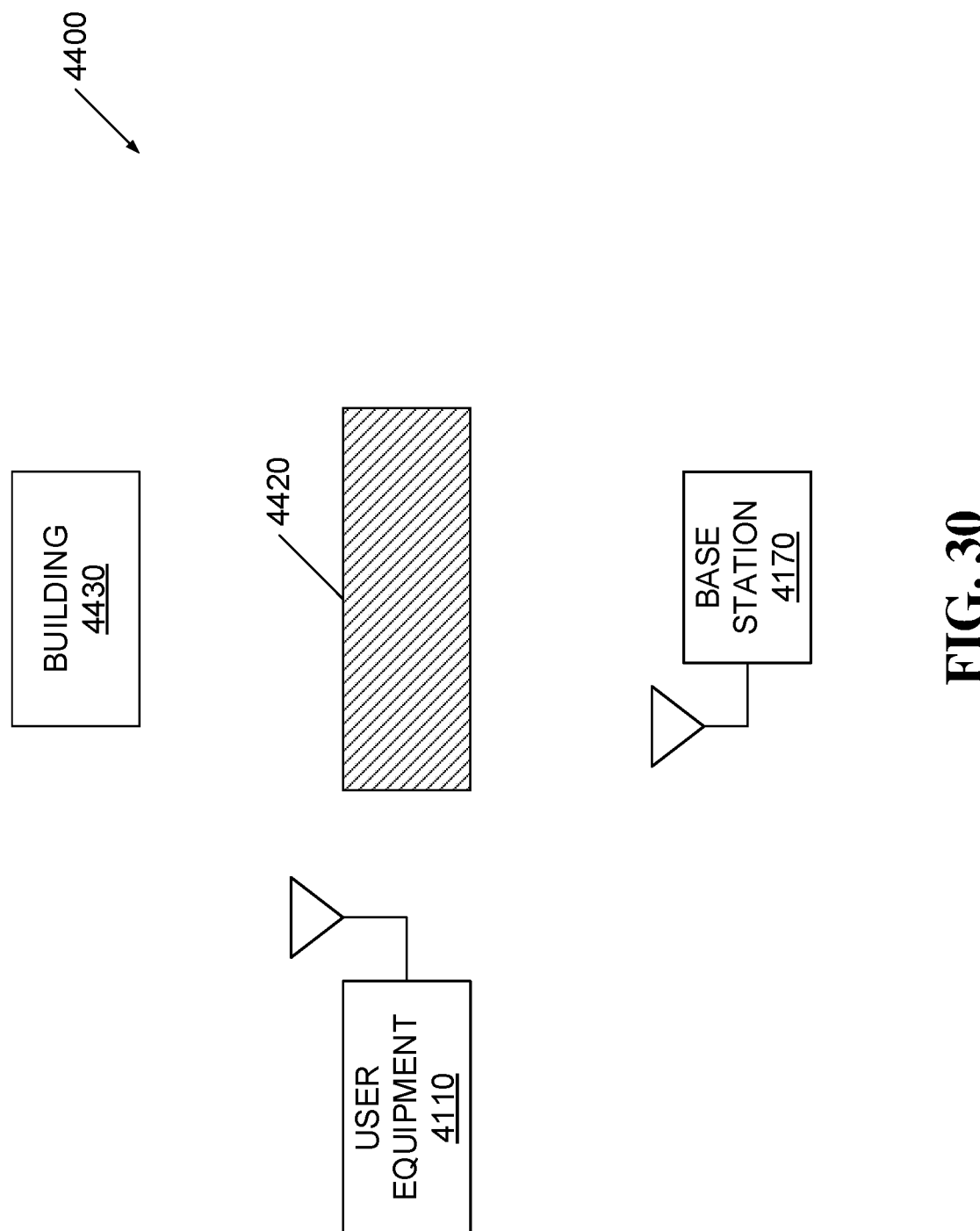
FIG. 30 illustrates a situation in which the user equipment may assist the base station in sensing the environment, in accordance with aspects of the present application.

There are scenarios for which sensing based at the BS 4170 may not be efficient and feasible. As shown in FIG. 30, an environment 4400 includes a BS 4170, a UE 4110, a wall 4420 and a building 4430. The BA 4170 may try to obtain knowledge of the environment 4400 using RF radar sensing signals. However, the ability of the BS 4170 to obtain knowledge of the building 4430 is hampered by the presence of the wall 4420.

Environment sensing that is purely based at the BS 4170, as is common, is inefficient, in terms of power consumption and performance, for environment characterization (e.g., due to blind spots). Aspects of the present application are directed to involving the UE 4110 in the sensing process, in consideration of limitations of the UE 4110, including UE-BS synchronization limitations and UE capability.

In overview, according to aspects of the present application, the BS 4170 transmits, to the UE 4110, a request for sensing assistance, that is, a request for assistance in performing environment sensing. The UE 4110 may use sensing signals normally used by the BS 4170 to sense the environment, thereby obtaining sensing results. The UE 4110 may then transmit the sensing results to the BS 4170. Alternatively, the UE 4110 may use sensing signals that are different from the sensing signals used by the BS 4170, due to the capability of the UE 4110 being distinct from the capability of the BS 4170.

For assisted sensing according to aspects of the present application, there may be considered to be two basic elements. A first basic element is a sensing requester, that is, an entity that requests that sensing be performed. A second basic element is a sensing performer, that is, an entity that performs the sensing operation. The sensing requester can be a UE 4110 or any other network node, such as a BS 4170. The sensing performer, for the purposes of the present application, is assumed to be a UE 4110.

In terms of RF sensing, there are two scenarios. A first scenario may be referenced as "Active Sensing" and may involve transmitting RF sensing signals for the purpose of obtaining information from the environment. A second scenario may be referenced as "Passive Sensing." In Passive Sensing, it is recognized that, even without sensing-specific RF signals, many RF signals are transmitted in the environment and that the interaction of these RF signals with elements of the environment can provide information about the elements with which the RF signals interact. Accordingly, Passive Sensing may involve receiving and processing those RF signals that have interacted with the environment. In any given environment, there can be multiple entities engaged in Active Sensing and/or multiple entities engaged in Passive Sensing. In some embodiments, one or more entities can perform both active sensing and passive sensing.

Figure 31:
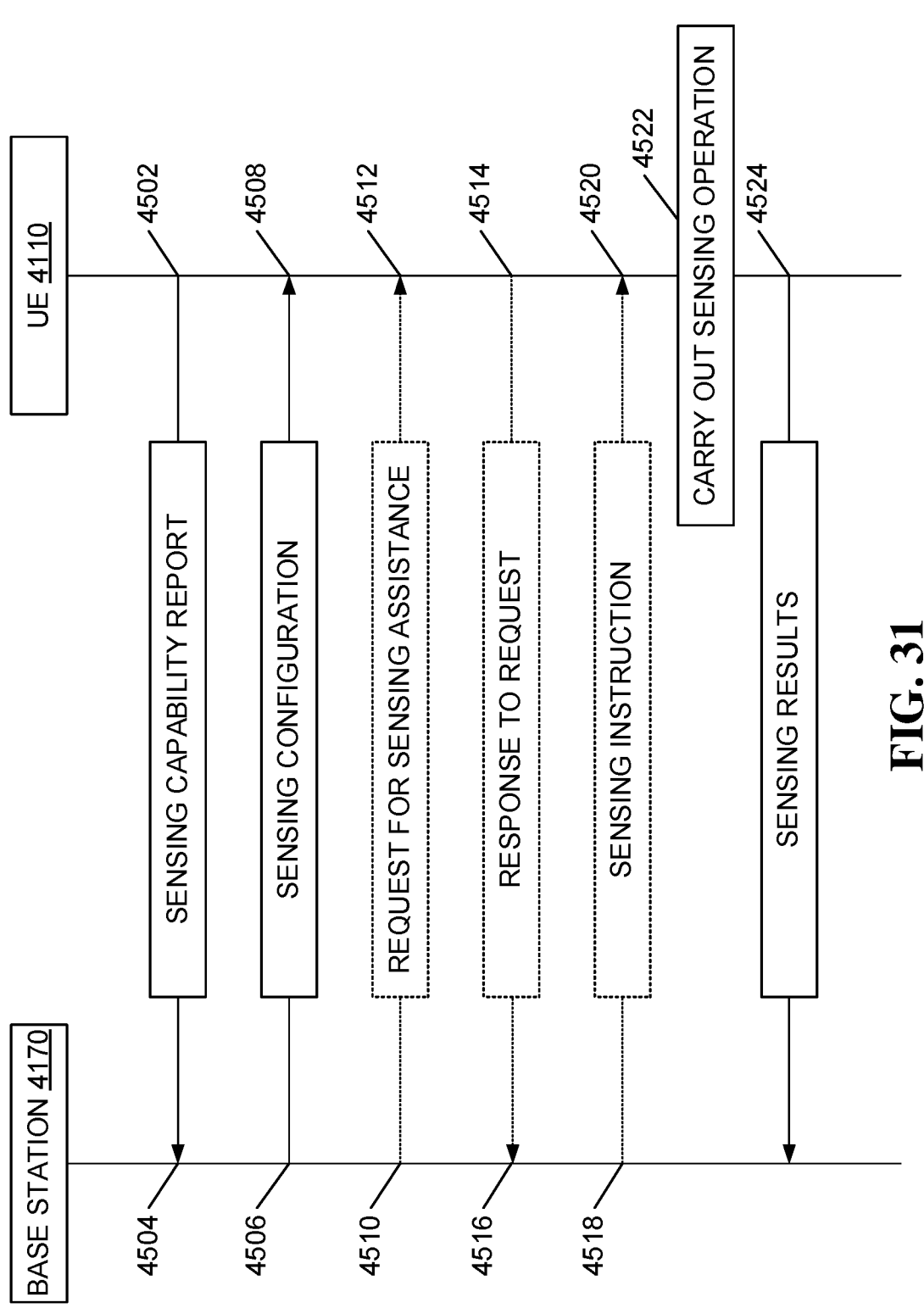
FIG. 31 illustrates, in a signal flow diagram, interaction between user equipment and base station for arranging sensing assisted by the user equipment, in accordance with aspects of the present application.

FIG. 31 illustrates, in a signal flow diagram, interaction between a UE 4110 and a BS 4170 for arranging sensing assisted by the UE 4110.

Initially, the UE 4110 transmits (step 4502), to the BS 4170, a sensing capability report indicating the sensing capability of the UE 4110. The sensing capability report may include an indication of supported sensing types (including RF, imaging, LIDAR and camera) and the details of capability for each of supported sensing types. For example, for RF sensing, the sensing capability report may indicate a supported frequency bands and bandwidth, supported sensing signals and supported duplexing mode (full duplex or half duplex). The sensing capability report can be transmitted together with a known UE capability report. The known UE capability report is usually transmitted, to the BS 4170 and by the UE 4110, upon connecting to the BS 4170.

Subsequent to receiving (step 4504) the sensing capability report, the BS 4170 may transmit (step 4506), to the UE 4110, a sensing configuration. Upon receiving (step 4508) the sensing configuration, the UE 4110 may implement the sensing configuration.

The BS 4170 may, optionally, transmit (step 4510), to the UE 4110, a request for sensing assistance. The request may be defined as a new message between the BS 4170 and the UE 4110, with the new message including a "request_to_sense" indication.

The BS 4170 may, for one unicast example, employ the known physical downlink shared channel (PDSCH) to transmit (step 4510) the request_to_sense indication to the UE

4110. The BS 4170 may, for another unicast example, employ the known physical downlink control channel (PDCCH) to transmit (step 4510) the request_to_sense indication to the UE 4110. In a group-cast example, the BS 4170 may transmit (step 4510) the request_to_sense indication to a group of UEs 4110. When transmitting (step 4510) to a group of UEs 4110, the BS 4170 may employ the known PDSCH or the known PDCCH. In other examples, the BS 4170 may broadcast the transmission (step 4510) of the request_to_sense indication to all UEs 4110. When broadcast transmitting (step 4510) to all UEs 4110, the BS 4170 may employ the known physical broadcast channel (PBCH). Rather than employ a known physical channel, it is contemplated, herein, that a new physical channel may be defined expressly for the purpose of transmitting the request_to_sense indication. The new physical channel may be called, for example, a physical sensing channel (PSCH).

The BS 4170 may also use a logical channel, such as the known dedicated control channel (DCCH) to transmit (step 510) the request_to_sense indication to the UE 4110. Rather than employ a known logical channel, it is contemplated, herein, that a new logical channel may be defined expressly for the purpose of transmitting the request_to_sense indication. The new logical channel may be called, for example, a dedicated sensing channel (DSCH).

The BS 4170 may transmit (step 4506, FIG. 31) the sensing configuration indication and may transmit (step 4510) the request_to_sense indication by UE-specific signaling using, for example, the known radio resource control (RRC) protocol. Given that the environment sensing carried out by the UE 4110 is on-demand based, it may be shown that use of RRC signaling results reduced power consumption relative to some other signaling choices.

In the case of scheduled sensing, a request_to_sense indication can be sent using broadcast signaling, using unicast signaling or using group-cast signaling. More particularly, a request_to_sense indication can be sent using layer one (L1) signaling using a standardized information structure, such as the known downlink control information (DCI) information structure. Alternatively, a request_to_sense indication can be sent using signaling at a layer higher than L1, such as using a control element (CE) in the known media access control (MAC) sublayer, that is, a "MAC-CE."

The request_to_sense indication may include an indication of a sensing type, where the sensing type maybe an RF sensing type, a LIDAR sensing type or a camera-based sensing type. The RF sensing type may include a further indication of RADAR sensing type or imaging sensing type. The request_to_sense indication may include a sensing subspace indication, limiting the sensing to be carried out by the UE 4110 to particular directions for the sake of UE power saving. The request_to_sense indication may include an indication of key performance indicators (KPIs) for target detection. The KPIs may be related to range estimation, Doppler (velocity) estimation, sensing resolution and sensing accuracy. The request_to_sense indication may include an indication of detailed sensing signal configuration, which, in the case of RF sensing, may include a sensing waveform indication and its associated parameters, a sensing signal sequence indication, or an indication of sensing signal time/frequency allocation. The request_to_sense indication may include an indication of an active sensing request, in which the UE is requested to transmit an RF signal, a passive sensing request, in which the UE is requested to receive and process the reflection of an RF sensing signal, or both. The request_to_sense indication may include an indication of sensing categories including a common sensing indication or a dedicated sensing indication. The request_to_sense indication may also include an indication of a channel resource for sensing feedback, or an indication of a sensing report timeline.

After receiving (step 4508) the sensing configuration information and/or after receiving (step 4512) the request_to_sense indication, the UE 4110 may, optionally, transmit (step 4514) a further new message to the BS 4170. The further new message may include a "respond_to_sense" indication. The BS 4170 may receive (step 4516) the further new message. In the respond_to_sense indication, the UE 4110 may provide, to the BS 4170, an indication of availability for a sensing operation. The UE 4110 may base the indication of availability on the extent to which the UE 4110 has scheduled an uplink (UL) transmission, a downlink (DL) reception, a sidelink (SL) transmission or a SL reception. Additionally, the UE 4110 may base the indication of availability on power level or mobility. Additional capabilities can be reported along with the respond_to_sense indication. Example additional capabilities may include an indication of mobility, an indication of direction of movement and an indication of power level.

The UE 4110 may, for one example, employ the known physical multicast channel (PMCH) to transmit (step 4514) the respond_to_sense indication to the BS 4170. The UE 4110 may, for another example, employ the known physical uplink control channel (PUCCH) to transmit (step 4514) the respond_to_sense indication to the BS 4170. In a further example, the UE 4110 may employ the known physical uplink shared channel (PUSCH) to transmit (step 4514) the respond_to_sense indication to the BS 4170. In a still further example, the UE 4110 may employ the known physical random access channel (PRACH) to transmit (step 4514) the respond_to_sense indication to the BS 4170. It has been discussed hereinbefore that a new physical channel (PSCH) may be defined expressly for the purpose of the BS 4170 transmitting the request_to_sense indication to the UE 4110. It is noted that the new physical channel (PSCH) may also be defined to include the purpose of the UE 4110 transmitting the respond_to_sense indication to the BS 4170. The UE 4110 may also use a logical channel, such as the known 4 DCCH to transmit (step 4514) the respond_to_sense indication to the BS 4170. Alternatively, the UE 4110 may use the newly defined logical channel (DSCH), discussed hereinbefore, to transmit (step 4514) the respond_to_sense indication to the BS 170.

Optionally, the BS 4170 may transmit (step 4518) an even further new message to the UE 4110. The even further new message may include a "instruct_to_sense" indication. The instruct_to_sense indication received (step 4520) by the UE 4110, may specify details of the sensing signal that is to be used by the UE 4110 when carrying out (step 4522) a sensing operation. The details of the sensing signal may include an indication of a particular sensing type along with indications of various sensing signal parameters, including sensing signal bandwidth, sensing signal duration, etc.

The transmission (step 4518) of the instruct_to_sense indication specifying details of the sensing signal may be accomplished using a logical channel, such as the known dedicated traffic channel (DTCH). Alternatively, the BS 4170 may use the newly defined logical channel (DSCH), discussed hereinbefore, to transmit (step 4518) of the instruct_to_sense indication to the UE 4110.

The details of the sensing signal may include an indication of a UE-specific sensing timing allocation, an indication of a sensing period and an indication of a channel resource that the UE 4110 is to use when transmitting (step 4524) sensing results to the BS 4170. The details of the sensing signal may be communicated to the UE 4110 through sensing configuration signaling that is sent to the UE 4110 along with the request_to_sense indication (step 4510). The sensing configuration signaling may be sent through RRC signaling.

The transmission (step 4524) of the sensing results may be accomplished using a known physical channel, such as the PUSCH. Alternatively, the transmission (step 4524) of the sensing results may be accomplished using the newly defined physical channel, PSCH. The transmission (step 4524) of the sensing results may be accomplished using a logical channel, such as the known DTCH. Alternatively, the UE 4110 may use the newly defined logical channel (DSCH), discussed hereinbefore, to transmit (step 4524) of the sensing results to the BS 4170.

The details of the sensing signal may include a "tight synchronization request" (TSR) for the UE 4110 in case of bi-static sensing. An explanation of bi-static sensing will be provided hereinafter. Rather than transmitting a TSR as part of the optional transmitting (step 4518) of the instruct_to_sense indication, the TSR may be transmitted separately and subsequent to the transmission of the instruct_to_sense indication. The TSR may be transmitted, to the UE 4110, in conjunction with transmission (step 4510) of the request_to_sense indication. The UE 4110 uses the UE-specific sensing timing allocation and the specified sensing period when carrying out (step 4522) the sensing operation. The UE 4110 uses the specified channel resource when transmitting (step 4524) sensing results to the BS 4170. The sensing results may include reference information (for example, for non-camera-based sensing) such as an object identifier, e.g., a tag identifier. The object identifier may have an implicit association with an indication of a particular BS 4170. The sensing results may also include further information, e.g., an image, which may be a map.

Figure 32:
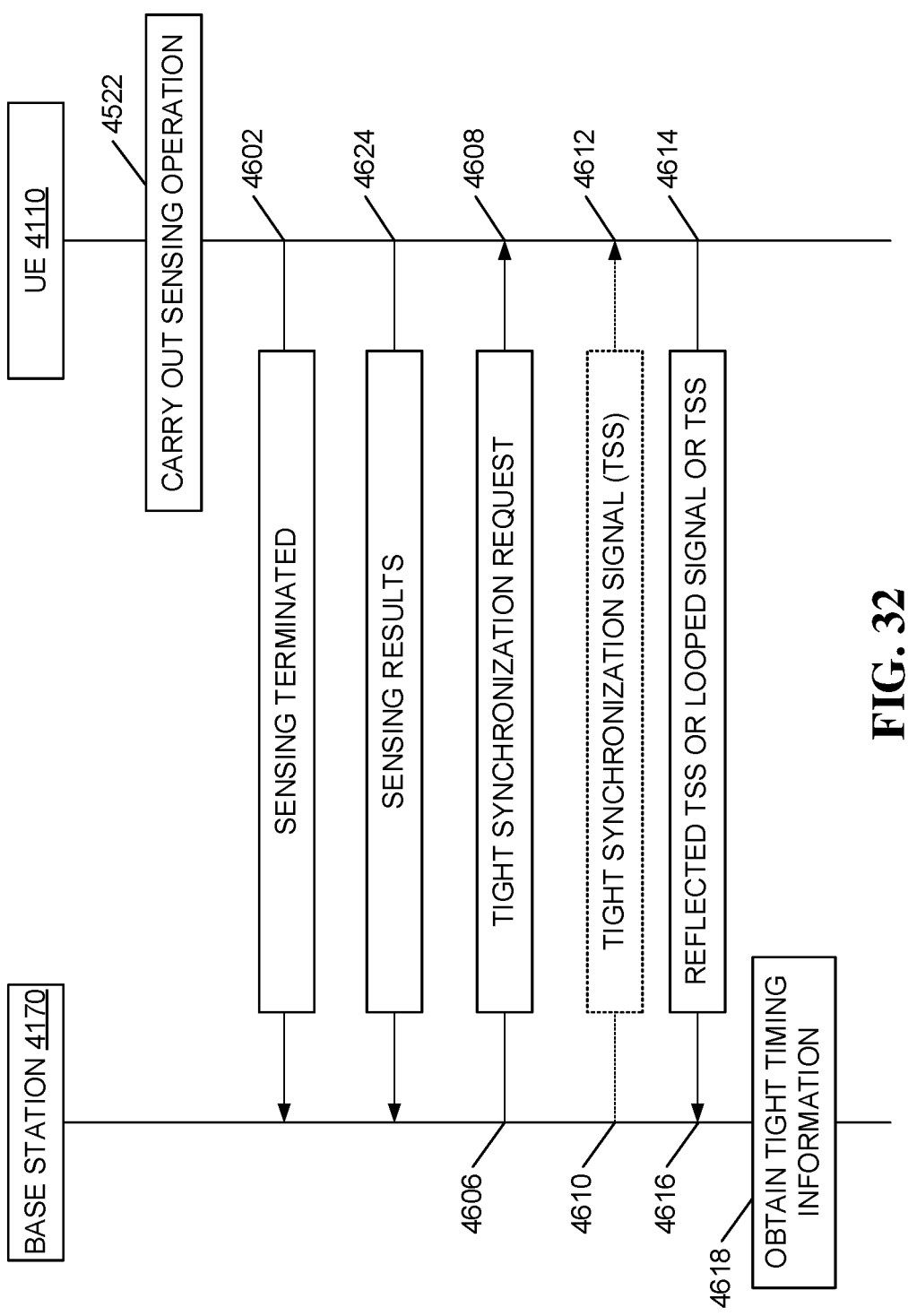
FIG. 32 illustrates, in a signal flow diagram, further interaction between user equipment and base station for arranging sensing assisted by the user equipment, in accordance with aspects of the present application.

FIG. 32 illustrates, in a signal flow diagram, further possible interaction between the UE 4110 and the BS 4170 related to the arrangement of sensing assisted by the UE 4110. Occasionally, there may be circumstances that trigger the UE 4110 to transmit (step 602) a still further new message to the BS 4170. The still further new message may include a sensing_terminated indication.

The trigger may take the form of the arrival of traffic for which an urgent UL or SL response is due. Under such circumstances, the UE 4110 exits immediately from carrying out (step 4522) the sensing operation and transmits (step 4602) the sensing_terminated indication to the BS 4170.

The UE 4110 may then transmit (step 4524) sensing results to the BS 4170 in the same manner that the UE 4110 would have transmitted (step 4524) sensing results to the BS 4170 in the absence of the trigger that caused sensing to be terminated. It may be possible that the UE 4110 cannot transmit (step 4524) the sensing results over the specified resources, for example, due to the resources being occupied by traffic. In such a case, the UE 4110 may request, from the BS 4170, additional resources or indicate, to the BS 4170, that the sensing results may not be transmitted over the specified resources.

Several sensing configurations are contemplated. In a "Dynamic" sensing configuration, the sensing operation (step 4522, FIG. 31) to be carried out by the UE 4110 is scheduled by the BS 4170. In this case, the transmission (step 4506) of the sensing configuration may be linked with the transmission (step 4510) the indication request_to_sense.

In a "Semi-Static" sensing configuration, the sensing operation (step 4522, FIG. 31) to be carried out by the UE 4110 is pre-configured. It follows that "Semi-Static" sensing may also be referred to as "pre-configured sensing." In pre-configured sensing, detailed sensing configurations are specified by the BS 4170 and communicated, by the BS 4170, to the UE 4110. Accordingly, the BS 4170 transmits (step 4506) the sensing configuration and the BS 4170 does not transmit (step 4510) the indication request_to_sense. That is, the UE 4110 carries out (step 4522), on the basis of the configuration, without being prompted, through receipt (step 4512) of the request_to_sense indication, to begin the sensing operation.

In an "Opportunistic" sensing configuration, the sensing operation (step 4522, FIG. 31) is carried out by the UE 4110 without any grant from the BS 4170. That is, the BS 4170 does not transmit (step 4510) the indication request_to_sense. In contrast to a semi-static sensing configuration (a.k.a., a pre-configured sensing configuration), wherein the BS 4170 specifies all detailed configurations, including the transmission resources, in the opportunistic sensing configuration, detailed configurations may not be signaled to the UE 4110 beforehand. Indeed, the UE 4110 may use configurations previously stored in the UE memory 4208. In one example, the UE 4110 may carry out (step 4522, FIG. 31) the sensing operation by transmitting a sensing signal over some resources about which the BS 4170 has no knowledge or expectation.

According to an aspect of the present application, which may be referred to as network-initiated, UE-assisted, mono-static sensing, the sensing (active and passive) is completely outsourced by the BS 4170 to the UE 4110. The UE 4110 performs mono-static sensing (both active and passive). In this case, after receiving (step 4504) the sensing capability report from multiple UEs 4110, the BS 4170 configures a particular UE 4110 for mono-static sensing based on the capability and the availability of the particular UE 4110. The BS 4170 transmits (step 4510) a request_to_sense indication to the particular UE 4110.

Responsive to receiving (step 4512) the request_to_sense indication, the particular UE 4110 carries out (step 4522) active and passive sensing based on configuration details in a configuration message that the particular UE 4110 has previously received (step 4508).

After the particular UE 4110 has carried out (step 4522) the sensing, the particular UE 4110 transmits (step 4524) the sensing results. Note that, in this example embodiment of an aspect of the present application, there is no need for a tight synchronization request (discussed hereinafter), since the sensing is mono-static. In addition, there might be more than one UE 4110 configured, by the BS 4170, for carrying out (step 4522) mono-static sensing.

According to another aspect of the present application, which may be referred to as network-initiated, UE-assisted, active bi-static sensing, active sensing is carried out by the UE 4110 and passive sensing is carried out by the BS 4170. This aspect may be found to be of particular use when the UE 4110 has a clear view of a target (e.g., the building 4430) and is in close range to the target. As passive sensing is performed by the BS 4170, no sensing results are expected from the UE 4110.

After receiving (step 4504) a sensing capability report from multiple UEs 4110, report, the BS 4170 may transmit (step 4506) a sensing configuration indication to a particular UE 4110 (or to a group of UEs 4110) for active bi-static sensing based on the capability and availability indicated in the received (step 4504) sensing capability report. The BS

4170 may then transmit (step 4510), to the UE(s) 4110, a request for sensing assistance with a request_to_sense indication. Upon receiving (step 4512) the request for sensing assistance, the UE 110 carries out (step 4522) active sensing. Since time and frequency synchronization is important to bi-static sensing, the BS 4170 may transmit (step 4606, FIG. 32), to the UE 4110, a tight synchronization request (TSR). In response to receiving (step 4608) the TSR, the UE 4110 may make efforts to tightly synchronize with the BS 4170.

The transmission (step 4606) of the TSR may be accomplished using a known channel, such as PMCH, PUCCH, PUSCH or PRACH. Alternatively, the transmission (step 4606) of the TSR may be accomplished using the newly defined channel, PSCH.

In some embodiments, the BS 4170 does not transmit (step 4606), to the UE 4110, explicit signaling for a TSR. In these embodiments, it may be considered to be implicit, in the request_to_sense indication transmitted in step 4510, that configuration for bi-static sensing leads the UE 4110 to make efforts to tightly synchronize with the BS 4170.

In some embodiments, responsive to receiving (step 4608) the TSR, the UE 4110 activates a passive reflection mode. Subsequently, the BS 4170 transmits (step 4610) a tight synchronization signal (TSS). The transmission (step 4610) of the TSS may be accomplished using a known channel, such as PMCH, PUCCH, PUSCH or PRACH. Alternatively, the transmission (step 4610) of the TSS may be accomplished using the newly defined channel, PSCH. On the basis of having activated the passive reflection mode, the UE 4110 passively reflects (step 4614) the TSS. Upon receiving (step 4616) the reflected TSS, the BS 4170 processes the received reflected TSS to, thereby, obtain (step 4618) tight timing information. In aspects of the present application, the TSS comprises a relatively high bandwidth signal, thereby enabling relatively high resolution timing recovery. The details of the TSS may be included in the sensing configuration information transmitted in step 4506.

In some other embodiments, responsive to receiving (step 4608) the TSR, the UE 4110 activates a signal looping mode. The UE 4110 performs signal looping on the TSS received (step 4612) from the BS 4170 to, thereby, obtain a looped signal that includes a parameter that can be uniquely associated with the UE 4110. The UE 4110 transmits (step 4614) the looped signal to the BS 4170. Upon receiving (step 4616) the looped signal, the BS 4170 processes the looped signal to, thereby, obtain (step 4618) tight timing information and associate the timing information with the specific UE 4110 associated with the parameter that is uniquely associated with the UE 4110.

In some other embodiments, responsive to receiving (step 4608) the TSR, the UE 4110 transmits (step 4614) a TSS to the BS 4170. Upon receiving (step 4616) the TSS, the BS 4170 processes the received TSS to, thereby, obtain (step 4618) tight timing information.

In some embodiments, the UE 4110 may transmit (step 4614) the TSS while also transmitting an active sensing signal as part of carrying out (step 4522) the sensing operation. This embodiment may be especially useful for use with UEs 4110 having multiple panels.

Figure 33:
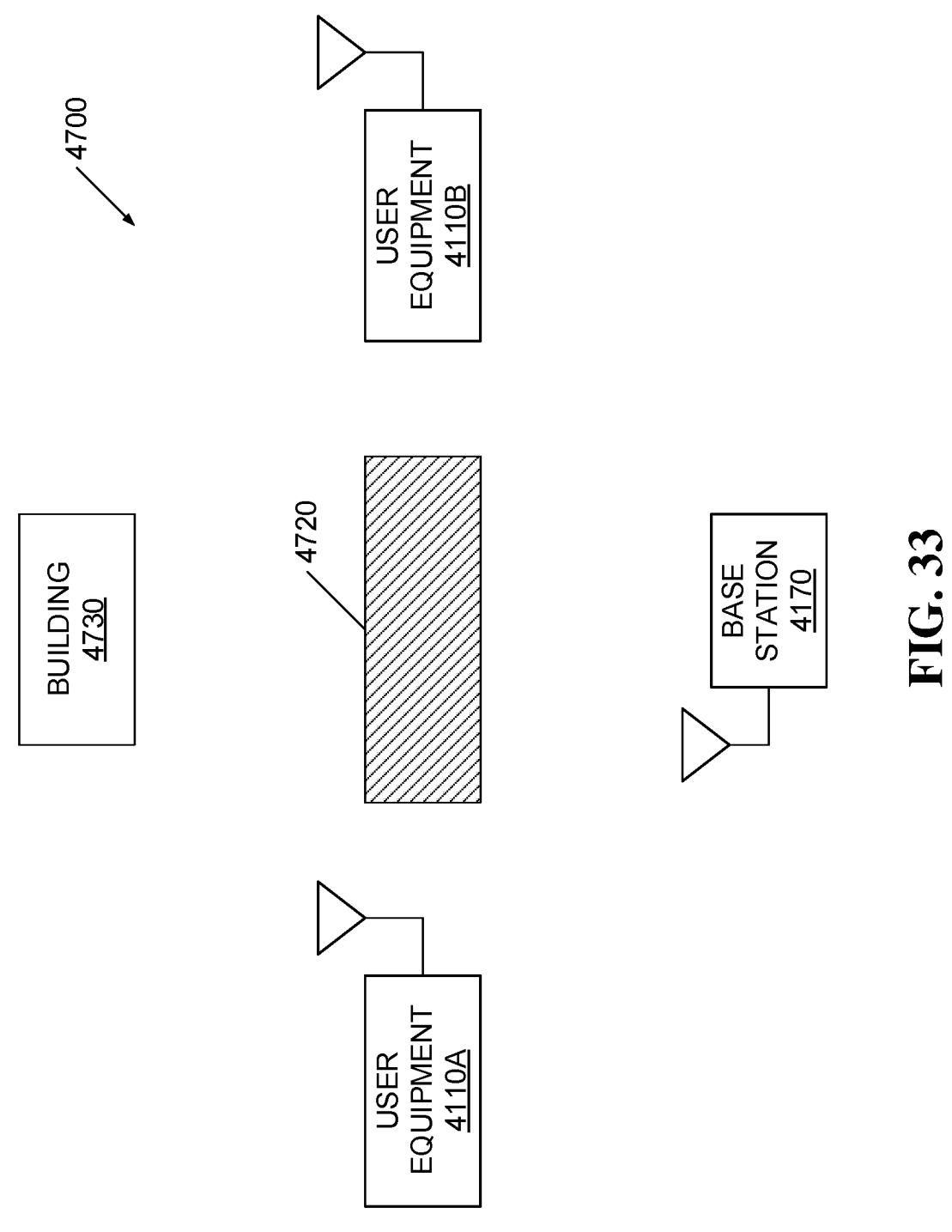
FIG. 33 illustrates a situation in which multiple user equipment may assist the base station in sensing the environment, in accordance with aspects of the present application.

As shown in FIG. 33, an environment 4700 includes a BS 4170, a first UE 4110A, a second UE 4110B, a wall 4720 and a building 4730.

According to a further aspect of the present application, which may be referred to as network-initiated, active and passive bi-static UE sensing, active sensing is carried out by the first UE 4110A and passive sensing is carried out by the second UE 4110B and the BS 4170.

This aspect may be found to be of particular use when the first UE 4110A and the second UE 4110B have respective clear views of a target (e.g., the building 4730) and are in close range to the target. As passive sensing is performed by the BS 4170, no sensing results are expected from either UE 4110.

After receiving (step 4504) the sensing capability report from the UEs 4110A, 4110B, the BS 4170 configures (step 4506) the first UE 4110A (or a group of UEs 4110 that includes the first UE 4110A) for active sensing and the BS 4170 configures (step 4506) the second UE 4110B (or a group of UEs 4110 including the second UE 4110B) for passive sensing. The configuring of the UEs 4110A, 4110B may be based on the capability and the availability reported by the UEs 4110A, 4110B. The BS 4170 transmits (step 4510) a request_to_sense indication to the UEs 4110A, 4110B. After receiving (step 4512) the indication, the first UE 4110A, configured for active sensing, carries out (step 4522) active sensing operations and the second UE 4110B, configured for passive sensing, carries out (step 4522) passive sensing operations. Since time/frequency synchronization is valuable in bi-static sensing, the BS 4170 may transmit a relative tight synchronization request (RTSR) to the UEs 4110A, 4110B. Since to the UEs 4110A, 4110B perform bi-static sensing, only their relative synchronization matters, rather than synchronization with the BS 4170.

In some embodiments, followed by receiving the RTSR, the first UE 110A, configured for active sensing, transmits a tight synchronization signal (TSS) and the second UE 4110B, configured for passive sensing, activates a passive reflection mode to passively reflect the TSS transmitted by the first UE 4110B. Receipt and processing of a passively reflected TSS enables the first UE 4110A to obtain tight timing information. In aspects of the present application, as discussed hereinbefore, the TSS comprises a relatively high bandwidth signal, thereby enabling relatively high resolution timing recovery. The details of the TSS may be included in the sensing configuration information transmitted in step 4506.

In some other embodiments, followed by receiving the RTSR, the first UE 4110A, configured for active sensing, transmits the TSS and the second UE 4110B, configured for passive sensing, activates a signal looping mode. The second UE 4110B performs signal looping on the TSS received from the first UE 4110A to, thereby, obtain a looped signal. The second UE 4110B transmits the looped signal to the first UE 4110A. Upon receiving the looped signal, the first UE 4110A processes the looped signal to, thereby, obtain tight timing information.

In some other embodiments, followed by receiving the RTSR, the first UE 4110A, configured for active sensing, transmits (using an SL channel) a TSS to the second UE 4110B, configured for passive sensing, to enable the second UE 4110B to obtain tight synchronization information. In some embodiments, the first UE 4110A transmits the TSS while transmitting the active sensing signal as part of the carrying out (step 4522) of the sensing operation. This embodiment may be especially useful for use with UEs 4110 having multiple panels.

It has been discussed, hereinbefore, that the transmission (step 4510) of the request_to_sense indication by the BS 4170, in so-called network-initiated aspects of the present application, may employ the PDSCH or the PDCCH (for group-cast or unicast) and may employ the PBCH (for broadcasting).

It is contemplated that, rather than being initiated by the BS 4170, UE-assisted sensing may be initiated by another UE 4110. The other UE 4110 may, for one example, employ the known PMCH to transmit (step 4510) the request_to_sense indication to the UE 4110 that is to carry out the sensing. The other UE 4110 may, for another example, employ the known PUCCH to transmit (step 4510) the request_to_sense indication to the UE 4110 that is to carry out the sensing. In a further example, the other UE 4110 may employ the known PUSCH to transmit (step 4510) the request_to_sense indication to the UE 4110 that is to carry out the sensing. In a still further example, the other UE 4110 may employ the known PRACH to transmit (step 4510) the request_to_sense indication to the UE 4110 that is to carry out the sensing. It has been discussed hereinbefore that a new channel (PSCH) may be defined expressly for the purpose of transmitting the request_to_sense indication. In an even further example, the other UE 4110 may employ the known physical sidelink control channel (PSCCH) to transmit (step 4510) the request_to_sense indication to the UE 4110 that is to carry out the sensing. In an even further example, the other UE 4110 may employ the known physical sidelink shared channel (PSSCH) to transmit (step 4510) the request_to_sense indication to the UE 4110 that is to carry out the sensing.

After receiving (step 4512) the request_to_sense indication, the UE 4110 that is to carry out the sensing may transmit (step 4514) a respond_to_sense indication to the other UE 4110. Similar to the transmission (step 4510) of the request_to_sense indication, the transmission (step 4514) of the respond_to_sense indication may be accomplished using a known channel, such as PMCH, PUCCH, PUSCH, PRACH, PSCCH or PSSCH. Alternatively, the transmission (step 4514) of the respond_to_sense indication may be accomplished using the newly defined channel, PSCH.

Figure 34:
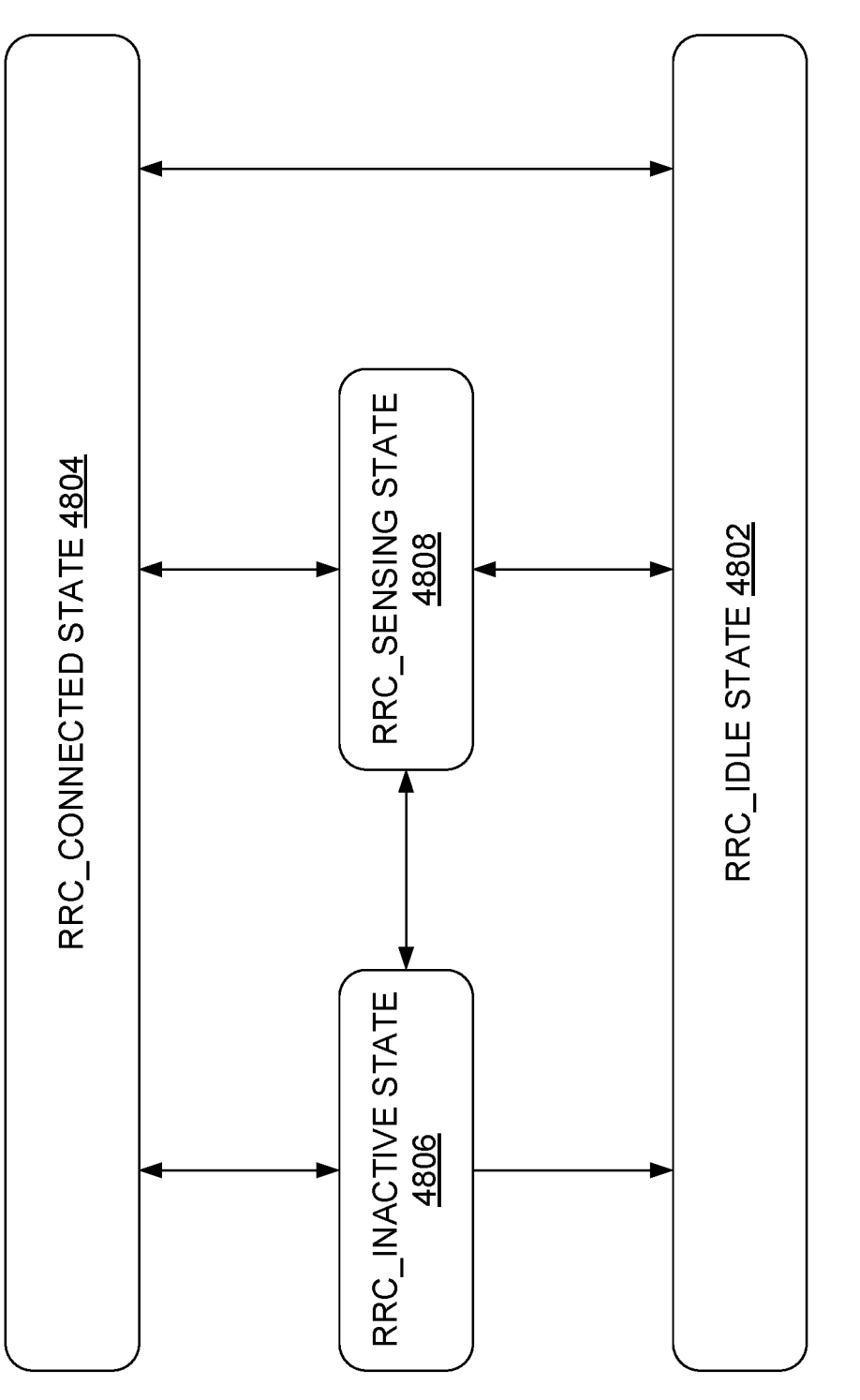
FIG. 34 illustrates Radio Resource Control states of a user equipment and indicates procedures used to transition between the states.

In 3GPP New Radio (NR), a UE 4110 may operate in one of the following three RRC states, illustrated in FIG. 34: an RRC_IDLE state 4802; an RRC_CONNECTED state 4804; and an RRC_INACTIVE state 4806. In other documentation, these states may be referenced as "modes", for example, "RRC_IDLE mode." When the UE 4110 is in the RRC_CONNECTED state 4804, the UE 4110 may be considered to have been connected to the BS 4170 as a result of a connection establishment procedure. When the UE 4110 has transitioned to the RRC_IDLE state 4802, say, by way of a release procedure, the UE 4110 is not connected to the BS 4170, but the BS 4170 knows that the UE 4110 is present in the network. By switching to the RRC_INACTIVE state 4806, for example, by way of a release with suspend procedure, the UE 4110 helps save network resources and UE power (thereby lengthening, for example, perceived battery life). The RRC_INACTIVE state 4806 is known to be useful, for example, in those instances when the UE is not communicating with the BS 4170. When the UE is in the RRC_INACTIVE state 4806, the BS 4170 and the UE both store at least some configuration information to, thereby, allow the UE 4110 to reconnect to the BS 4170, by way of a resume procedure, more rapidly than the UE 4110 would be able to reconnect, by way of the connection establishment procedure, in the case wherein the UE 4110 is in the RRC_IDLE state 4802. The storage of at least some configuration information when the UE 4110 is in the RRC_INACTIVE state 4806 is one aspect that distinguishes the RRC_INACTIVE state 4806 from the RRC_IDLE state 4802.

In an embodiment of the present disclosure, a new RRC state is provided for the UE 4110 to occupy when actively sensing. The new RRC state is illustrated in FIG. 34 as an RRC_SENSING state 4808. Upon receiving (step 4512) the request_to_sense indication from the BS 4170 and transmitting (step 4514) the respond_to_sense indication acknowledging availability for a sensing operation, the UE 4110 may transition from the RRC_CONNECTED state 4804 to the RRC_SENSING state 4808.

Notably, the RRC_SENSING state 4808 is of primary use to the UEs 4110 that are configured, upon receiving (step 4508) the sensing configuration, for active sensing. Recall that the UEs 4110 that are configured for active sensing may not communicate with the BS 4170 during the configured sensing period. In particular, the RRC_SENSING state 4808 is of primary use to the UEs 4110 that are configured for mono-static sensing. In terms of state operation, from a communications standpoint, the RRC_SENSING state 4808 may be similar to the RRC_INACTIVE state 4806, so that a transition back to the RRC_CONNECTED state 4804 may take place very easily and with small latency and power consumption. Once the sensing operation has been carried out (step 4522), the UE 4110 may transition back to the RRC_CONNECTED state 4804 on the basis of RRC resume signaling received from the BS 170.

In an alternative scenario, wherein sensing is initiated by the UE 4110, the UE 4110 may transition directly from the RRC_IDLE state 4802 or the RRC_INACTIVE state 4806 to the RRC_SENSING state 4808. In this scenario, a new RRC signaling message, perhaps called "RRC sense request," may be defined. Upon receiving the RRC sense request message from the BS 4170, the UE 4110 may transition from the RRC_IDLE state 4802 or the RRC_INACTIVE state 4806 to the RRC_SENSING state 808.

Within the context of integrated communication and sensing, not all sensing is equal. For example, there may be considered to be at least two modes of sensing: common sensing; and dedicated sensing. A reference to common sensing may be considered to be a reference to sensing an entire coverage area to get some general information about the environment. For example, common sensing may be used to discover the existence of scatterers and the approximate location of the scatterers. In contrast, a reference to dedicated sensing may be considered to be a reference to sensing a particular region in an effort to collect more accurate information about a particular scatterer. For example, dedicated sensing may be used to discover, for the particular scatterer, a more exact location, an orientation, a material, etc.

According to aspects of the present application, the sensing operation is carried out in conjunction with a communication operation. Referenced herein is an ICS signal that is a communication signal, such as a downlink (DL) transmission, an uplink (UL) transmission or a sidelink (SL) transmission. The ICS signal also serves as a basis for sensing.

Figure 35:
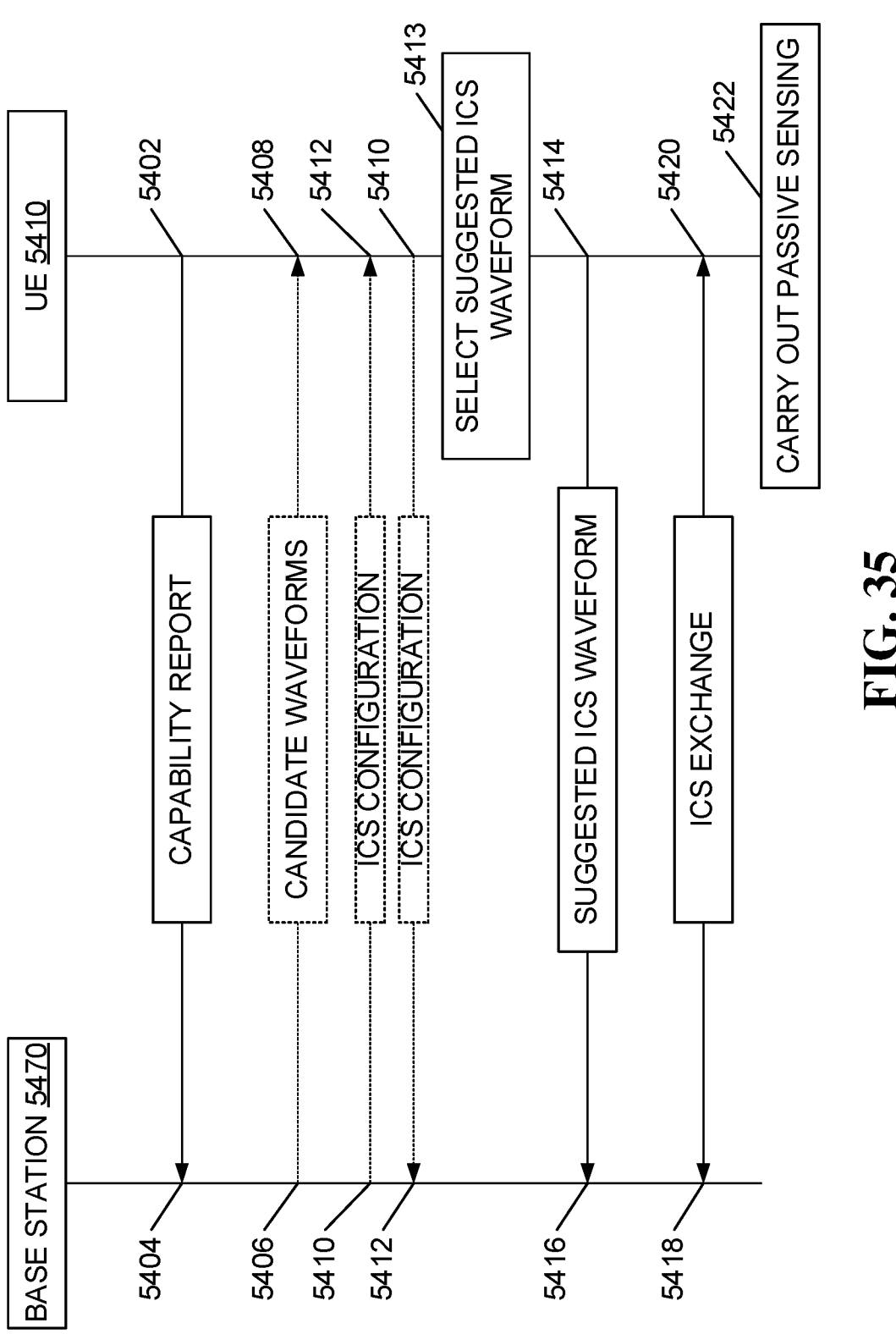
FIG. 35 illustrates, in a signal flow diagram, negotiation between the user equipment of FIG. 2 and the base station of FIG. 3 to settle upon a waveform for an ICS signal that is to be transmitted by the user equipment in an example wherein mono-static sensing is to be carried out by the user equipment according to aspects of the present application.

In a first example, mono-static sensing is to be carried out by the UE 5110. The signal flow diagram of FIG. 35 illustrates negotiation between the UE 55110 and the BS 5170 to settle upon a waveform for the ICS signal that is to be transmitted by the UE 5110.

Initially, the UE 5110 transmits (step 5402), to the BS 5170, a capability report. The BS 5170 receives (step 5404) the capability report. The transmission (step 5402) may, in one aspect, use static signaling and, in another aspect, use semi-static signaling. Semi-static signaling may, for example, include radio resource control (RRC) signaling and signaling using a control element (CE) in the known media access control (MAC) sublayer, that is, a "MAC-CE."

The capability report may include indications of waveforms supported by the UE 5110. Also included in the capability report may be an indication of RF capability, an indication of RF power amplifier (PA) capability, an indication of duplexing capability, and an indication of RF processing capability. The capability report may also include an indication of supported bandwidth. In some embodiments, the supported bandwidth may further include a partial bandwidth or full bandwidth of a bandwidth part (BWP), or a plurality of BWPs. In some embodiments, the capability report may include the supported waveform for a given spectrum, BWP or a plurality of BWPs. The capability report may further include the bandwidth supported by a given carrier frequency, such as a sub-6 GHz carrier frequency band, an above 6 GHz carrier frequency band, a millimeter wave (mmWave) band, a terahertz (THz) band, and the like. In some embodiments, the capability report may include separate indications of communication capability and sensing capability. In some other embodiments, the capability report may be a joint capability report. The sensing capability report may be comprised of non-RF based sensing capability including camera capability report and LIDAR capability report. The origin of the term "LIDAR," like the origin of the term RADAR, has many explanations. In one of the explanations, the term is said to be formed from letters in the phrase Light Detection and Ranging. Recently, advances in self-driving cars have relied on LIDAR technology to allow cars to sense the environment in which the cars are expected to navigate safely.

The capability report need not stand alone specific to aspects of the present application related to waveform adaptation. Indeed, the capability report may, in some aspects of the present application, be a part of a more general capability report routinely transmitted from the UE 5110 to the BS 5170.

Optionally, the BS 5170 may generate, based on the capability report, a shortlist of candidate waveforms to be used for the ICS signal. The BS 5170 may then transmit (step 5406) the shortlist to the UE 5110. Upon receiving (step 408) the shortlist of candidate waveforms, the UE 5110 may save the shortlist to the UE memory 5208.

The UE 5110 transmits (step 5410) an ICS configuration indication to the BS 5170. Upon receiving (step 5412) the ICS configuration indication, the BS 5170 may save the ICS configuration indication to the BS memory 5358. In some embodiments, the ICS configuration indication may be a dynamic signaling, which can be changed from one indication to another. In this dynamic signaling case, the ICS configuration indication can be signaled to the BS 5170 using dynamic signaling like L1 signaling, e.g., through the known downlink control information (DCI) information structure. Alternatively, the ICS configuration indication may be a semi-static signaling, which is not changed very frequently. In this semi-static signaling case, the ICS configuration indication can be signaled to the BS 5170 using higher layer signaling, e.g., through RRC signaling or signaling that uses the MAC-CE.

The ICS configuration indication can, alternatively, be transmitted (step 5410) from the BS 5170 and received (step 5412) by the UE 5110, even if the UE 5110 were to perform the sensing. This may be related to the scenario in which the sensing is requested or instructed by the BS 5170 to be performed by the UE 5110.

The ICS configuration indication may specify a sensing-only ICS configuration with a preference for high sensing performance. Such an ICS configuration may be seen as suitable for dedicated sensing. It is known to implement a sensing-only ICS configuration using sensing pilot signals.

The ICS configuration indication may specify a sensing and communications ICS configuration. For example, the sensing and communications configuration may involve a low communications rate and a preference for high sensing performance. The low communications rate may, for example, support a data broadcast, a data multicast and/or a data groupcast, while the high sensing performance may be seen as suitable for dedicated sensing.

The ICS configuration indication may specify another sensing and communications ICS configuration, for example with a high communications rate and a medium sensing performance. The high communications rate may, for example, support a data unicast, while the medium sensing performance may be seen as suitable for common sensing.

The ICS configuration indication may also specify a communications-only ICS configuration.

The ICS configuration indication may further specify a sensing mode between a mono-static sensing mode and a multi-static sensing mode. In a mono-static sensing mode, the same device that transmits the ICS signal receives and processes reflections of the ICS signal to, thereby, carry out the sensing operation. In a multi-static sensing mode, the device that transmits the ICS signal is distinct from the devices that receive and process reflections of the ICS signal to carry out the sensing operation. An example implementation of multi-static sensing is called bi-static sensing and involves a single transmitting device and a single receiving and processing device.

The ICS configuration indication may further specify an out-of-band leakage (OBL) consideration. That is, the ICS configuration indication may specify a degree to which OBL is to be tolerated, if at all.

The ICS configuration indication may still further specify a modulation and coding scheme. In some embodiments, the ICS configuration indication may include the time/frequency resource indication over which the ICS signal is transmitted. In some embodiments, the ICS configuration indication may further include the spatial resource indication specifying over which spatial direction the ICS signal is transmitted.

Subsequent to transmitting (step 5410), to the BS 5170, or receiving, from the BS 5170, the ICS configuration indication, the UE 5110 may select (step 5413) an indication of a suggested ICS waveform to satisfy the ICS strategy proposed by the ICS configuration indication. The UE 5110 then transmits (step 5414) an indication of the selected suggested ICS waveform to the BS 5170. Notably, the selection (step 5413) and transmission (step 5414), by the UE 5110, of a suggested ICS waveform is optional. That is, the UE 5110 need not select a suggested ICS waveform. All of the ICS details may be dictated by the BS 5170. The UE 5110 may also transmit (not shown), to other UEs 5110 in the coverage area, the indication of the selected ICS waveform. When transmitting the indication to the other UEs 5110, the UE 5110 may use SL communication techniques. The BS 5170 receives (step 5416) the indication of the selected ICS waveform and saves the indication to the BS memory 5358. The BS 5170 may transmit (not shown), to the UE 5110, an acknowledgement of the receipt (step 5416) of the indication of the selected ICS waveform. Alternatively, the BS 5170 may transmit (not shown), to the UE 5110, an override of the selected ICS waveform. That is, the BS 5170 transmit (not shown) an indication of a replacement ICS waveform, where the replacement ICS waveform has been selected by the BS 5170. The UE 5110 may transmit (not shown), to the BS 5170, an acknowledgement of the receipt of the indication of the selected ICS waveform.

An exchange of ICS communication may then proceed with the BS 5170 transmitting (step 5418) downlink (DL) communication to the UE 5110 and the UE 110 transmitting (step 5420) uplink (UL) communication to the BS 5170 or sidelink (SL) communication to another UE 5110. In particular, the UE 5110 may employ the selected ICS waveform when transmitting (step S420) the UL communication or SL communication in an ICS signal. The UE 5110 may then carry out passive sensing (step 5422) by receiving and processing reflections of the ICS waveform transmitted in step 5420.

Notably, the signal flow illustrated in FIG. 35 relates to a mono-static sensing based at the UE 5110. Furthermore, the DL communication transmitted (step 5418) by the BS 5170 is not expected to employ the selected ICS waveform.

The selection (step 5413), by the UE 5110, of a suggested ICS waveform to satisfy the ICS strategy proposed by the ICS configuration indication has many potential outcomes. To assist in the making the selection (step 5413), the UE 5110 may maintain, in the UE memory 5208, selection assistance data, such as the data presented in an example table 5500 illustrated in FIG. 36.

The example table 5500 includes a section for ICS configuration strategy, a section for ICS capability and a section for OBL. Along the left side of the example table 5500 are references to five candidate ICS waveforms. The references to candidate ICS waveforms include: a reference to a FMCW waveform; a reference to CP-OFDM; a reference to OFDM (without CP); a reference to a Filter Bank Multicarrier (FBMC) waveform; and a reference to a Ultra-Wideband (UWB) pulse radar waveform. A given row of the example table 5500 is associated with a given one of the five candidate ICS waveforms.

Within each row and within the section for ICS configuration strategy is an indication of the suitability of the given one of the five candidate ICS waveforms to each of the configuration strategies. In the example table 5500 of FIG. 36, the suitability is indicated either with a "V" to represent suitability or with an "X" to represent unsuitability.

Additionally, within each row and within the section for ICS capability is an indication of the suitability of the given one of the five candidate ICS waveforms to each of the ICS capabilities. In the example table 5500 of FIG. 36, the suitability is indicated either with a "V" to represent suitability or with a specific note to represent conditional suitability. In particular, a specific note indicates that CP-OFDM is suitable in the presence of "high" RF capability. Further particularly, a specific note indicates that CP-OFDM is suitable in the presence of full duplex capability. In another example, a specific note indicates that OFDM (without CP) is suitable in the presence of "high" RF power amplifier (PA) capability. Furthermore, a specific note indicates that OFDM (without CP) is suitable when the UE has "high" processing capability. A similar note indicates that FBMC is suitable when the UE has "high" processing capability.

Furthermore, within each row and within the section for OBL is an indication of the tolerance to OBL of each of the five candidate ICS waveforms. A "√" is used to indicate that FBMC is tolerant of OBL. An "X" is used to indicate that UWB pulse radar is intolerant of OBL. An "OK" note indicates that FMCW, CP-OFDM and OFDM without CP are reasonably tolerant of OBL.

As should be well understood, the example table 5500 illustrated in FIG. 36 is merely one example. Alternative tables may be different from the example table 5500 illustrated in FIG. 36 in the waveforms that are decided between, the configuration strategies and the capabilities.

Figure 37:
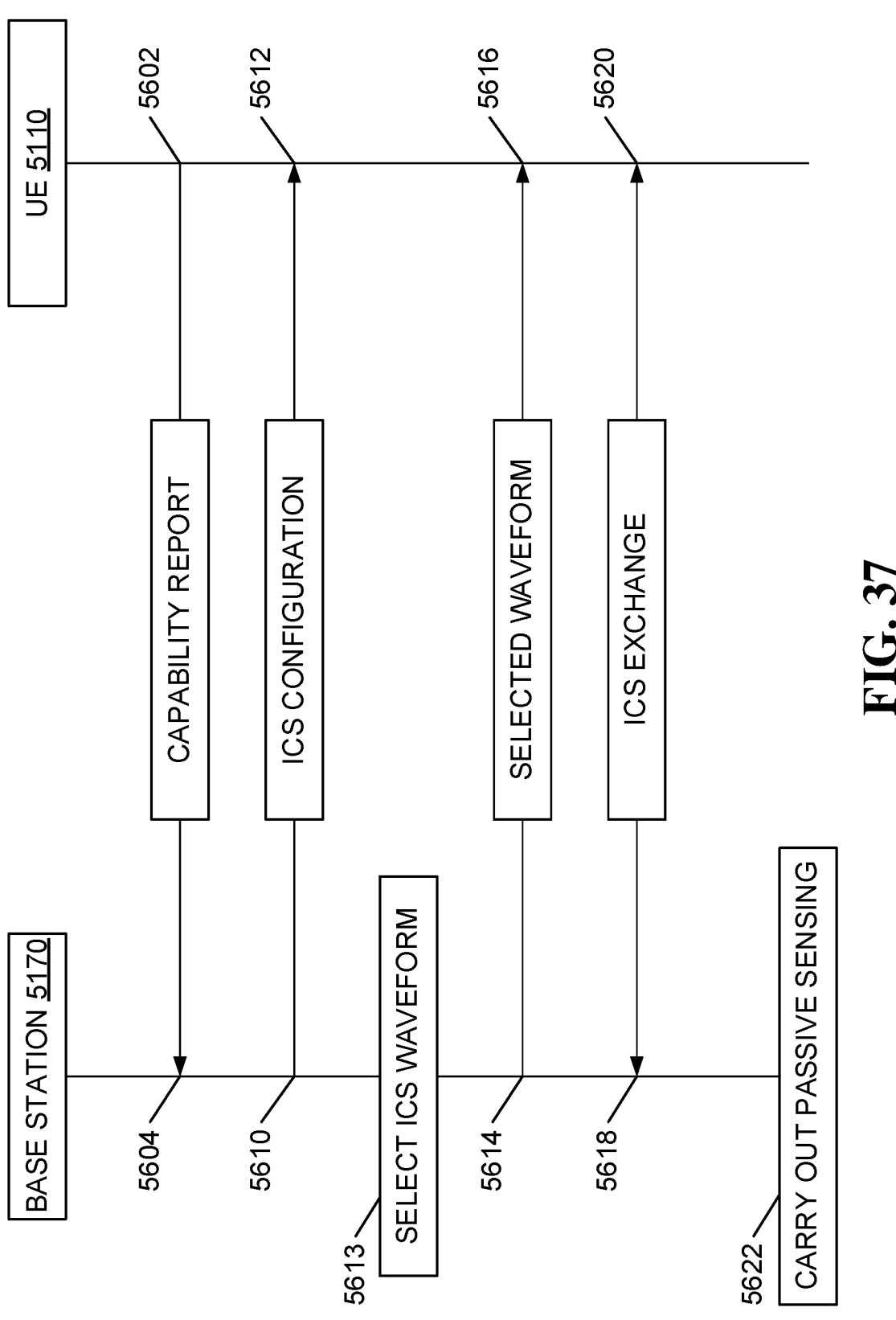
FIG. 37 illustrates, in a signal flow diagram, negotiation between the user equipment of FIG. 2 and the base station of FIG. 3 to settle upon a waveform for an ICS signal that is to be transmitted by the base station in an example wherein mono-static sensing is to be carried out by the base station according to aspects of the present application.

FIG. 37 illustrates, in a signal flow diagram, interaction between the BS 5170 and the UE 5110 for a scenario wherein the BS 5170 performs mono-static sensing.

In the example of FIG. 37, mono-static sensing is to be carried out by the BS 5170. The signal flow diagram of FIG. 37 illustrates communication between the UE 5110 and the BS 5170 so that the UE 5110 can anticipate a particular waveform for the ICS signal that is to be transmitted by the BS 5170.

Initially, the UE 5110 transmits (step 5602), to the BS 5170, a capability report. The BS 5170 receives (step 5604) the capability report. The transmission (step 5602) may, in one aspect, use static signaling and, in another aspect, use semi-static signaling. The capability report may also include an indication of supported bandwidth. In some embodiments, the capability report may include separate indications of communication capability and sensing capability. In some other embodiments, the capability report may be a joint capability report. The sensing capability report may be comprised of non-RF based sensing capability including camera capability report and LIDAR capability report.

The BS 5170 transmits (step 5610) an ICS configuration indication to the UE 5110. Upon receiving (step 5612) the ICS configuration indication, the UE 5110 may save the ICS configuration indication to the UE memory 5208. In some embodiments, the ICS configuration indication may be a dynamic signaling, which can be changed from one indication to another. In this dynamic signaling case, the ICS configuration indication can be signaled to the BS 5170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 5170 using higher layer signaling, e.g., through RRC signaling or signaling that uses the MAC-CE.

Subsequent to transmitting (step 5610), to the UE 5110, the ICS configuration indication, the BS 5170 selects (step 5613) an ICS waveform to satisfy the ICS strategy proposed by the ICS configuration indication. The BS 5170 then transmits (step 5614) an indication of the selected ICS waveform to the UE 5110. The transmission (step 5614) of the indication of the selected ICS waveform to the UE 5110 may be part of a broadcast or a groupcast of the indication of the selected ICS waveform. The UE 5110 receives (step S616) the indication of the selected ICS waveform and saves the indication to the UE memory 5208.

An exchange of ICS communication may then proceed with the BS 5170 transmitting (step 5618) DL communication to the UE 5110 and the UE 5110 transmitting (step 5620) UL communication to the BS 5170. In particular, the BS 5170 may employ the selected ICS waveform when transmitting (step 5618) the DL communication in an ICS signal. The BS 5170 may then carry out passive sensing (step 5622) by receiving and processing reflections of the ICS waveform transmitted in step 5618.

Given that the signal flow illustrated in FIG. 37 relates to a mono-static sensing based at the BS 5170, the UL communication transmitted (step 5620) by the UE 5110 is not expected to employ the selected ICS waveform.

In this case, the ICS waveform selection is performed by the BS 5170 based on ICS capability report from the UE 5110.

In a further embodiment, the method of FIG. 37 can be extended to mono-static sensing at a plurality of BSs, such as BS 5170A and BS 5170B. In this case, the UE 5110 may send the capability report to only one BS (e.g., BS 5170A) and this BS may share the information with other BSs. In some embodiments, the UE 5110 may broadcast the capability report so all BSs will simultaneously receive the capability report. In some embodiments, each BS sends a separate ICS configuration indication to the UE. In some embodiments, each BS sends a separate selected waveform indication to the UE. In some embodiments, the selected waveform indication may include the waveform parameters which are specific to each BS. For example, a waveform parameter specific to a BS may be a signature function which can be applied on the selected waveform to obtain the ICS waveform transmitted by each BS. In some embodiments, the waveforms selected by different BSs are different. In some embodiments, the waveforms selected by the BSs are the same but each selected waveform uses a different waveform parameter.

Figure 38:
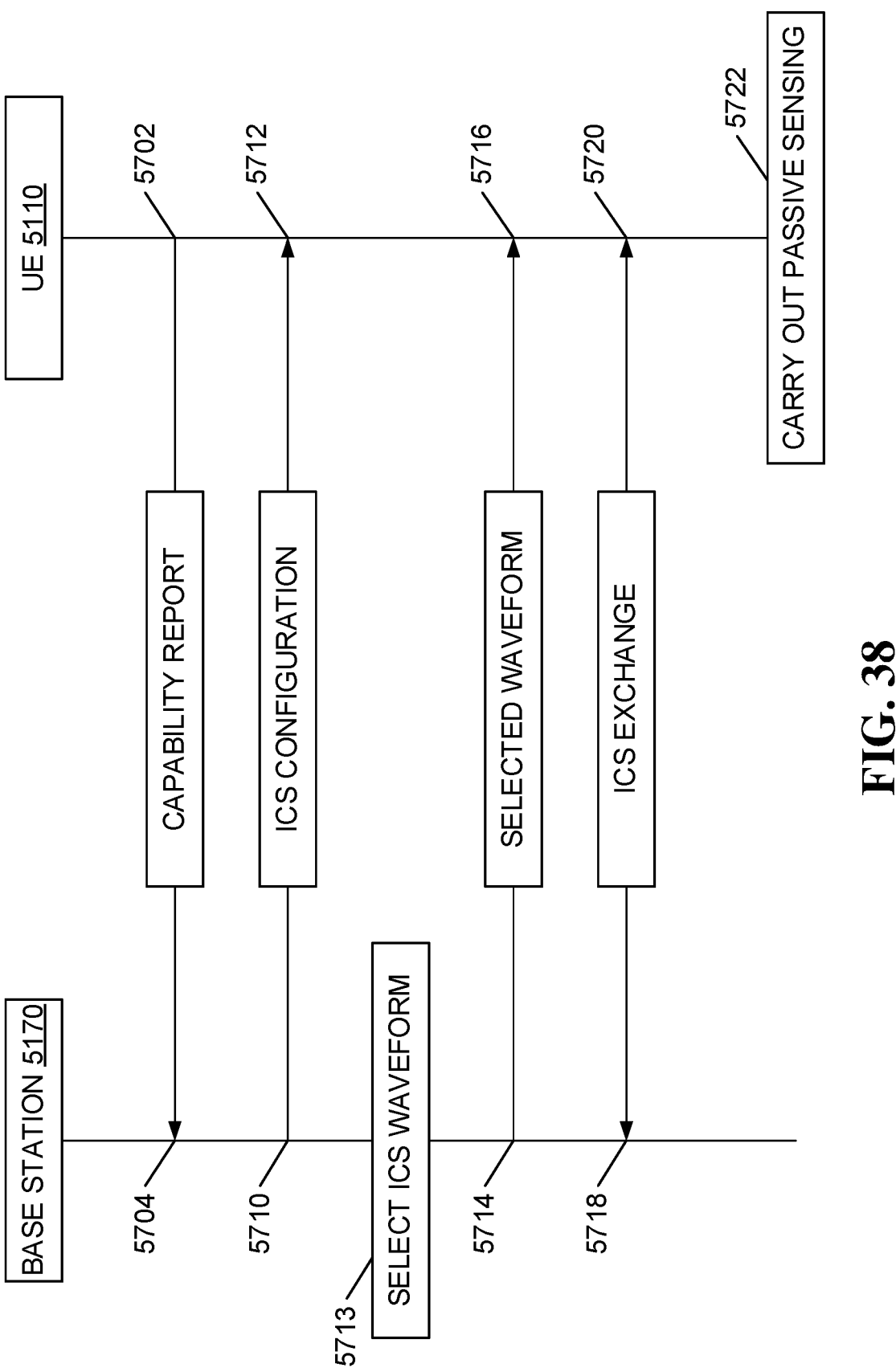
FIG. 38 illustrates, in a signal flow diagram, negotiation between the user equipment of FIG. 2 and the base station of FIG. 3 to settle upon a waveform for an ICS signal that is to be transmitted by the base station in an example wherein bi-static sensing is to be carried out with the user equipment receiving the ICS signal according to aspects of the present application.

FIG. 38 illustrates, in a signal flow diagram, interaction between the BS 5170 and the UE 5110 for a scenario wherein bi-static sensing is performed with the BS 5170 transmitting an ICS signal with a selected ICS waveform and the UE 5110 performing the sensing.

Initially, the UE 5110 transmits (step 5702), to the BS 5170, a capability report. The BS 5170 receives (step 5704) the capability report. The transmission (step 5702) may, in one aspect, use static signaling and, in another aspect, use semi-static signaling.

The BS 5170 transmits (step 5710) an ICS configuration indication to the UE 5110. Upon receiving (step 5712) the ICS configuration indication, the UE 5110 may save the ICS configuration indication to the UE memory 5208. Notably, upon receiving (step 5712) the ICS configuration indication, the UE 5110 may also transmit (not shown) the ICS configuration indication to other UEs 5110 in the coverage area. In some embodiments, the ICS configuration indication may be a dynamic signaling, which can be changed from one indication to another. In this dynamic signaling case, the ICS configuration indication can be signaled to the BS 5170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 5170 using higher layer signaling, e.g., through RRC signaling or signaling that uses the MAC-CE.

Subsequent to transmitting (step 5710), to the UE 5110, the ICS configuration indication, the BS 5170 selects (step 5713) an ICS waveform to satisfy the ICS strategy proposed by the ICS configuration indication. The BS 5170 then transmits (step 5714) an indication of the selected ICS waveform to the UE 5110. The transmission (step 5714) of the indication of the selected ICS waveform to the UE 5110 may be part of a broadcast or a groupcast or a unicast of the indication of the selected ICS waveform. The UE 5110 receives (step 5716) the indication of the selected ICS waveform and saves the indication to the UE memory 5208.

An exchange of ICS communication may then proceed with the BS 5170 transmitting (step 5718) DL communication to the UE 5110 and the UE 5110 transmitting (step 5720) UL communication to the BS 5170. In particular, the BS 170 may employ the selected ICS waveform when transmitting (step 5718) the DL communication in an ICS signal. The UE 5110 may then carry out passive sensing (step 5722) by receiving and processing reflections of the ICS waveform transmitted, by the BS 5170, in step 5718.

In this case, the ICS waveform selection is performed by the BS 5170 based on ICS capability report from the UE 5110.

Figure 39:
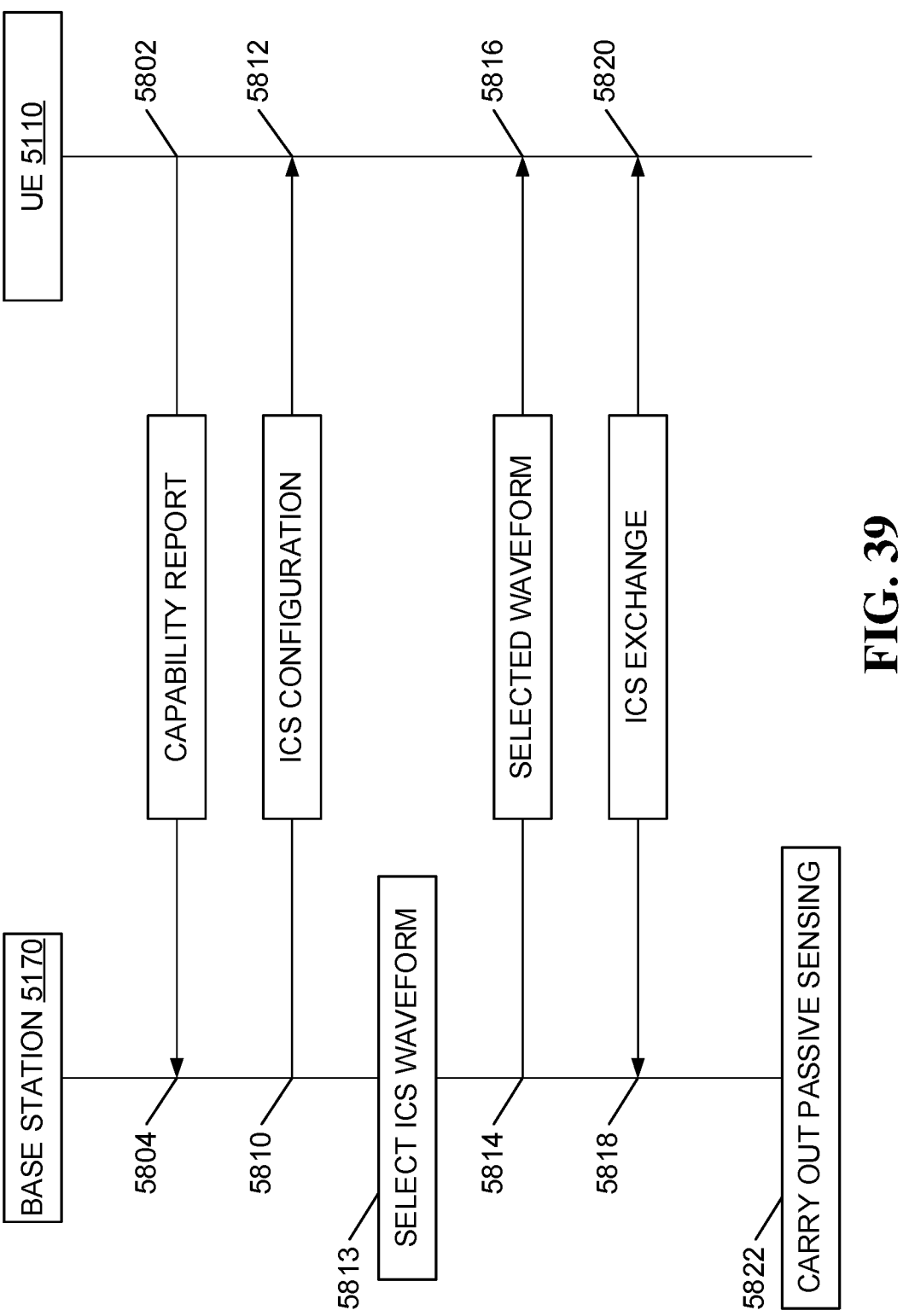
FIG. 39 illustrates, in a signal flow diagram, negotiation between the user equipment of FIG. 2 and the base station of FIG. 3 to settle upon a waveform for an ICS signal that is to be transmitted by the user equipment in an example wherein bi-static sensing is to be carried out with the base station receiving the ICS signal according to aspects of the present application.

FIG. 39 illustrates, in a signal flow diagram, interaction between the BS 5170 and the UE 5110 for a scenario wherein bi-static sensing is performed with the UE 5110 transmitting an ICS signal with a selected ICS waveform and the BS 5170 performing the passive sensing, by receiving and processing reflections of the ICS waveform transmitted, by the UE 5110.

Initially, the UE 5110 transmits (step 5802), to the BS 5170, a capability report. The BS 5170 receives (step 5804) the capability report. The transmission (step 5802) may, in one aspect, use static signaling and, in another aspect, use semi-static signaling.

The BS 5170 transmits (step 5810) an ICS configuration indication to the UE 5110. Upon receiving (step 5812) the ICS configuration indication, the UE 5110 may save the ICS configuration indication to the UE memory 5208. Notably, upon receiving (step 5812) the ICS configuration indication, the UE 5110 may also transmit (not shown) the ICS configuration indication to other UEs 5110 in the coverage area. In some embodiments, the ICS configuration indication may be a dynamic signaling, which can be changed from one indication to another. In this dynamic signaling case, the ICS configuration indication can be signaled to the BS 5170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 5170 using higher layer signaling, e.g., through RRC signaling or signaling that uses the MAC-CE.

Subsequent to transmitting (step 5810), to the UE 5110, the ICS configuration indication, the BS 5170 selects (step 5813) an ICS waveform to satisfy the ICS strategy proposed by the ICS configuration indication. The BS 5170 then transmits (step 5814) an indication of the selected ICS waveform to the UE 5110. The transmission (step 5814) of the indication of the selected ICS waveform to the UE 5110 may be part of a broadcast or a groupcast or a unicast of the indication of the selected ICS waveform. The UE 5110 receives (step 5816) the indication of the selected ICS waveform and saves the indication to the UE memory 5208.

An exchange of ICS communication may then proceed with the BS 5170 transmitting (step 5818) DL communication to the UE 5110 and the UE 5110 transmitting (step 5820) UL communication to the BS 5170. In particular, the UE 5110 may employ the selected ICS waveform when transmitting (step 5820) the UL communication in an ICS signal. The BS 5170 may then carry out passive sensing (step 5822) by receiving and processing reflections of the ICS waveform transmitted, by the UE 5110, in step 5820.

In this case, the ICS waveform selection may be performed by the UE 5110 based on a recommendation from the BS 5170. In some embodiments, the waveform selection is performed by the BS 5170 and the waveform selection indication is transmitted to the UE 5110.

Figure 40:
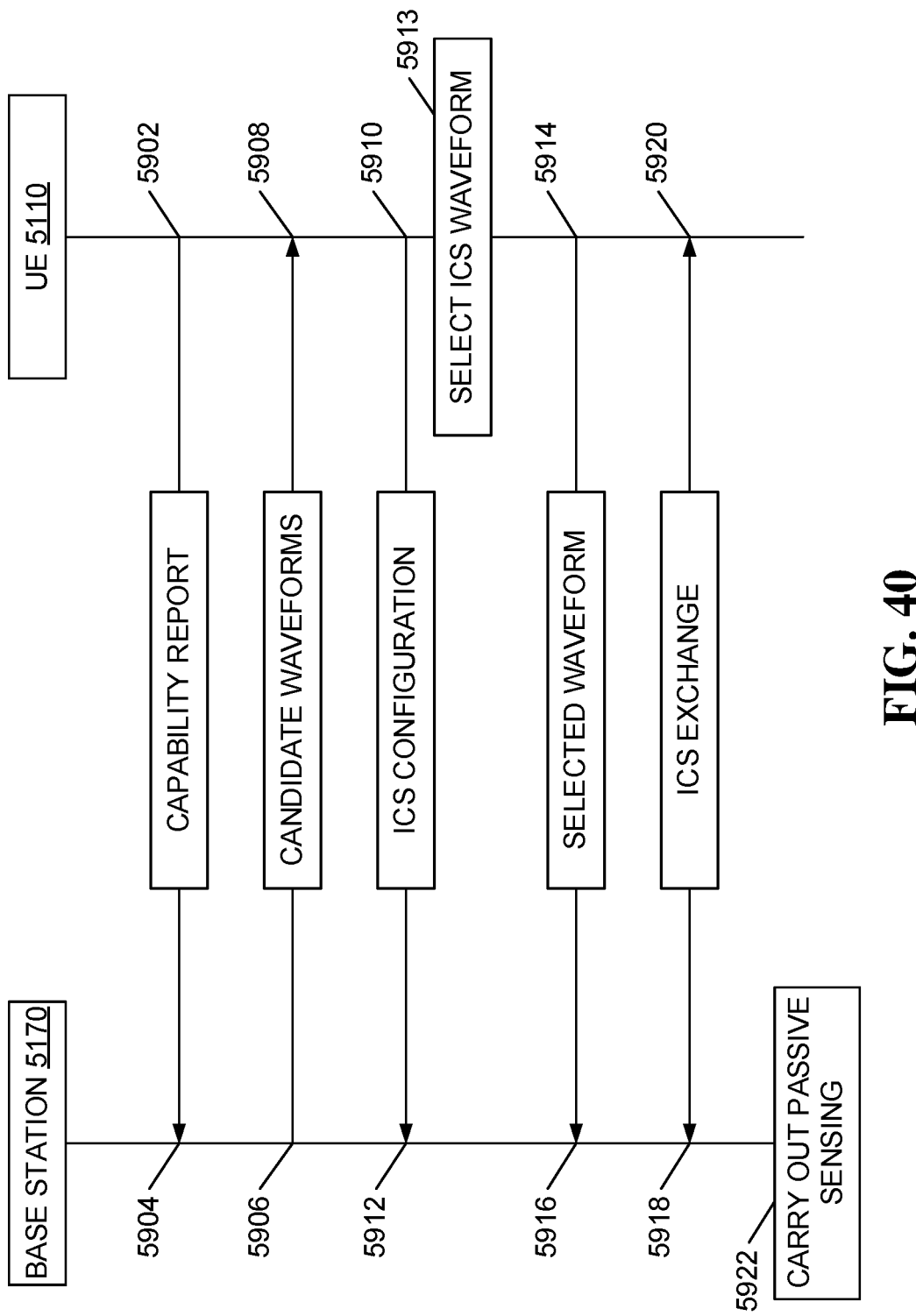
FIG. 40 illustrates, in a signal flow diagram as an alternative to the signal flow diagram of FIG. 39, negotiation between the user equipment of FIG. 2 and the base station of FIG. 3 to settle upon a waveform for an ICS signal that is to be transmitted by the user equipment in an example wherein bi-static sensing is to be carried out with the base station receiving the ICS signal according to aspects of the present application.

FIG. 40 illustrates, in a signal flow diagram as an alternative to the signal flow diagram of FIG. 39, interaction between the BS5 170 and the UE 5110 for a scenario wherein bi-static sensing is performed with the UE 5110 transmitting an ICS signal with a selected ICS waveform and the BS 5170 performing the passive sensing, by receiving and processing reflections of the ICS waveform transmitted, by the UE 5110.

Initially, the UE 5110 transmits (step 5902), to the BS 5170, a capability report. The BS 5170 receives (step 5904) the capability report. The transmission (step 5902) may, in one aspect, use static signaling and, in another aspect, use semi-static signaling.

The BS 5170 may generate, based on the capability report, a shortlist of candidate waveforms to be used for the ICS signal. The BS 5170 may then transmit (step 5906) the shortlist to the UE 5110. Upon receiving (step 5908) the shortlist of candidate waveforms, the UE 5110 may save the shortlist to the UE memory 5208.

The UE 5110 transmits (step 5910) an ICS configuration indication to the BS 5170. Upon receiving (step 5912) the ICS configuration indication, the BS 5170 may save the ICS configuration indication to the BS memory 5358. Notably, the UE 5110 may also transmit (not shown) the ICS configuration indication to other UEs 5110 in the coverage area. In some embodiments, the ICS configuration indication may be a dynamic signaling, which can be changed from one indication to another. In this dynamic signaling case, the ICS configuration indication can be signaled to the BS 5170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 5170 using higher layer signaling, e.g., through RRC signaling or signaling that uses the MAC-CE.

Subsequent to transmitting (step 5910), to the BS 5170, the ICS configuration indication, the UE 5110 selects (step 5913) an ICS waveform to satisfy the ICS strategy proposed by the ICS configuration indication. The UE 5110 then transmits (step 5914) an indication of the selected ICS waveform to the BS 5170. The UE 5110 may also transmit, to other UEs 5110 in the coverage area, the indication of the selected ICS waveform. When transmitting the indication to the other UEs 5110, the UE 5110 may use SL communication techniques. The BS 5170 receives (step 5916) the indication of the selected ICS waveform and saves the indication to the BS memory 5358. The BS 5170 may transmit (not shown), to the UE 5110, an acknowledgement of the receipt (step 5916) of the indication of the selected ICS waveform. Alternatively, the BS 5170 may transmit (not shown), to the UE 5110, an override of the selected ICS waveform. That is, the BS 5170 transmit (not shown) an indication of a different ICS waveform, where the different ICS waveform has been selected by the BS 5170.

An exchange of ICS communication may then proceed with the BS 5170 transmitting (step 5918) DL communication to the UE 5110 and the UE 5110 transmitting (step 5920) UL communication to the BS 5170. In particular, the UE 5110 may employ the selected ICS waveform when transmitting (step 5920) the UL communication in an ICS signal. The BS 5170 may then carry out passive sensing (step 5922) by receiving and processing reflections of the ICS waveform transmitted, by the UE 5110, in step 5920.

Figure 41:
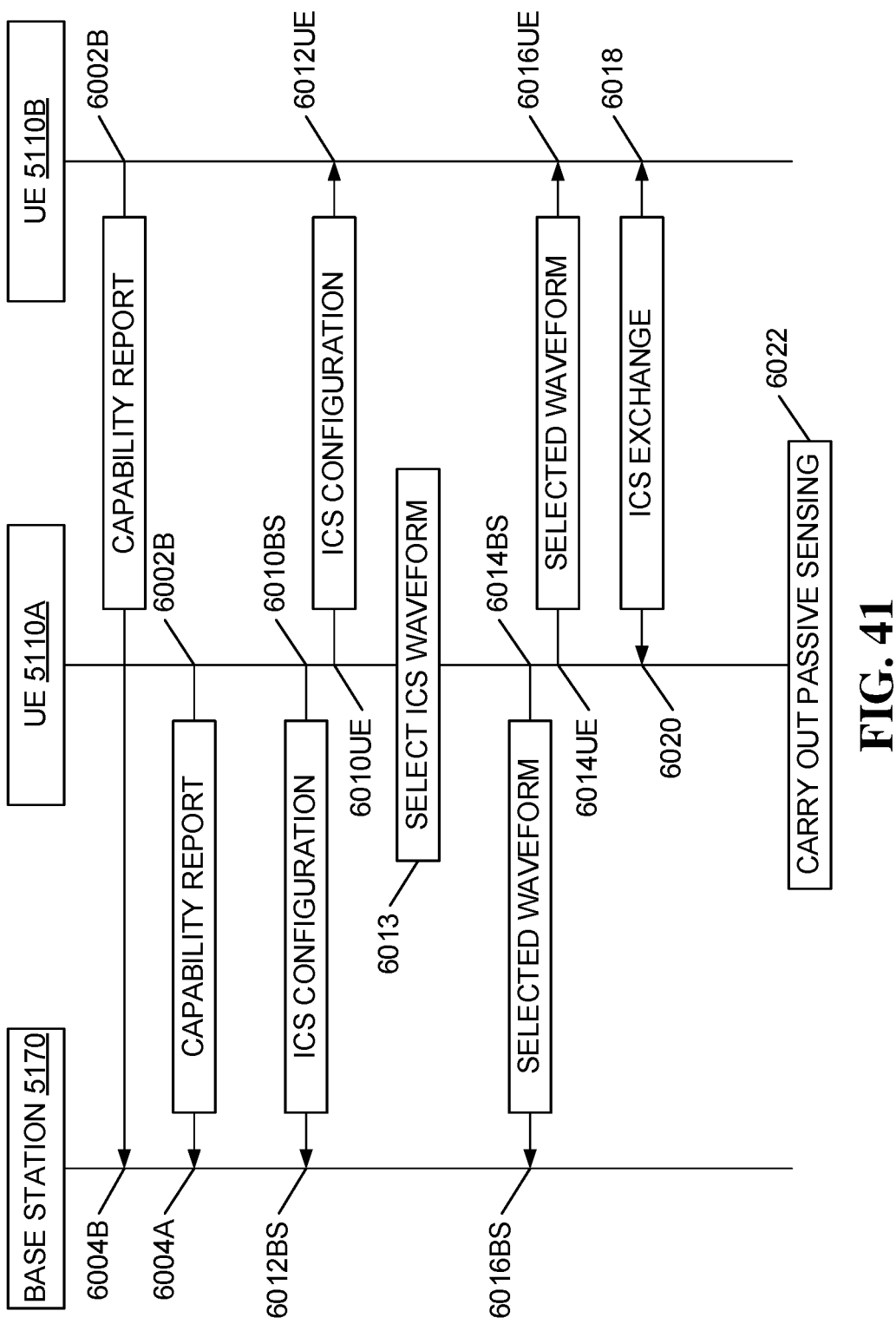
FIG. 41 illustrates, in a signal flow diagram, negotiation between two user equipments of FIG. 1 and the base station of FIG. 3 to settle upon a waveform for an ICS signal that is to be transmitted by one user equipment in an example wherein bi-static sensing is to be carried out with the other user equipment receiving the ICS signal according to aspects of the present application.

FIG. 41 illustrates, in a signal flow diagram, interaction between the BS 5170, the first UE 5110A and the second UE 5110B for a scenario wherein bi-static sensing is performed with the second UE 5110B transmitting an ICS signal with an ICS waveform selected by the first UE 5110A and the first UE 5110A performing the passive sensing, by receiving and processing reflections of the ICS waveform transmitted, by the UE 5110B.

Initially, the first UE 5110A transmits (step 6002A), to the BS 170, a capability report. The BS 5170 receives (step 6004A) the capability report. Additionally, the second UE 5110B transmits (step 6002B), to the BS 5170, a capability report. The BS 5170 receives (step 6004B) the capability report. The transmissions (steps 6002A and 6002B) may, in one aspect, use static signaling and, in another aspect, use semi-static signaling.

The first UE 5110A transmits (step 6010BS) an ICS configuration indication to the BS 5170. Upon receiving (step 6012BS) the ICS configuration indication, the BS 670 may save the ICS configuration indication to the BS memory 5358. Notably, the first UE 5110A may also transmit (step 6010UE) the ICS configuration indication to the second UE 5110B. Upon receiving (step 6012UE) the ICS configuration indication, the second UE 5110B may save the ICS configuration indication to the UE memory 5208. In some embodiments, the ICS configuration indication may be a dynamic signaling, which can be changed from one indication to another. In this dynamic signaling case, the ICS configuration indication can be signaled to the BS 5170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 5170 using higher layer signaling, e.g., through RRC signaling or signaling that uses the MAC-CE.

Subsequent to transmitting (step 6010BS), to the BS 5170, the ICS configuration indication, the first UE 5110A selects (step 6013) an ICS waveform to satisfy the ICS strategy proposed by the ICS configuration indication. The first UE 5110A then transmits (step 6014BS) an indication of the selected ICS waveform to the BS 5170. The BS 5170 receives (step 6016BS) the indication of the selected ICS waveform and saves the indication to the BS memory 5358. The first UE 5110A also transmits (step 6014UE) the indication of the selected ICS waveform to the second UE 5110B. The second UE 5110B receives (step 6016UE) the indication of the selected ICS waveform and saves the indication to the UE memory 5208. The UE 5110 may also transmit, to other UEs 5110 in the coverage area, the indication of the selected ICS waveform. When transmitting the indication to the other UEs 5110, the UE 5110 may use SL communication techniques.

An exchange of ICS communication may then proceed with the second UE 5110B transmitting (step 6018) SL communication to the first UE 5110A and the first UE 5110A transmitting (step 6020) SL communication to the second UE 5110B. In particular, the second UE 5110B may employ the selected ICS waveform when transmitting (step 6020) the SL communication in an ICS signal. The first UE 5110A may then carry out passive sensing (step 6022) by receiving and processing reflections of the ICS waveform transmitted, by the second UE 5110B, in step 6018.

Figure 42:
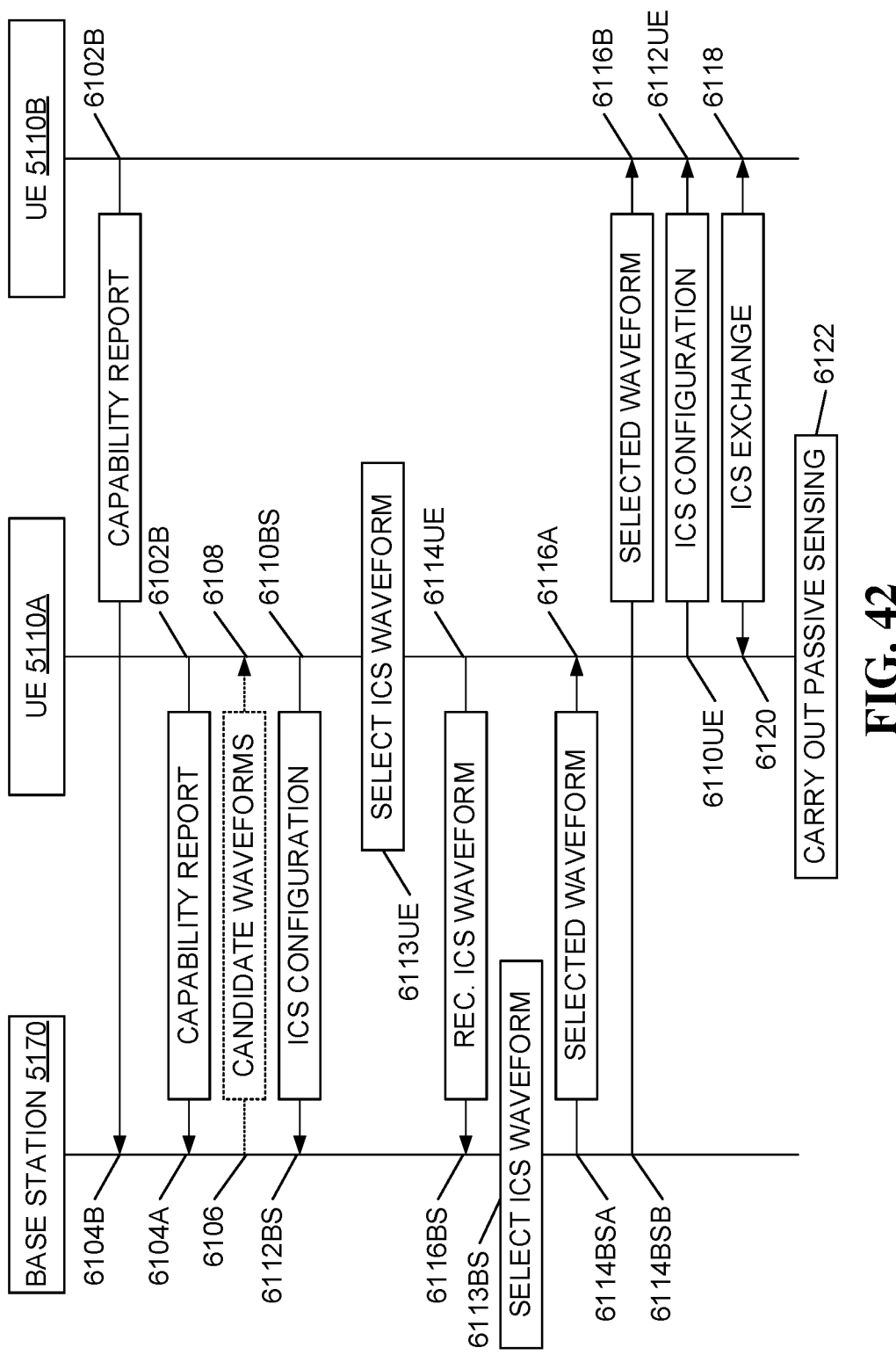
FIG. 42 illustrates, in a signal flow diagram as an alternative to the signal flow diagram of FIG. 41, negotiation between two user equipments of FIG. 1 and the base station of FIG. 3 to settle upon a waveform for an ICS signal that is to be transmitted by one user equipment in an example wherein bi-static sensing is to be carried out with the other user equipment receiving the ICS signal according to aspects of the present application.

FIG. 42 illustrates, in a signal flow diagram, interaction between the BS 5170, the first UE 5110A and the second UE 5110B for a scenario wherein bi-static sensing is performed with the second UE 5110B transmitting an ICS signal with an ICS waveform selected by the BS 5170 and the first UE 5110A performing the passive sensing, by receiving and processing reflections of the ICS waveform transmitted, by the UE 5110B.

Initially, the first UE 5110A transmits (step 6102A), to the BS 5170, a capability report. The BS 5170 receives (step 6104A) the capability report. Additionally, the second UE 5110B transmits (step 6102B), to the BS 5170, a capability report. The BS 5170 receives (step 6104B) the capability report. The transmissions (steps 6102A and 6102B) may, in one aspect, use static signaling and, in another aspect, use semi-static signaling.

Optionally, the BS 5170 may generate, based on the capability reports, a shortlist of candidate waveforms to be used for the ICS signal. The BS 5170 may then transmit (step 6106) the shortlist to the first UE 5110A. Upon receiving (step 6108) the shortlist of candidate waveforms, the first UE 5110A may save the shortlist to the UE memory 5208.

The first UE 5110A transmits (step 6110BS) an ICS configuration indication to the BS 5170. Upon receiving (step 6112BS) the ICS configuration indication, the BS 5170 may save the ICS configuration indication to the BS memory 5358. In some embodiments, the ICS configuration indication may be a dynamic signaling, which can be changed from one indication to another. In this dynamic signaling case, the ICS configuration indication can be signaled to the BS 5170 using dynamic signaling like L1 signaling, e.g., through the known DCI information structure. Alternatively, the ICS configuration indication may be a semi-static signaling, which is not changed very frequently. In this semi-static signaling case, the ICS configuration indication can be signaled to the BS 5170 using higher layer signaling, e.g., through RRC signaling or signaling that uses the MAC-CE.

Subsequent to transmitting (step 6110BS), to the BS 5170, the ICS configuration indication, the first UE 5110A selects (step 6113UE) a "recommended" ICS waveform to satisfy the ICS strategy proposed by the ICS configuration indication. The first UE 5110A then transmits (step 6114UE) an indication of the recommended ICS waveform to the BS 5170. The BS 5170 receives (step 6116BS) the indication of the recommended ICS waveform and saves the indication to the BS memory 5358.

Notably, the first UE 5110A may also transmit (step 6110UE) the ICS configuration indication to the second UE 5110B and to other UEs 5110 in the coverage area. Upon receiving (step 6112UE) the ICS configuration indication, the second UE 5110B may save the ICS configuration indication to the UE memory 5208.

Despite having received (step 6116BS) the indication of the recommended ICS waveform, the BS 5170 may select (step 6113BS) a distinct ICS waveform. The BS 5170 may then transmit (6114BSA) an indication of the selected ICS waveform to the first UE 5110A. Upon receiving (step 6116A) the indication of the selected ICS waveform, the first UE 5110A may save the indication of the selected ICS waveform to the UE memory 5208. The BS 5170 may further transmit (6114BSB) an indication of the selected ICS waveform to the second UE 5110B. Upon receiving (step 6116B) the indication of the selected ICS waveform, the second UE 5110B may save the indication of the selected ICS waveform to the UE memory 5208.

An exchange of ICS communication may then proceed with the second UE 5110B transmitting (step 6118) SL communication to the first UE 5110A and the first UE 5110A transmitting (step 6120) SL communication to the second UE 5110B. In particular, the second UE 5110B may employ the selected ICS waveform when transmitting (step 6118) the SL communication in an ICS signal. The first UE 5110A may then carry out passive sensing (step 6122) by receiving and processing reflections of the ICS waveform transmitted, by the second UE 5110B, in step 6118.

It has been described hereinbefore that the selection of an ICS waveform by the UE 5110 (step 5413, 5913 or 6113UE) or by the BS 5170 (step 5613, 5713, 5813 or 6113BS) may be carried out in view of data such as presented in the example table 5500 of FIG. 36. Notably, further data may be taken into consideration when selecting an ICS waveform. For example, there may be key performance indicators (KPIs) associated with sensing and the selection of the ICS waveform may take these KPIs into consideration. Additionally, there may be consideration of a sensing "mode." The mode may relate to common sensing or directed sensing.

The selection of an ICS waveform by the UE 5110 (step 5413, 5913 or 6113UE) or by the BS 5170 (step 5613, 5713, 5813 or 6113BS) may be carried out in view of an example decision tree 1200 illustrated in FIG. 12. As should be well understood, the decision tree 1200 illustrated in FIG. 42 is merely one example. Alternative decision trees may be different from the decision tree 1200 illustrated in FIG. 42 both in the waveforms that are decided between and the criteria for making the decisions.

When the UE 5110 has reported (in, e.g., step 5404) that the capability of the UE hardware is relatively low, there may be considered to be at least four waveform choices. For an ICS configuration strategy with a medium data embedding rate and high OBL tolerance, an FBMC waveform may be selected. For an ICS configuration strategy with a medium data embedding rate and low OBL tolerance, an OFDM waveform with no CP may be selected. For an ICS configuration strategy with a no or low data embedding rate and high OBL tolerance, an FBMC waveform may be selected. For an ICS configuration strategy with a no or low data embedding rate and low OBL tolerance, an FMCW waveform may be selected.

When the UE 5110 has reported (in, e.g., step 5404) that the capability of the UE hardware is relatively high, there may be considered to be at least four waveform choices. For an ICS configuration strategy with a high data embedding rate and high OBL tolerance, a filtered CP OFDM waveform may be selected. For an ICS configuration strategy with a high data embedding rate and low OBL tolerance, a CP-OFDM waveform may be selected. For an ICS configuration strategy with a low or medium data embedding rate and high OBL tolerance, an FBMC waveform may be selected. For an ICS configuration strategy with a low or medium data embedding rate and low OBL tolerance, a Direct Fourier Transform spread OFDM (DTF-s-OFDM) waveform may be selected.

In a first example of operation, waveform selection may be considered for each step in a two-step sensing approach that includes a first step of common sensing and a second step of dedicated sensing. Both types of sensing may be carried out at the BS 170 using mono-static sensing.

In the performance of the common sensing step, the BS 5170 is to sense the entire coverage area to obtain some general information about the environment.

In view of FIG. 37, the BS 5170 transmits (step 5610) an ICS configuration indication to the UE 5110 indicating that the ICS configuration strategy relates to common sensing with unicast data. The BS 5170 then selects (step 5613) an ICS waveform to satisfy the common sensing with unicast data strategy. For example, the BS 5170 may select (step 5613) the CP-OFDM waveform. The BS 5170 then transmits (step 5614) an indication of the CP-OFDM waveform to the UE 5110. Indeed, the transmission (step 5614) may employ broadcast signaling so that other UEs 5110 also receive the indication of the CP-OFDM waveform. The BS 5170 then transmits (step 5618) DL communication to the UE 5110 using the CP-OFDM waveform. As a result of carrying out (step 622) the common passive sensing, the BS

5170 may determine the presence of a target of interest near the UE 5110 and, responsively, the BS 5170 may initiate the second sensing step.

In the performance of the dedicated sensing step, the BS 5170 is to sense with a goal of obtaining more accurate information about the target of interest.

With this goal in mind, the BS 5170 transmits (step 5610) an ICS configuration indication to the UE 5110 indicating that the ICS configuration strategy relates to dedicated sensing with broadcast data. The BS 5170 then selects (step 5613) an ICS waveform to satisfy the dedicated sensing with broadcast data strategy. For example, the BS 5170 may select (step 5613) the OFDM waveform with no CP. The BS 5170 then transmits (step 5614) an indication of the OFDM waveform with no CP to the UE 5110. The BS 5170 then transmits (step 5618) DL communication to the UE 5110 using the OFDM waveform with no CP. As a result of carrying out (step 5622) the dedicated sensing, the BS 5170 may obtain more accurate information about the target of interest.

In a second example of operation, waveform selection may be considered for each step in a two-step sensing approach that includes a first step of common sensing and a second step of dedicated sensing. The common sensing step may be carried out at the BS 5170 using mono-static sensing. The dedicated sensing step may be carried out at the first UE 5110A using bi-static sensing.

In the performance of the common sensing step, the BS 5170 is to sense the entire coverage area to obtain some general information about the environment.

In view of FIG. 37, the BS 5170 transmits (step 5610) an ICS configuration indication to the first UE 5110A indicating that the ICS configuration strategy relates to common sensing with a low data rate. The BS 5170 then selects (step 5613) an ICS waveform to satisfy the common sensing with low data rate strategy. For example, the BS 5170 may select (step 5613) the OFDM waveform with no CP. The BS 5170 then transmits (step 5614) an indication of the OFDM waveform with no CP to the first UE 5110A. Indeed, the transmission (step 5614) may employ group-cast signaling so that other UEs 5110 also receive the indication of the OFDM waveform with no CP. The BS 5170 then transmits (step 5618) DL communication to the first UE 5110A using the OFDM waveform with no CP. As a result of carrying out (step 5622) the common passive sensing, the BS 5170 may determine the presence of a target of interest near the first UE 5110A and, responsively, the BS 5170 may initiate the second sensing step.

In the performance of the dedicated sensing step, the first UE 5110A is to sense with a goal of obtaining more accurate information about the target of interest.

With this goal in mind, the BS 5170 may employ the transmission (step 5618) of the common sensing ICS signal carrying DL communication to the first UE 5110A to transmit (step 5610) an ICS configuration indication to the first UE 5110A indicating that the ICS configuration strategy relates to a sensing-only ICS signal.

Furthermore, in view of FIG. 42, the BS 5170 may select (step 6113BS) an ICS waveform to satisfy the sensing-only strategy. For example, the BS 5170 may select (step 6113BS) the FMCW waveform. The selection (step 6113BS) the FMCW waveform may be based on the capability reports received (steps 6104A and 6104B) from the UEs 5110A, 5110B and based on the sensing-only ICS configuration strategy. The BS 5170 may employ the transmission (step 5618) of the common sensing ICS signal carrying DL communication to the first UE 5110A to transmit (6114BSA)

an indication of the FMCW waveform to the first UE 5110A. The BS 5170 may employ the transmission (step 5618) of the common sensing ICS signal carrying DL communication to the second UE 5110B to transmit (step 6114BSB) an indication of the FMCW waveform to the second UE 5110B. The transmission (step 6114BSA, 6114BSB) the indication of the FMCW waveform to the UEs 5110A, 5110B may employ group-cast signaling.

The second UE 5110B then transmits (step 6118) SL communication to the first UE 5110A and the first UE 5110A transmits (step 6120) SL communication to the second UE 5110B. In particular, the second UE 5110B may employ the FMCW waveform when transmitting (step 51118) the SL communication. The first UE 5110A may then carry out passive sensing (step 6122) by receiving and processing reflections of the FMCW waveform transmitted, by the second UE 5110B, in step 6118. As a result of carrying out (step 6122) the SL-based, bi-static, dedicated passive sensing, the first UE 110A may obtain more accurate information about the target of interest.

It should be appreciated that all signaling may be a dynamic signaling, which can be changed from one indication to another. "All" signaling is a reference to ICS configuration indications (steps 5410, 5610, 5710, 5810, 5910, 6010BS, 6010UE, 6110BS, 6110UE), selected/suggested waveform indications (steps 5414, 5614, 5714, 5814, 5914, 6014BS, 6014UE, 610BS, 6114UE) and waveform list indications (steps 5406, 5906, 6106). In this dynamic signaling case, all, or part of, the signaling may be signaled to the BS 5170 using dynamic signaling like L1 signaling, e.g., through the known DCI information structure. Alternatively, all, or part of, the signaling may be accomplished using semi-static signaling, which is not changed very frequently. In this semi-static signaling case, all, or part of, the signaling may be signaled to the BS 5170 using higher layer signaling, e.g., through RRC signaling or signaling that uses the MAC-CE.

Future networks like 6G networks, may involve sensing environments through high-precision positioning, mapping and reconstruction, and gesture/activity recognition, and thus sensing will be a new 6G service with a variety of activities and operations through obtaining information about a surrounding environment. A 6G network includes terminals, devices and network infrastructures to lead to capabilities such as the following:

More and higher spectrum with larger bandwidth.

Evolved antenna design with extremely large arrays and metasurface.

Larger scale of collaboration between base stations and UEs

Advanced techniques for interference cancellation

Integrated advanced signal processing and artificial intelligence (AI).

Thus future networks may use or require new metrics (such as sensing accuracy and sensing resolution) to serve as the new KPIs, which are proposed based on different application scenarios. For example, latency can be as tight as approximately 1 cm to 10 cm, and sensing accuracy can be up to 1 mm in resolution. Furthermore, 6G networks may involve numerous use cases, such as unmanned aerial vehicles (UAVs), vehicles, IoT devices, to build a map of the environment and a virtual environment in cyber space, so 6G networks may use or need a new sensing system and framework to provide an efficient signal design and coordinate resource allocation in the time, frequency, and spatial domains without degrading the spectral efficiency and sensing performance. For example, a new sensing system can be an integrated sensing and communication (ISAC) to provide at least one of the following:

Sensing-assisted communication: to enable medium-aware communication due to more deterministic and predictable propagation channels. Sensing-assisted communication can provide the environmental knowledge gained through sensing for improving communication, such as environmental knowledge used to optimize the beamforming to the UE (medium-aware beamforming), environmental knowledge used to exploit all potential degrees of freedom (DoF) in the propagation channel (medium aware channel rank boosting), and medium awareness to reduce or mitigate inter-UE interference. Sensing benefits to communication can include throughput spectrum usage improvement and interference mitigation, for example.

Sensing-enabled communication: which can be referred as backscatter communication, to provide benefit in scenarios where devices with limited processing capabilities (most IoT devices in future systems) collect data. An illustrative example is media-based communication in which the communication medium is deliberately changed to convey information.

Communication-assisted sensing: to achieve more efficient and smarter sensing by connecting the sensing nodes. In this example, a sensing network connects users to realize on-demand sensing. For example, sensing can be performed based on a different node's request or delegated to another node to enable collaborative sensing in which multiple sensing nodes obtain environmental information. All these advanced features require a system design to perform the communication between the sensing nodes through DL, UL and SL channels with minimum overhead and maximum sensing efficiency.

Sensing-assisted positioning: also referred to as positioning, involves localizing UEs through the transmission or reception of signals to or from the UEs. A potential main advantage is simple operations to obtain accurate knowledge of UE locations, which involves obtaining many types of information including multi-path, imperfect time/frequency synchronization, limited users sampling/processing capabilities and limited dynamic-range of UES.

The new sensing system and framework can be classified into radio frequency (RF) sensing and Non-RF sensing. For example, RF sensing involves sending a RF signal and learning the environment by receiving and processing the reflected signals. An example of non-RF sensing involves exploiting pictures and videos obtained from a surrounding environment (e.g., via camera).

Sensing is a feature of measuring surrounding environment information of a device related to the network, which may include, for example, any of: positioning, nearby objects, traffic, temperature, channel, etc. The sensing measurement is made by a sensing node, and the sensing node can be a node dedicated for sensing or a communication node with sensing capability. Sensing nodes may include, for example, any of: a radar station, a sensing device, a UE, a base station, a mobile access node such as a drone, a UAV, etc.

To make sensing operations happen, sensing activity is managed and controlled by sensing control devices or functions in the network. Two management and control functions for sensing are disclosed herein, and may support integrated sensing and communication and standalone sensing service.

These two new functions for sensing include a first function referenced herein as a sensing management function (SensMF) and a sensing agent function (SAF). SensMF may be implemented in a core network or a RAN, such as in a network device in a core network or a RAN, and SAF may be implemented in a RAN in which sensing is to be performed. More, fewer, or different functions may be used in implementing features disclosed herein, and accordingly SensMF and SAF are illustrative examples.

SensMF may be involved in various sensing-related features or functions, including any one or more of the following, for example:

managing and coordinating one or more RAN node(s) and/or one or more UE(s) for sensing activity;

communicating, via AMF or otherwise, for sensing procedures in a RAN, potentially including any one or more of: RAN configuration procedure for sensing, transfer of sensing associated information such as sensing measurement data, processed sensing measurement data, and/or sensing measurement data reports;

communicating, via UPF or otherwise, for sensing procedures in a RAN, potentially including transfer of sensing associated information such as any one or more of: sensing measurement data, processed sensing measurement data, and sensing measurement data reports;

otherwise handling sensing measurement data, such as processing sensing measurement data and/or generating sensing measurement data reports.

SAF may similarly be involved in various sensing-related features or functions, including any one or more of the following, for example:

splitting sensing control plane and sensing user plane (SAF-CP and SAF-UP);

storing or otherwise maintaining local measurement data and/or other local sensing information;

communicating sensing measurement data to SensMF;

processing sensing measurement data;

receiving sensing analysis reports from SensMF, for communication control in RAN and/or for other purposes;

managing, coordinating, or otherwise assisting in an overall sensing and/or control process;

interfacing with an AI module or function.

A SAF can be located or deployed in a dedicated device or a sensing node such as a base station, and can control a sensing node or a group of sensing nodes. The sensing node(s) can send sensing results to the SAF node, through backhaul, an Uu link, or a sidelink SL for example, or send the sensing results directly to SensMF.

In summary, basic sensing operations may at least involve one or more sensing nodes such as UE(s) and/or TRP(s) to physically perform sensing activities or procedures, and sensing management and control functions such as SensMF and SAF may help organize, manage, configure, and control the overall sensing activities.

In a RAN that includes at least one RAN node, for example, the (or each) RAN node can be a base station, TRP, drone, UAV, satellite station, etc. To make sensing operational in a RAN, one or more RAN nodes may include a SAF, but not every RAN node need necessarily include a SAF. One SAF in one RAN node may manage, control, and configure one or more other RAN nodes and/or other electric devices for sensing. Electric devices such as UEs and/or RAN node(s) that have sensing capability may be managed, controlled, and/or configured for sensing setup and measurements, for example. In general, a sensing coordinator may be implemented in a network device in a radio access network and be configured to control one or more other network devices in the radio access network.

In the present disclosure, a sensing coordinator may refer to any of SensMF, SAF, a sensing device, or a node or other device in which SensMF, SAF, sensing, or sensing-related features or functions are implemented.

Sensing may encompass positioning, but the present disclosure is not limited to any particular type of sensing. For example, sensing may involve sensing any of various parameters or characteristics. Illustrative examples include: location parameters, object size, one or more object dimensions including 3D dimensions, one or more mobility parameters such as either or both of speed and direction, temperature, healthcare information, and material type such as wood, bricks, metal, etc. Any one or more of these parameters or characteristics, or others, may be sensed.

Figures 43A, 43B, 43C:
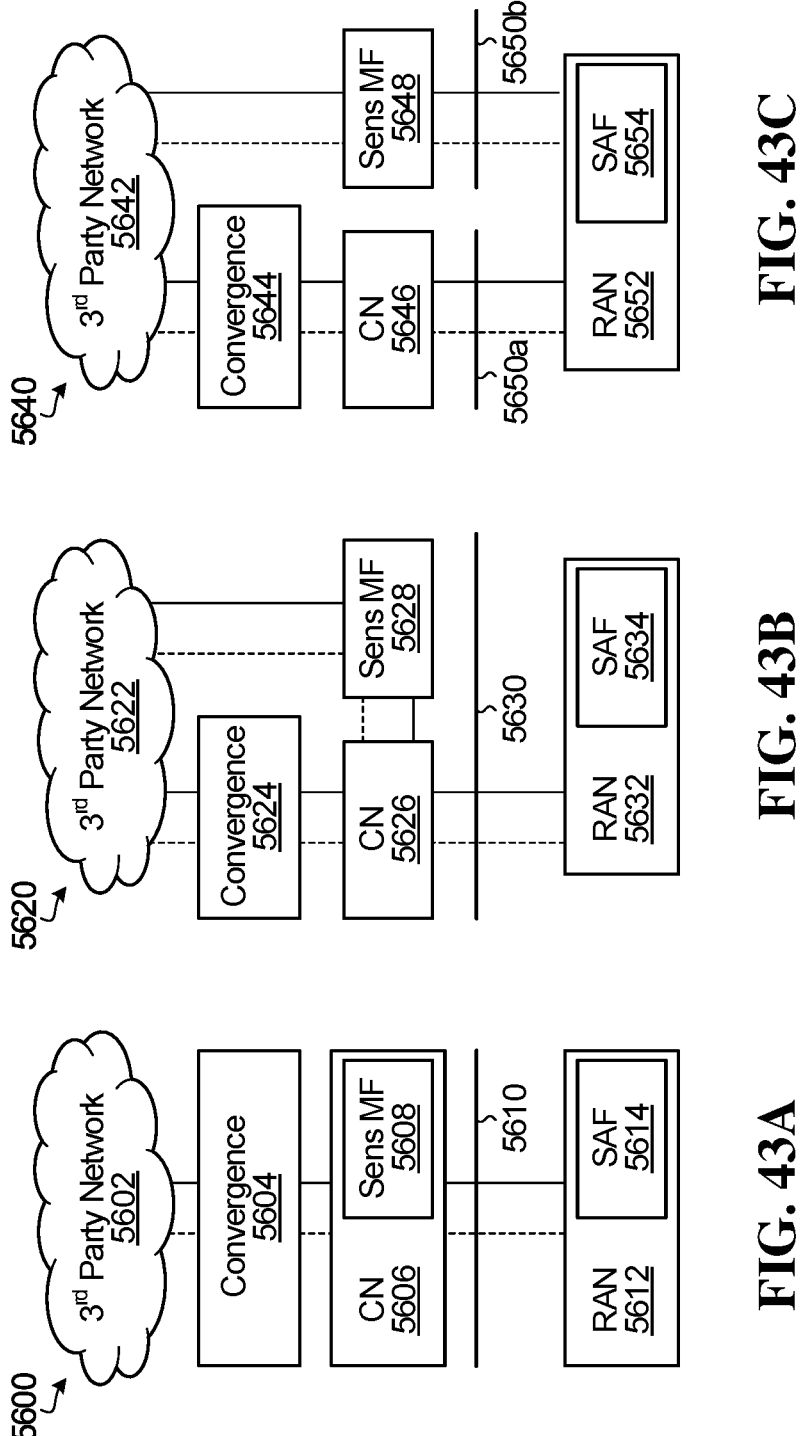
FIG. 43A is a block diagram illustrating a sensing architecture according to an embodiment in which a sensing coordinator is located in a core network.
FIG. 43B is a block diagram illustrating a sensing architecture according to another embodiment, in which a sensing coordinator is located outside a core network and communicates with a RAN through the core network.
FIG. 43C is a block diagram illustrating a sensing architecture according to a further embodiment, in which a sensing coordinator is located outside a core network and communicates directly with a RAN.

FIG. 43A is a block diagram illustrating a sensing architecture according to an embodiment in which a sensing coordinator is located in a core network. In the example architecture 5600, a third-party network 5602 interfaces with a core network 5606 through a convergence element 5604. The core network 5606 includes a sensing coordinator, shown by way of example in FIG. 43A as SensMF 5608. The core network 606 connects to a RAN 5612 through an interface link and an interface that is shown at 5610. The RAN 5612 also includes a sensing coordinator, shown by way of example in FIG. 43A as SAF 5614. A RAN is shown generally at 5612 and a sensing coordinator in the RAN is similarly shown generally as SAF 5614, to represent a RAN node of any type that includes the sensing coordinator.

The third-party network 5602 is intended to represent any of various types of network that may interface or interact with a core network or the sensing management function directly. The third-party network 5602 in this case may request a sensing services from the SensMF 5608 via core network or directly. The Internet is an example of a third-party network 5602; other examples of the third-party networks include automation and auto-driving industries, power monitoring networks, and other fixed networks, etc.

The convergence element 5604 may be implemented in any of various ways, to provide a controlled and unified core network interface with other networks (e.g., a wireline network). For example, although the convergence element 5604 is shown separately in FIG. 43A, one or more network devices in the core network 5606 and one or more network devices in the third-party network 5602 may implement respective modules or functions to support an interface between a core network and an third-party network outside the core network.

The core network 5606 network may be or include, for example, an SBA or other core network. SensMF 5608 in the core network 5606 may be a core network function in an SBA in some embodiments, as disclosed by way of example elsewhere herein.

SensMF 5608 in the core network 5606 may connect with the RAN 5612, including SAF 5614, via backhaul for its control and user planes. A backhaul connection or link is therefore one example of an interface link between sensing coordinators such as SensMF 5608 and SAF 5614. A backhaul link, or other interface link, can be wired and/or wireless. In the case of a wireless link, an air interface protocol is used. Examples of an air interface link include: an LTE/NR Uu link; a sidelink; an air interface link of new radio vehicle-to-anything (NR v2x), long term evolution machine type communication (LTE-M), Power Class 5 (PC5), Institute of Electrical and Electronics Engineers (IEEE) 802.15.4, or 802.11, and an air interface according to a new protocol for sensing. Other examples are also provided elsewhere herein.

The RAN 5612 is shown as a single block in FIG. 43A, but may include one or more network devices or RAN nodes, such as base stations. A network device in the RAN can be a terrestrial node or a mobile node. Examples of a mobile node include, among others, an integrated access backhaul (IAB) node, a drone-based node, an unmanned aerial vehicle (UAV)-based node, and a satellite-based node. The SAF 5614 may be implemented in a network device in the RAN, and potentially multiple network devices may include a SAF. For example, a SAF in one network device or RAN node may be able to control multiple network devices or RAN nodes.

Other features as disclosed herein, may also or instead apply to the components illustrated in FIG. 43A.

Further variations from the specific architecture example shown in FIG. 43A are also possible. For example, SensMF 5608 outside of the RAN 5612 may connect to more than one SAF such as 5614, which may be implemented in more than RAN node in the RAN 5612 or in more than one RAN. Thus, one core network may interface with more than one RAN, or in other words one or more RANs such as 5612 may provide access to a core network.

In several examples above, the sensing coordinators SensMF5 5608 and SAF 5614 are described as being implemented as a core network service and in a network device, respectively. It should be appreciated, however, that sensing can be configured to be operational as a standalone features or service, or combined to be operational with communication operations in a communication network or system.

FIG. 43B is a block diagram illustrating a sensing architecture 5620 according to another embodiment, in which a sensing coordinator in the form of SensMF 5628 is located outside a core network 5626 and communicates with a RAN 5632 and another sensing coordinator in the form of SAF 5634 through the core network. SensMF 5628 is outside of the core network 5626 and open to a third-party network 5622, but connects with the RAN 5632 including SAF 5634, via backhaul for its control and user planes in some embodiments. SensMF 5628 may be located at an edge cloud such as MEC, for example, for powerful computing capability. The example sensing architecture 5620 also includes an interface 5630 and a convergence element 5624.

The example architecture 5620 and most of the components thereof may be substantially similar to or the same as similarly labelled components in FIG. 43A. In the example architecture 5620 shown in FIG. 43B, however, SensMF 5628 is outside the core network 5626. This may impact how SensMF 5628 interacts with the third-party network 5622 and the core network 5626, and therefore the third-party network and the core network are shown in FIG. 43B with different reference numbers than in FIG. 43A. To the extent that this may also impact how other components interact with each other, the other components are also shown in FIG. 43B with different reference numbers than in FIG. 43A. One important difference from FIG. 43A is that FIG. 43B introduces a new interface between SensMF 5628 and core network 5626. For example, the new interface can be an application programming interface (API) of the type used for software functionality interface, or a newly designed interface for sensing via core network 5626 to RAN 5632 that includes SAF 5634. It is expected that other components may be the same as the similarly labelled components in FIG. 43A.

FIG. 43C is a block diagram illustrating a sensing architecture 5640 according to a further embodiment, in which a sensing coordinator, shown by way of example as SensMF 5648, is located outside a core network 5646 and communicates directly with a RAN 5652 through an interface link and an interface 5650b. For example, SensMF 5648 may have direct connections with the RAN 5652 including SAF 5654 via backhaul for its control and user planes. SensMF 5648, like SensMF5 628 in FIG. 43B, may be located at an edge cloud such as MEC. The example sensing architecture 5640 also includes a convergence element 5644, and an interface 5650a through which the core network 646 communicates with the RAN 5652.

The example architecture 5640 and most of the components thereof may be substantially similar to or the same as similarly labelled components in FIG. 43B. In the example architecture 5640 shown in FIG. 43C, however, SensMF 5648 interacts directly with the RAN 5652. This impacts how SensMF 5648 interacts with at least the RAN 5652, and therefore the RAN is shown in FIG. 43C with different reference numbers than in FIG. 43B. To the extent that this may also impact how other components interact with each other, the other components are also shown in FIG. 43C with different reference numbers than in FIGS. 43A and 43B. One important difference from FIG. 43B is that FIG. 43C introduces a new interface 5650b between SensMF5 648 and RAN 5652 including SAF 5654. For example, the new interface 5650b can be a wireline based backhaul or wireless based backhaul, where backhaul protocols may reuse current protocols or newly defined protocols, especially for wireless backhaul design. It is expected that other components may be the same as the similarly labelled components in FIG. 43A and/or FIG. 43B.

Figures 44A, 44B, 44C:
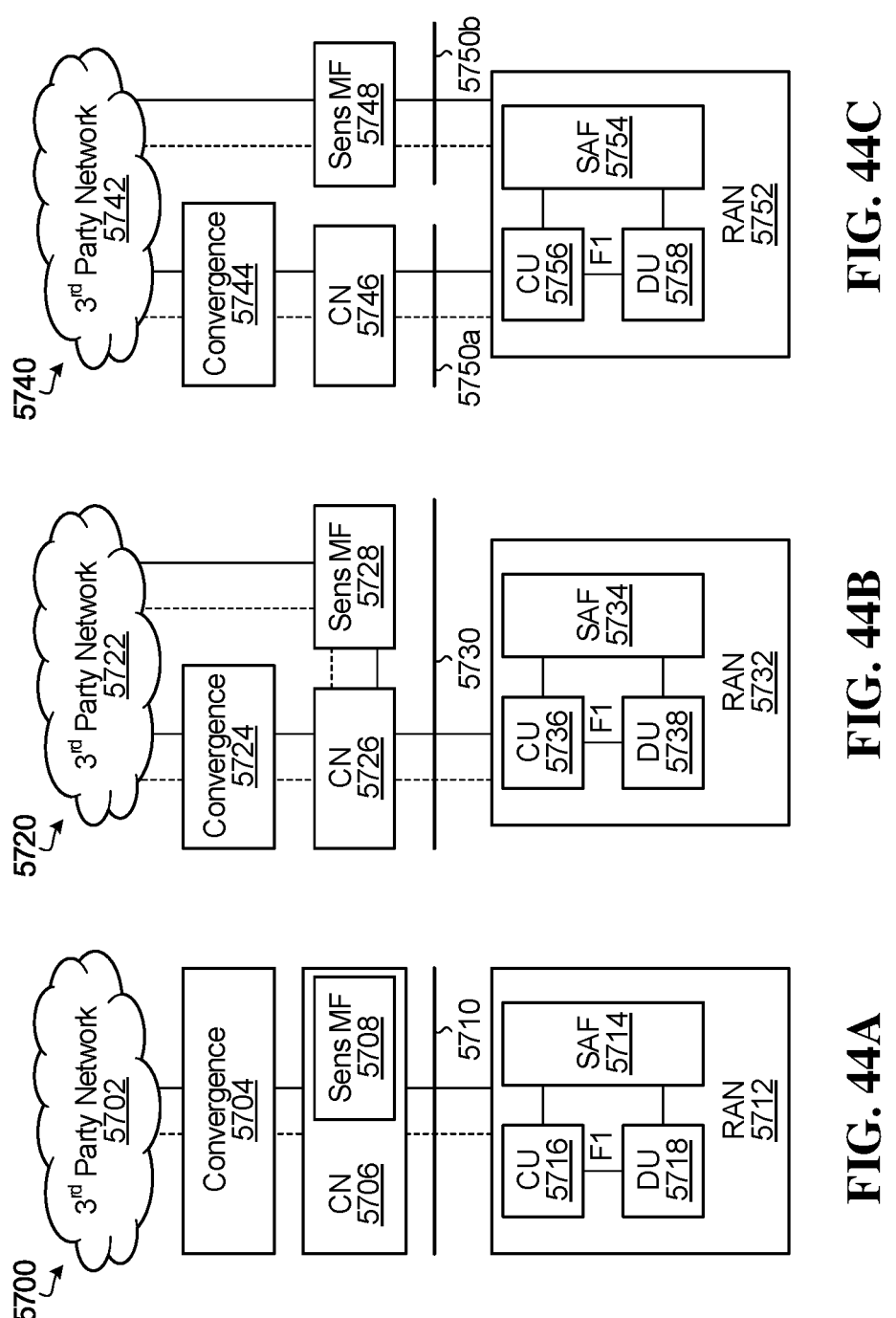
FIGS. 44A to 44C are block diagrams illustrating sensing architectures according to embodiments similar to those in FIGS. 43A to 43C, but with a central unit (CU)/distributed unit (DU) RAN architecture.

FIGS. 44A to 44C are block diagrams illustrating sensing architectures according to embodiments similar to those in FIGS. 43A to 43C, but with a CU/DU RAN architecture.

In FIG. 44A, as in FIG. 43A, a third-party network 5702 interfaces with a core network 5706 through a convergence element 5704. The core network 5706 includes a sensing coordinator, shown by way of example as SensMF 5708. The core network 5706 connects to a RAN 5712 through an interface link and an interface that is shown at 5710. The RAN 5712 also includes a sensing coordinator, shown by way of example as SAF 5714. The example architecture 5700 in FIG. 44A and most of the components thereof may be substantially similar to or the same as similarly labelled components in FIG. 43A. In the example architecture 5700 shown in FIG. 44A, however, there is RAN functional splitting or module splitting in the RAN 5712, or in one or more RAN nodes in the RAN, into a CU 5716 and a DU 5718. For example, the CU 5716 may include or support higher protocol layers such as PDCP and RRC for a control plane and PDCP and SDAP for a data plane, and the DU 5718 may include lower layers such as RLC, MAC, and PHY. The SAF 5714 is interactive with either or both of the CU 5716 and the DU 5718, as part of control and data modules in the RAN or one or more RAN nodes.

The CU/DU RAN architecture in FIG. 44A may impact how the core network 5706 and the RAN 5712, and thus SensMF 5708 and SAF 5714, interact with each other. These components are therefore shown in FIG. 44A with different reference numbers than in FIG. 43A. To the extent that this may also impact how other components interact with each other, the other components are also shown in FIG. 44A with different reference numbers than in FIG. 43A. For example, SAF 5714 may interact with CU 5716 and DU 5718 via control plane and/or user plane. It is expected that at least these other components may be the same as the similarly labelled components in FIG. 43A.

FIG. 44B is substantially similar to FIG. 44A, and illustrates a sensing architecture 5720 in which a sensing coordinator in the form of SensMF 5728 is located outside a core network 5726 and communicates with a RAN 5732 and another sensing coordinator in the form of SAF 5734 through the core network. SensMF 5728 is outside of the core network 5726, is open to a third-party network 5722, and connects with the 5RAN 732 including SAF 5734, via backhaul for its control and user planes in some embodiments. As in FIG. 44A, the RAN 5732, or one or more nodes therein, has a CU/DU architecture with a CU 5736 and a DU 5738. The example sensing architecture 5720 also includes an interface 5730 and a convergence element 5724.

The example architecture 5720 and most of the components thereof may be substantially similar to or the same as similarly labelled components in FIG. 43A. In the example architecture 5720 shown in FIG. 44B, however, SensMF 5728 is outside the core network 5726. This may impact how SensMF 5728 interacts with the third-party network 5722 and the core network 5726, and therefore the third-party network and the core network are shown in FIG. 44B with different reference numbers than in FIG. 44A. To the extent that this may also impact how other components interact with each other, the other components are also shown in FIG. 44B with different reference numbers than in FIG. 44A. FIG. 44B also introduces an interface between SensMF 5728 and core network 5726, and examples of such an interface are provided at least above. It is expected that other components may be the same as the similarly labelled components in FIG. 44A.

FIG. 44C is substantially similar to FIG. 44B, and illustrates a sensing architecture 5740 according to a further embodiment, in which a sensing coordinator, shown by way of example as SensMF 5748, is located outside a core network 5746 and communicates directly with a RAN 5752 through an interface link and an interface 5750*b*. For example, SensMF 5748 may have direct connections with the RAN 5752 including SAF 5754 via backhaul for its control and user planes. As in FIG. 44A, the RAN 5752, or one or more nodes therein, has a CU/DU architecture including a CU 5756 and a DU 5758. The example sensing architecture 5740 also includes a convergence element 5744, and an interface 5750*a* through which the core network 5746 communicates with the RAN 5752.

The example architecture 5740 and most of the components thereof may be substantially similar to or the same as similarly labelled components in FIG. 43B. In the example architecture 5740 shown in FIG. 44C, however, SensMF 5748 interacts directly with the RAN 5752. This impacts how SensMF 5748 interacts with at least the RAN 5752, and therefore the RAN is shown in FIG. 44C with different reference numbers than in FIG. 44B. To the extent that this may also impact how other components interact with each other, the other components are also shown in FIG. 44C with different reference numbers than in FIGS. 44A and 44B. FIG. 44C also introduces an interface 5750*b* between SensMF 5748 and RAN 5752, and examples of such an interface are provided at least above. It is expected that other components may be the same as the similarly labelled components in FIG. 44A and/or FIG. 44B.

Figures 45A, 45B, 45C:
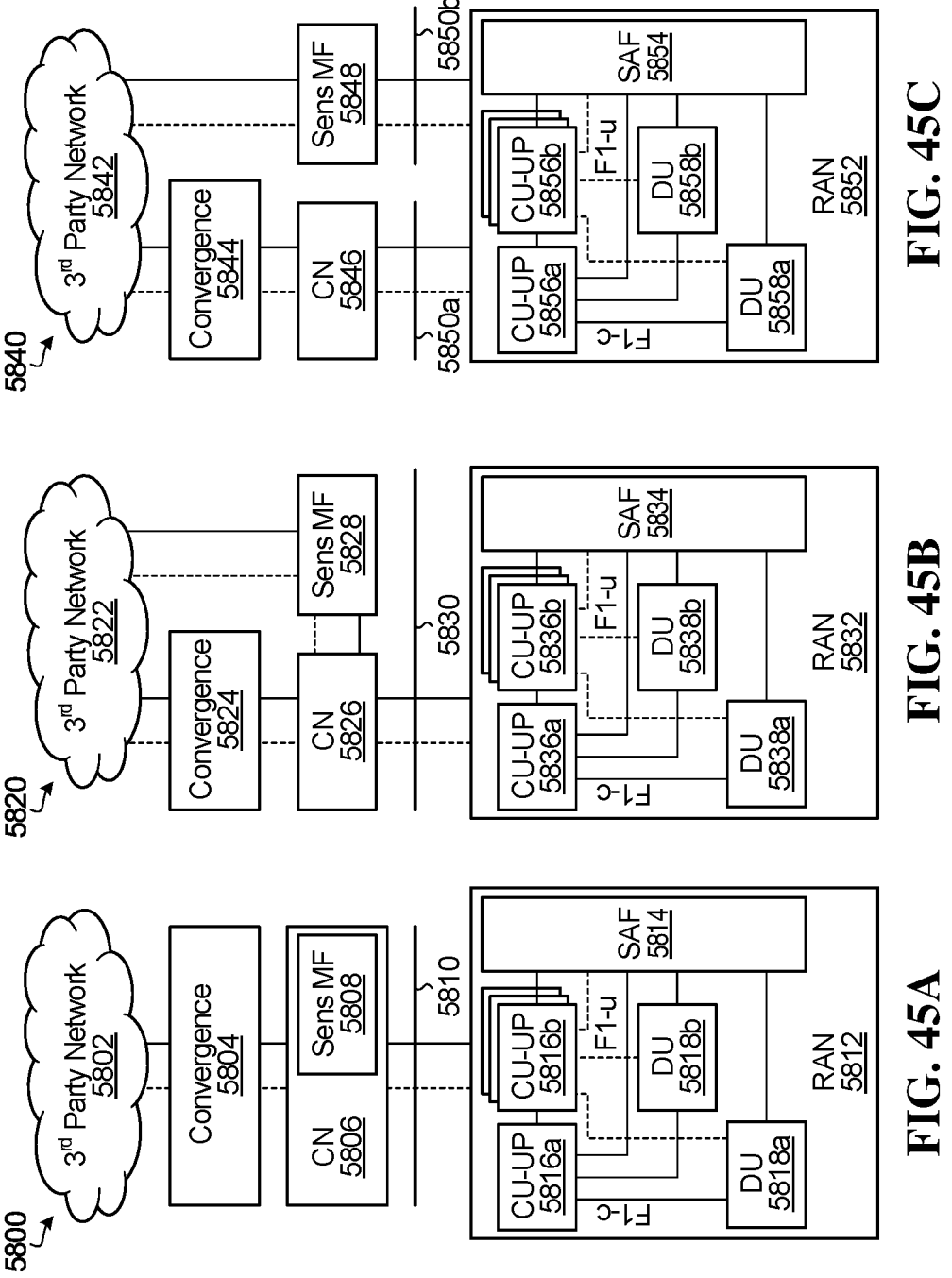
FIGS. 45A to 45C are block diagrams illustrating sensing architectures according to embodiments similar to those in FIGS. 45A to 44C, but with a CU control plane (CP)/user plane (UP) RAN architecture.

FIGS. 45A to 45C are block diagrams illustrating sensing architectures according to embodiments similar to those in FIGS. 44A to 4C, but with a CU control plane (CP)/user plane (UP) RAN architecture.

FIG. 45A, like FIG. 44A, includes a third-party network 5802, a convergence element 5804, a core network 5806 that includes a sensing coordinator shown by way of example as SensMF 5808, an interface 5810, and a RAN 5812 that includes a sensing coordinator shown by way of example as SAF 5814. The example architecture 5800 in FIG. 45A and most of the components thereof may be substantially similar to or the same as similarly labelled components in FIG. 44A. In the example architecture 5800 shown in FIG. 45A, however, there is further functional splitting or module splitting in the RAN 5812, or in one or more RAN nodes in the RAN. As shown, a CU is further split into control plane and user plane, CU-CP 5816*a* and CU-UP 5816*b*, and there are multiple DUs 5818*a*, 5818*b*. A CU-CP may include one or more CU-UPs, and multiple CU-UPs 5816*b* are shown in FIG. 45A. In other embodiments, one RAN node may include one CU-CP and one CU-UP, or include only one CU-UP and no CU-CP. A RAN node with a CU-CP may have connections to and control more than one RAN node with CU-UP only. That is, one CU-CP may control one or more CU-UPs. A CU-CP and any CU-UPs may connect with a DU via interfaces F1-c and F1-u, respectively. These are shown by way of example in FIG. 45A.

SAF 5814 may also connect with CU-CP(s) such as 5816*a* and CU-UP(s) 5816*b* via interfaces F1-c and F1-u, respectively, in some embodiments. Although not explicitly shown in FIG. 45A, SAF 5814 can optionally be split into control plane and user plane elements.

The sensing architecture 5800 in FIG. 45A differs from that of FIG. 44A in its CU-CP/CU-UP/multi-DU RAN architecture, which may impact how the core network 5806 and the RAN 5812, and thus SensMF 5808 and SAF 5814, interact with each other. Interactions between other components may also be different between FIGS. 45A and 44A. The architectures 5700, 5800 may otherwise be implemented in substantially similar ways.

Turning to FIG. 45B, like the sensing architecture 5800 in FIG. 45A the sensing architecture 4820 in FIG. 45B, includes a third-party network 5822, a convergence element 5824, a core network 5826 that includes a sensing coordinator shown by way of example as SensMF 5828, an interface 5830, and a RAN 5832 that includes a sensing coordinator shown by way of example as SAF 5834. The RAN 5832 also has the same type of architecture as in FIG. 45A, with a CU-CP 5836*a*, multiple CU-UPs 5836*b*, and multiple DUs 5838*a*, 5838*b*. The example architecture 5820 in FIG. 45B and most of the components thereof may be substantially similar to or the same as similarly labelled components in FIG. 45A or FIG. 44B.

Relative to FIG. 44B, in the sensing architecture 5820 shown in FIG. 45B the RAN 5832 has a different architecture, with the RAN or one or more RAN nodes including a CU-CP 5836*a*, multiple CU-CPs 5836*b*, and multiple DUs 5838*a*, 5838*b*. This may impact how the core network 5826 and the RAN 5832, and thus SensMF 5828 and SAF 5834, interact with each other in FIG. 45B relative to FIG. 44B. Interactions between other components may also be different between FIGS. 45B and 44B. The architectures 5720, 5820 may otherwise be implemented in substantially similar ways.

Relative to FIG. 45A, the sensing architecture 5820 in FIG. 45B is different in that a sensing coordinator in the form of SensMF 5828 is located outside the core network 5826 and communicates with the RAN 5832 and another sensing coordinator in the form of SAF 5834 through the core network. This may impact how SensMF 5828 interacts with the third-party network 5822 and the core network

5826, and may also or instead impact how other components interact with each other. FIG. 45B also introduces an interface between SensMF 5828 and core network 5826, and examples of such an interface are provided at least above. The sensing architecture 5820 may otherwise be implemented in a substantially similar way as the sensing architecture 5800 in FIG. 45A.

In FIG. 45C, the sensing architecture 5840 includes a third-party network 5842, a convergence element 5844, a core network 5846 that includes a sensing coordinator shown by way of example as SensMF 5848, an interface 5850*a*, and a RAN 5852 that includes a sensing coordinator shown by way of example as SAF 5854. The RAN 5852 has the same type of architecture as in FIG. 45B, with a CU-CP 5856*a*, multiple CU-UPs 5856*b*, and multiple DUs 5858*a*, 5858*b*. The example architecture 5840 in FIG. 45C and most of the components thereof may be substantially similar to or the same as similarly labelled components in FIG. 45B or FIG. 44C.

Relative to FIG. 44C, in the sensing architecture 5840 shown in FIG. 45C the RAN 5852 has a different architecture, with the RAN or one or more RAN nodes including a CU-CP 5856*a*, multiple CU-CPs 5856*b*, and multiple DUs 5858*a*, 5858*b*. This may impact how the core network 5846 and the RAN 5852, and thus SensMF 5848 and SAF 5854, interact with each other in FIG. 45C relative to FIG. 44C. Interactions between other components may also be different between FIGS. 45C and 44C. The architectures 5740, 5840 may otherwise be implemented in substantially similar ways.

In comparison with FIG. 45B, the sensing architecture 5840 in FIG. 45C is different in that SensMF 5848 interacts directly with the RAN 5852. This impacts how SensMF 5848 interacts with at least the RAN 5852, and may impact how other components interact with each other. FIG. 45C also introduces an interface 5850*b* between SensMF 5848 and RAN 5852, and examples of such an interface are provided at least above. Otherwise, implementation of the sensing architecture 5840 may be substantially similar to implementation of the sensing architecture 5820 in FIG. 45B.

Figures 46A, 46B, 46C:
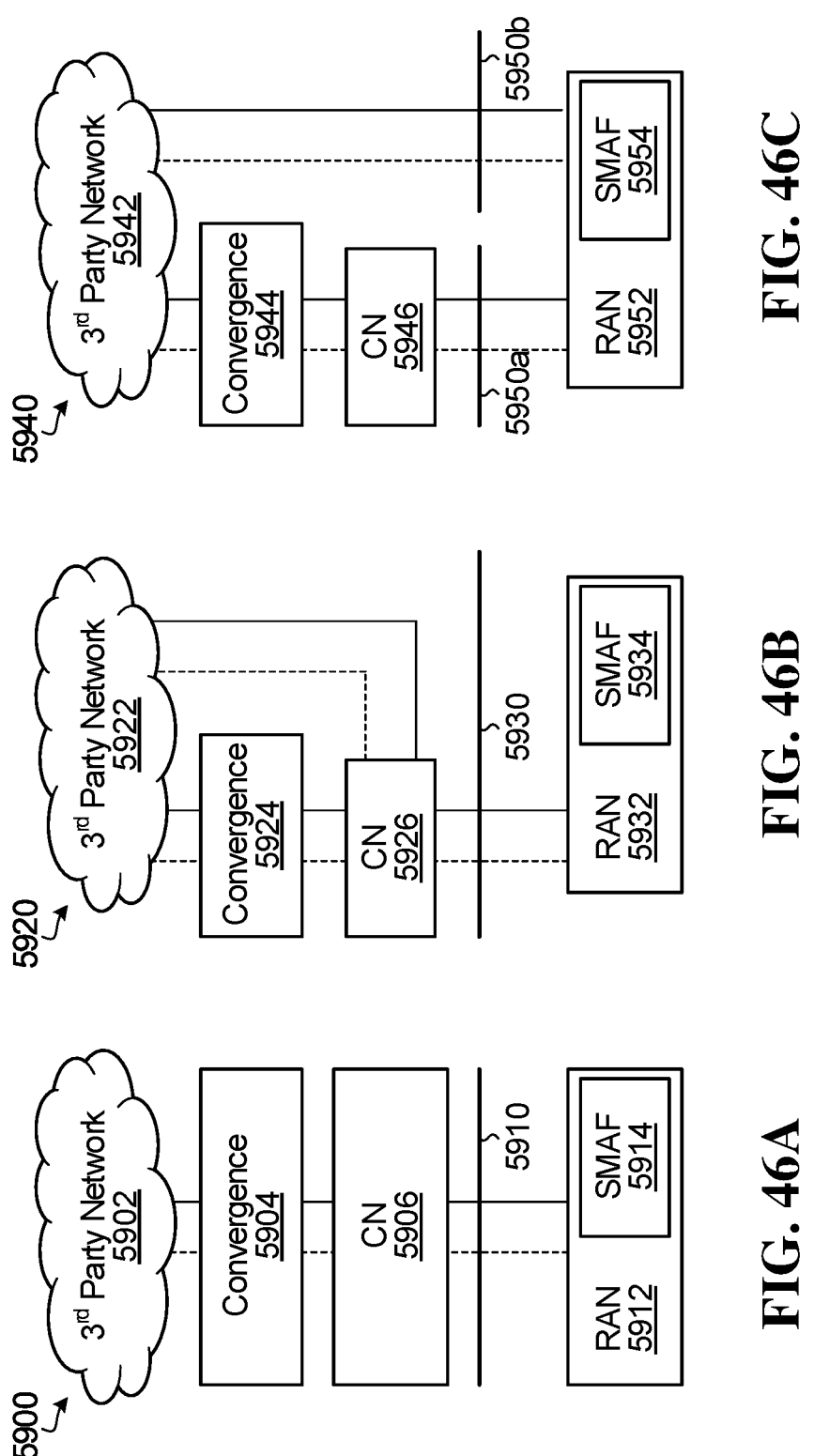
FIGS. 46A to 46C are block diagrams illustrating sensing architectures according to embodiments similar to those in FIGS. 43A to 43C, but with sensing coordination concentrated in a RAN.

FIGS. 46A to 46C are block diagrams illustrating sensing architectures according to embodiments similar to those in FIGS. 43A to 43C, but with sensing coordination concentrated in a RAN (or RAN node). Sensing coordination concentrated in a RAN refers to SensMF and SAF both being located in a RAN. SensMF and one SAF may be integrated or combined together in a RAN node or other network device in a RAN for example, or implemented separately. For ease of reference, RAN-based SensMF and SAF are referred to herein primarily as "SMAF" (SensMF+SAF), where the SMAF may be involved in various sensing-related features or functions that are provided by individual SensMF and SAF, and the SMAF may have associated interface change due to the combination of the two functions (SensMF and SAF) together into one functional module or component. For example, a third party may directly interface with a RAN node to connect to the SMAF. Like SAF deployment scenarios, a SMAF can be located or deployed in a dedicated device or a sensing node such as a base station, and can control a sensing node or a group of sensing nodes. The sensing node(s) can send sensing results to the SMAF node, through backhaul, an Uu link, or a sidelink SL for example. A potential benefit of the SMAF is to reduce the communication latency as no delay is incurred due to communication between separate SensMF and SAF, which can be especially important for control procedure and/or other applications with time-sensitive requirements.

SMAF may be involved in various sensing-related features or functions, including any one or more of the following, for example:

managing and coordinating one or more RAN node(s) and/or one or more sensing node(s) for sensing activity;

communicating, for sensing procedures in a RAN node, potentially including any one or more of: RAN configuration procedure for sensing, transfer of sensing associated information such as sensing measurement data, processed sensing measurement data, and/or sensing measurement data reports;

communicating, for sensing procedures in a RAN node, potentially including transfer of sensing associated information such as any one or more of: sensing measurement data, processed sensing measurement data, and sensing measurement data reports;

otherwise handling sensing measurement data, such as processing sensing measurement data and/or generating sensing measurement data reports.

SMAF may also be involved in various sensing-related features or functions, including any one or more of the following, for example:

splitting sensing control plane and sensing user plane (SMAF-CP and SMAF-UP);

storing or otherwise maintaining local measurement data and/or other local sensing information;

communicating sensing measurement data;

processing sensing measurement data;

receiving sensing analysis reports, for communication control in RAN and/or for other purposes;

managing, coordinating, or otherwise assisting in an overall sensing and/or control process;

interfacing with an Artificial Intelligence (AI) module or function.

References to SMAF are not intended to indicate or imply a necessarily combined implementation of SensMF and SAF or to preclude implementation of SensMF and SAF separately.

FIG. 46A, like FIG. 46A, includes a third-party network 5902, a convergence element 5904, a core network 5906, an interface 5910, and a RAN 5912. The example architecture 5900 in FIG. 46A and most of the components thereof may be substantially similar to or the same as similarly labelled components in FIG. 34A. In the example architecture 5900 shown in FIG. 46, however, SensMF and SAF are both located in the RAN 5912, as indicated by SMAF at 5914.

Electric devices in the core network 5906 and/or the third-party network 5902 access the RAN 5912 and SMAF 5914 through an interface link to obtain SMAF service. In the case of the third-party network 5902, such access is via the convergence element 5904. SMAF 5914 may be implemented in a RAN node, for example, and other SAF implementation options disclosed herein may also apply to SMAF implementation. For example, the core network 906 may provide access to more than one SMAF, which may be implemented in one RAN node or in multiple RAN nodes in same or different RANs. Protocols between control and data functions in the core network 906 and SMAF 914 may be used for control configuration and data communication.

The sensing architecture 5900 in FIG. 46A differs from that of FIG. 43A in that sensing coordination is concentrated in the RAN 5912, which may impact how the core network 5906 and the RAN interact with each other; for example, to get a sensing service from SMAF in FIG. 46A, RAN node 5912 may not need to have an explicit signaling going out rather than employing internal connection interface within the RAN node 5912, and the core network 5906 may interface directly with RAN node 5912 where SMAF 5914 is located. Interactions between other components may also be different between FIGS. 46A and 43A. The architectures 5600, 5900 may otherwise be implemented in substantially similar ways.

Turning to FIG. 46B, like the sensing architecture 5900 in FIG. 46A the sensing architecture 5920 in FIG. 46B includes a third-party network 5922, a convergence element 5924, a core network 5926, an interface 5930, and a RAN 5932 that includes SMAF 5934. The example architecture 5920 in FIG. 46B and most of the components thereof may be substantially similar to or the same as similarly labelled components in FIG. 46A or FIG. 43B.

Relative to FIG. 43B, the sensing architecture 5920 shown in FIG. 46B is different in that there is no SensMF at the core network side of the interface 5930, and the third-party network 5922 can connect to SMAF 5934 via the convergence element 5924 and the core network 5926, or more directly through the core network to obtain SMAF service. This may impact how the third-party network 5922 and the core network 5926 interact with each other, and thus how the third-party network interacts with the RAN 5932 and a RAN-based sensing coordinator (SMAF 934) in FIG. 46B relative to FIG. 43B. For example, to get a sensing service from SMAF in FIG. 46B, RAN node 5932 may not need to have an explicit signaling going out rather than employing internal connection interface within the RAN node 5932, and the core network 5926 may interface directly with RAN node 5932 where SMAF 5934 is located. Interactions between other components may also be different between FIGS. 46B and 43B. The architectures 5620, 5920 may otherwise be implemented in substantially similar ways.

Relative to FIG. 46A, the sensing architecture 5920 in FIG. 46B is different in that the third-party network 5922 may communicate with the RAN 5932 through the core network 5926 and not necessarily also through convergence element 5924. Communications between the third-party network 5922 and the RAN 5932 may involve a new interface. Examples of a new core network interface to a SensMF are provided at least above, and these examples may also apply to a new core network interface to a third-party network. This may impact how the third-party network 5922 and the core network 5926 interact with each other, and thus how the third-party network and the RAN 932 and SMAF 5934 interact with each other in FIG. 46B relative to FIG. 46A. This may also or instead impact how other components interact with each other. The sensing architecture 5920 may otherwise be implemented in a substantially similar way as the sensing architecture 5900 in FIG. 46A.

In FIG. 46C, the sensing architecture 5940 includes a third-party network 5942, a convergence element 5944, a core network 5946, an interface 5950a, and a RAN 5952 that includes SMAF 5954. The sensing architecture 5940 in FIG. 6C and most of the components thereof may be substantially similar to or the same as similarly labelled components in FIG. 46B or FIG. 43C.

In the sensing architecture 5940, the third-party network 5942 can directly obtain SMAF service by connecting to SMAF 5954 in the RAN 5952. As in other embodiments, protocols between control and data functions in the third-party network 5942 and SMAF 5954 may be used for control configuration and data communication. FIG. 46C introduces an interface 5950b between the third-party network 5942 and RAN 5952. Examples of a new interface between a RAN and a SensMF are provided at least above, and these examples may also apply to a new interface to a third-party network.

Relative to FIG. 43C, the sensing architecture 5940 shown in FIG. 46C is different in that there is no SensMF at the core network side of the interface 5950, and the third-party network 5952 can connect to SMAF 5954 via the convergence element 5944 and the core network 5946, or directly. This may impact how the third-party network 5942 and the core network 5946 interact with each other, and thus how the third-party network interacts with the RAN 5952 and a RAN-based sensing coordinator (SMAF 954) in FIG. 46C relative to FIG. 43C. For example, to get a sensing service from SMAF in FIG. 46C, RAN node 5952 may not need to have an explicit signaling going out rather than employing internal connection interface within the RAN node 5952, and the core network 5946 may interface directly with RAN node 5952 where SMAF 5954 is located. Interactions between other components may also be different between FIGS. 46C and 43C. The architectures 5640, 5940 may otherwise be implemented in substantially similar ways.

In comparison with FIG. 46B, the sensing architecture 5940 in FIG. 46C is different in that the third-party network 5942 can interact directly with the RAN 5952 and SMAF 5954 through the interface 5950b. This may also impact how other components interact with each other. Otherwise, implementation of the sensing architecture 5940 may be substantially similar to implementation of the sensing architecture 5920 in FIG. 46B.

Figures 47A, 47B, 47C:
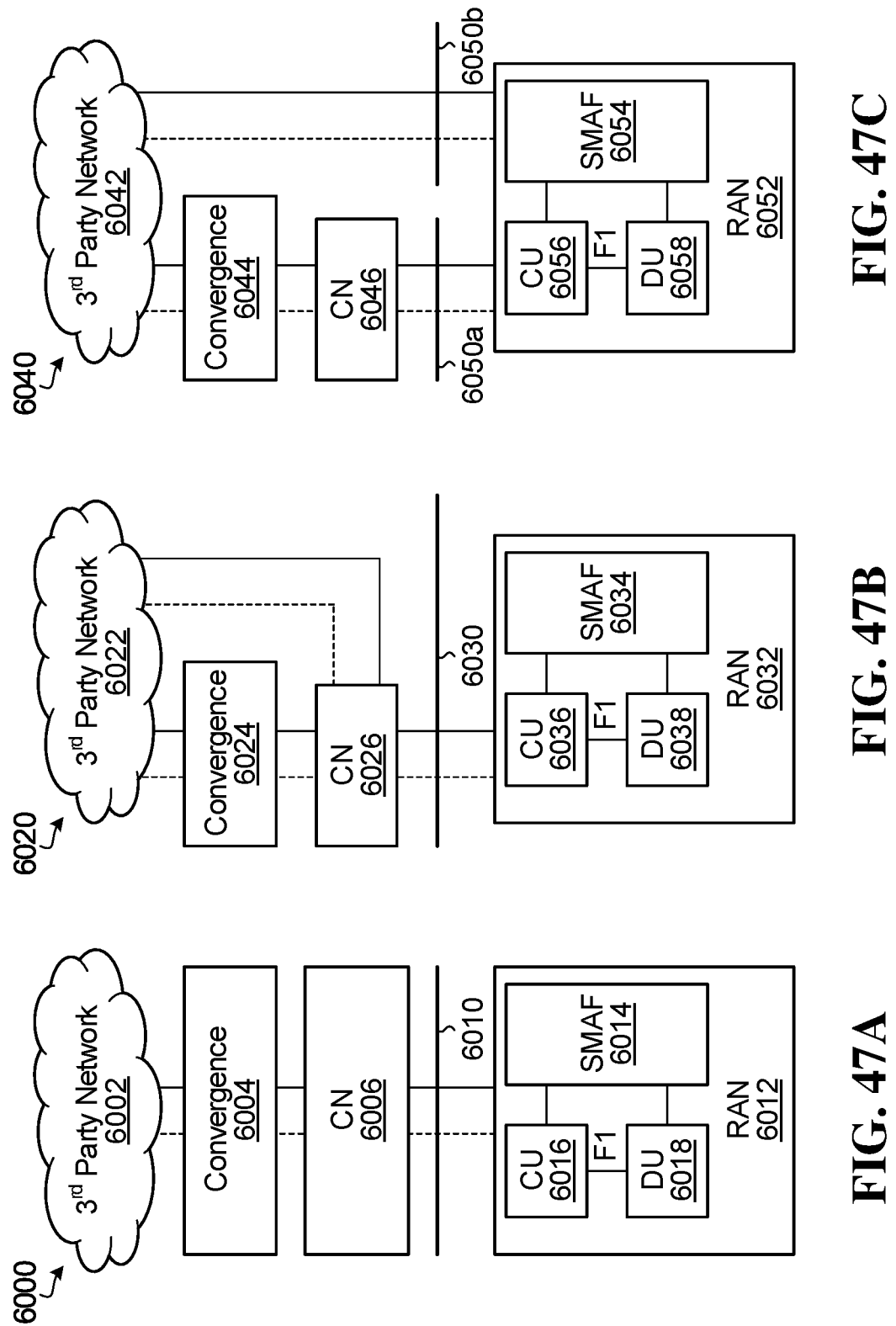
FIGS. 47A to 47C are block diagrams illustrating sensing architectures according to embodiments similar to those in FIGS. 44A to 44C, but with sensing coordination concentrated in a RAN.

FIGS. 47A to 47C are block diagrams illustrating sensing architectures according to embodiments similar to those in FIGS. 44A to 44C, but with sensing coordination concentrated in a RAN.

In FIG. 47A, as in FIG. 44A, a third-party network 6002 interfaces with a core network 6006 through a convergence element 6004, the core network 6006 connects to a RAN 6012 through an interface link and an interface that is shown at 6010, and the RAN includes or one or more RAN nodes in the RAN include a CU 6016 and a DU 6018. The sensing architecture 6000 in FIG. 47A differs from the sensing architecture 5700 in FIG. 44A in that there is no SensMF in the core network 6006 in FIG. 47A, and the RAN 6012 or one or more nodes in the RAN includes SMAF 6014. SMAF 6014 is interactive with either or both of the CU 6016 and the DU 6018, as part of control and data modules in the RAN or one or more RAN nodes.

In the sensing architecture 6000 in FIG. 47A, sensing coordination is concentrated in the RAN 6012, which may impact how the core network 6006 and the RAN interact with each other. Interactions between other components may also be different between FIGS. 47A and 44A. The architectures 5700, 6000 may otherwise be implemented in substantially similar ways.

FIG. 47B is substantially similar to FIG. 47A, and illustrates a sensing architecture 6020 that includes a third-party network 6022, a convergence element 6024, a core network 6026, an interface 6030, and a RAN 6032 that includes SMAF 6034 and has a CU/DU architecture including a CU 6036 and a DU 6038.

Relative to FIG. 44B, the sensing architecture 6020 shown in FIG. 47B is different in that there is no SensMF at the core network side of the interface 6030, and the third-party network 6022 can connect to SMAF 6034 via the convergence element 6024 and the core network 6026, or more directly through the core network to obtain SMAF service. This may impact how the third-party network 6022 and the core network 6026 interact with each other, and thus how the third-party network interacts with the RAN 6032 and a RAN-based sensing coordinator (SMAF 6034) in FIG. 47B relative to FIG. 44B. Communications between the third-party network 6002 and the RAN 6012 may involve a new interface, examples of which are provided at least above. Interactions between other components may also be different between FIGS. 47B and 44B. The architectures 5720, 6020 may otherwise be implemented in substantially similar ways.

Relative to FIG. 47A, the sensing architecture 6020 in FIG. 47B is different in that the third-party network 6022 may communicate with the RAN 6032 through the core network 6026 and not necessarily also through the convergence element 6024. This may impact how the third-party network 6022 and the core network 6026 interact with each other, and thus how the third-party network and the RAN 6032 and SMAF 6034 interact with each other in FIG. 47B relative to FIG. 47A. Again, communications between the third-party network 6022 and the RAN 6032 may involve a new interface, examples of which are provided at least above. This may also or instead impact how other components interact with each other. The sensing architecture 6020 may otherwise be implemented in a substantially similar way as the sensing architecture 6000 in FIG. 47A.

In FIG. 47C, the sensing architecture 6040 includes a third-party network 6042, a convergence element 6044, a core network 6046, an interface 6050a, and a RAN 6052 that includes SMAF 6054 and has a CU/DU architecture including a CU 6056 and a DU 6058. The sensing architecture 6040 and most of the components thereof may be substantially similar to or the same as similarly labelled components in FIG. 47B or FIG. 44C.

In the sensing architecture 6040, the third-party network 6042 can directly obtain SMAF service by connecting to SMAF 6054 in the RAN 6052. As in other embodiments, protocols between control and data functions in the third-party network 6042 and SMAF 6054 may be used for control configuration and data communication. Communications between the third-party network 6042 and the RAN 6052 may involve a new interface, examples of which are provided at least above.

Relative to FIG. 44C, the sensing architecture 6040 shown in FIG. 47C is different in that there is no SensMF at the core network side of the interface 6050, and the third-party network 6052 can connect to SMAF 6054 via the convergence element 6044 and the core network 6046, or directly through the interface 6050b, examples of which are provided at least above. This may impact how the third-party network 6042 and the core network 6046 interact with each other, and thus how the third-party network interacts with the RAN 6052 and a RAN-based sensing coordinator (SMAF 6054) in FIG. 47C relative to FIG. 44C. Interactions between other components may also be different between FIGS. 47C and 44C. The architectures 5740, 6040 may otherwise be implemented in substantially similar ways.

In comparison with FIG. 47B, the sensing architecture 6040 in FIG. 47C is different in that the third-party network 6042 can interact directly with the RAN 6052 and SMAF 6054, through the interface 6050b. This may also impact how other components interact with each other. Otherwise, implementation of the sensing architecture 6040 may be substantially similar to implementation of the sensing architecture 6020 in FIG. 47B.

Figures 48A, 48B, 48C:
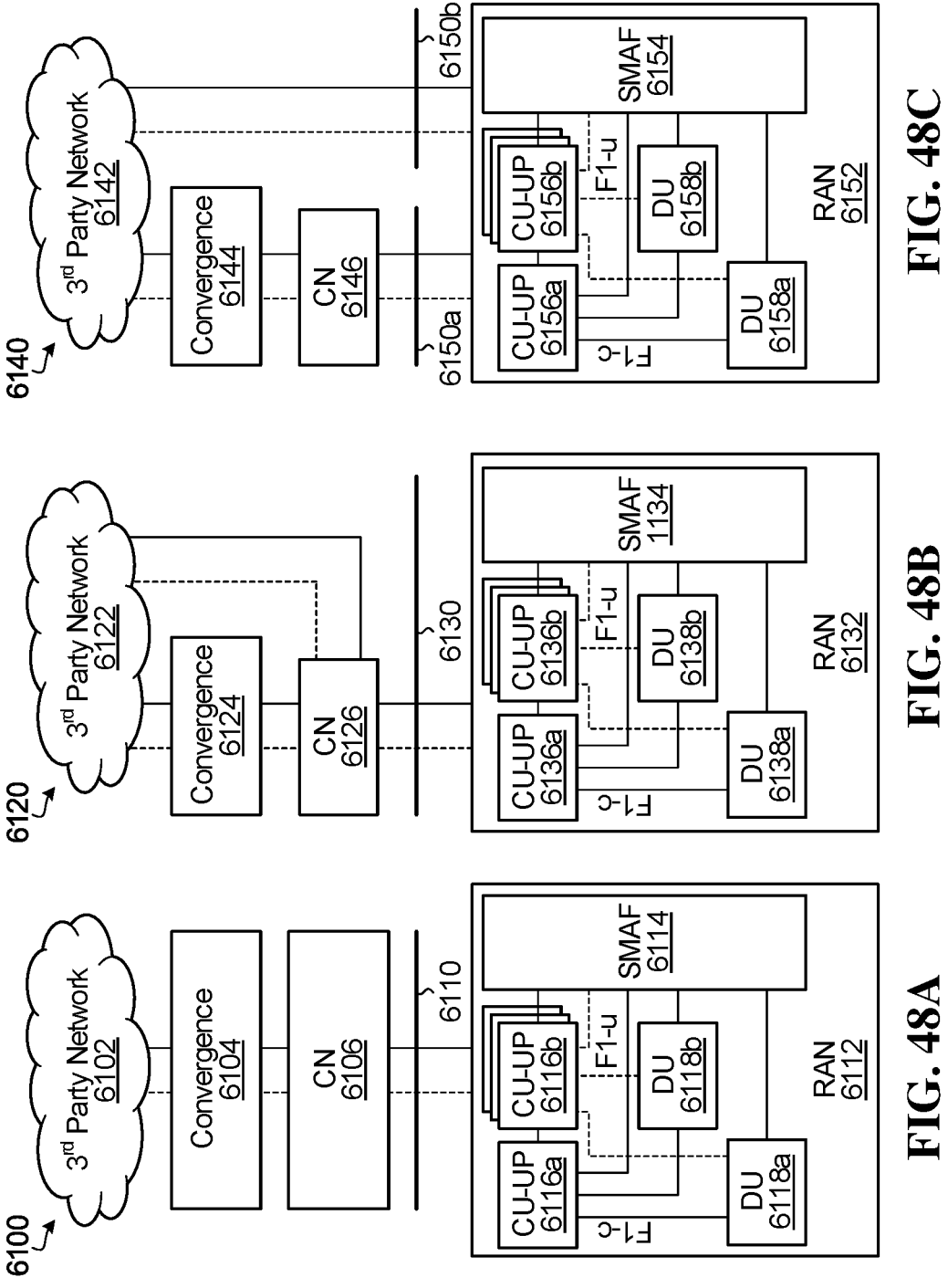
FIGS. 48A to 48C are block diagrams illustrating sensing architectures according to embodiments similar to those in FIGS. 45A to 45C, but with sensing coordination concentrated in a RAN.

FIGS. 48A to 48C are block diagrams illustrating sensing architectures according to embodiments similar to those in FIGS. 45A to 45C, but with sensing coordination concentrated in a RAN. qq FIG. 48A, like FIG. 45A, includes a third-party network 6102, a convergence element 6104, a core network 6106, an interface 6110, and a RAN 6112. The sensing architecture 6100 in FIG. 48A and most of the components thereof may be substantially similar to or the same as similarly labelled components in FIG. 45A. In the example architecture 6100 shown in FIG. 48A, however, sensing coordination is concentrated in the RAN 6112, which includes SMAF 6114, and there is further functional splitting or module splitting in the RAN 6112. The RAN 6112, or one or more RAN nodes in the RAN, includes a CU-CP 6116a and multiple CU-UPs 6116b, and there are also multiple DUs 6118a, 6118b. Features disclosed elsewhere herein regarding CU-CP/CU-UP/DU architectures may also or instead apply to the architecture 1100.

The sensing architecture 6100 in FIG. 48A differs from the sensing architecture 5800 in FIG. 45A in that there is no SensMF in the core network 6106 in FIG. 48A, the RAN 6112 or one or more nodes in the RAN includes SMAF 6114, and the RAN 6112 has a CU-CP/CU-UP/multi-DU architecture. SMAF 6114 is interactive with the CU-CP 6116a, one or more of the CU-UPs 6116b, and/or one or more of the DUs 6118a, 6118b, as part of control and data modules in the RAN or one or more RAN nodes.

In the sensing architecture 6100 in FIG. 48A, sensing coordination is concentrated in the RAN 6112, which may impact how the core network 6106 and the RAN interact with each other. Interactions between other components may also be different between FIGS. 48A and 45A. The architectures 5800, 6100 may otherwise be implemented in substantially similar ways.

FIG. 48B is substantially similar to FIG. 48A, and illustrates a sensing architecture 6120 that includes a third-party network 6122, a convergence element 6124, a core network 6126, an interface 6130, and a RAN 6132 that includes SMAF 6134 and has a CU-CP/CU-UP/multi-DU architecture including a CU-CP 6136a, CU-UPs 6136b, and DUs 6138a, 6138b.

Relative to FIG. 45B, the sensing architecture 6120 shown in FIG. 48B is different in that there is no SensMF at the core network side of the interface 6130, and the third-party network 6122 can connect to SMAF 6134 via the convergence element 6124 and the core network 6126, or more directly through the core network to obtain SMAF service. This may impact how the third-party network 6122 and the core network 6126 interact with each other, and thus how the third-party network interacts with the RAN 6132 and a RAN-based sensing coordinator (SMAF 6134) in FIG. 48B relative to FIG. 45B. Communications between the third-party network 6122 and the RAN 6132 may involve a new interface, examples of which are provided at least above. Interactions between other components may also be different between FIGS. 48B and 48B. The architectures 5820, 6120 may otherwise be implemented in substantially similar ways.

Relative to FIG. 48A, the sensing architecture 6120 in FIG. 48B is different in that the third-party network 6122 may communicate with the RAN 6132 through the core network 6126 and a new interface, and not necessarily also through the convergence element 6124. This may impact how the third-party network 6122 and the core network 6126 interact with each other, and thus how the third-party network and the RAN 6132 and SMAF 6134 interact with each other in FIG. 48B relative to FIG. 48A. This may also or instead impact how other components interact with each other. The sensing architecture 6120 may otherwise be implemented in a substantially similar way as the sensing architecture 6100 in FIG. 48A.

In FIG. 48C, the sensing architecture 6140 includes a third-party network 6142, a convergence element 6144, a core network 6146, an interface 6150a, and a RAN 6152 that includes SMAF 6154 and has a CU-CP/CU-UP/multi-DU architecture including a CU-CP 6156a, CU-UPs 6156b, and DUs 6158a, 6158b. The sensing architecture 6140 and most of the components thereof may be substantially similar to or the same as similarly labelled components in FIG. 48B or FIG. 45C.

In the sensing architecture 6140, the third-party network 6142 can directly obtain SMAF service by connecting to SMAF 6154 in the RAN 6152 through an interface 6150b, examples of which are provided at least above. As in other embodiments, protocols between control and data functions in the third-party network 6142 and SMAF 6154 may be used for control configuration and data communication.

Relative to FIG. 45C, the sensing architecture 6140 shown in FIG. 48C is different in that there is no SensMF at the core network side of the interface 6150, and the third-party network 6152 can connect to SMAF 6154 via the convergence element 6144 and the core network 6146, or directly through the interface 6150b. This may impact how the third-party network 6142 and the core network 6146 interact with each other, and thus how the third-party network interacts with the RAN 6152 and a RAN-based sensing coordinator (SMAF 6154) in FIG. 48C relative to FIG. 45C. Interactions between other components may also be different between FIGS. 48C and 45C. The architectures 5840, 6140 may otherwise be implemented in substantially similar ways.

In comparison with FIG. 48B, the sensing architecture 6140 in FIG. 48C is different in that the third-party network can interact directly with the RAN 6152 and SMAF 6154. This may also impact how other components interact with each other. Otherwise, implementation of the sensing architecture 6140 may be substantially similar to implementation of the sensing architecture 6120 in FIG. 48B.

Figure 49:
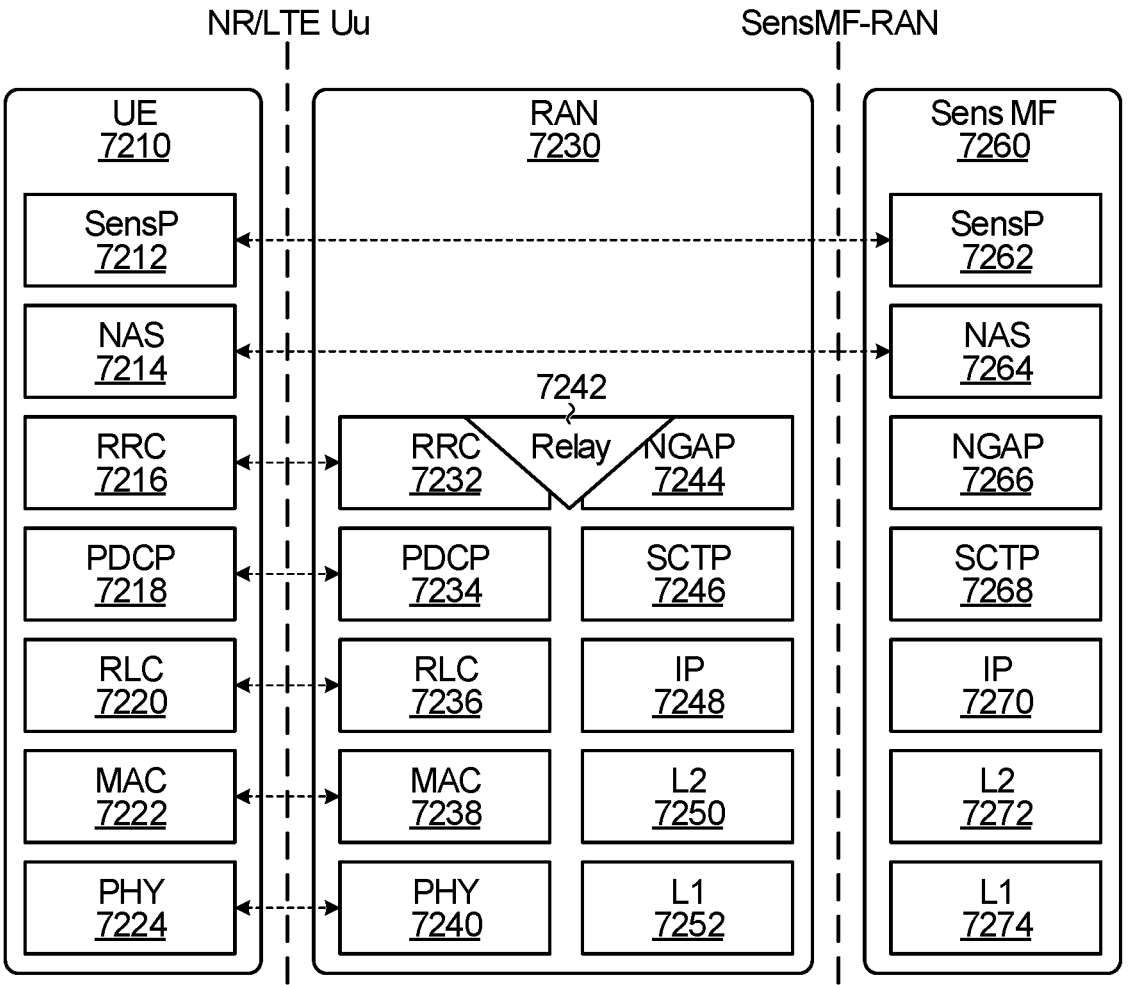
FIG. 49 is a block diagram illustrating example protocol stacks according to an embodiment.

FIG. 49 is a block diagram illustrating example protocol stacks according to an embodiment. Example protocol stacks at a UE, RAN, and SensMF are shown at 7210, 7230, 7260, respectively, for an example that is based on an uu air interface between the UE and the RAN. FIG. 49, and other block diagrams illustrating protocol stacks, are examples only. Other embodiments may include similar or different protocol layers, arranged in similar or different ways.

A sensing protocol or SensProtocol (SensP) layer 7212, 7262, shown in the example UE and SensMF protocol stacks 7210, 7260, is a higher protocol layer between a SensMF and a UE to support transfer of control information and/or sensing information transfer over an air interface, which is or at least includes an uu interface in the example shown.

Non-access stratum (NAS) layer 7214, 7264, also shown in the example UE and SensMF protocol stacks 7210, 7260, is another higher protocol layer, and forms a highest stratum of a control plane between a UE and a core network at the radio interface in the example shown. NAS protocols may be responsible for such features as any one or more of: supporting mobility of the UE and session management procedures to establish and maintain IP connectivity between the UE and the core network in the example shown. NAS security is an additional function of the NAS layer that may be provided in some embodiments to support one or more services to the NAS protocols, such as integrity protection and/or ciphering of NAS signaling messages for example.

A radio resource control (RRC) layer 7216, 7232, shown in the UE and RAN protocol stacks at 7210, 7230, is responsible for such features as any of: broadcast of system information related to the NAS layer; broadcast of system information related to an access stratum (AS); paging; establishment, maintenance and release of an RRC connection between the UE and a base station or other network device; security functions; etc.

A packet data convergence protocol (PDCP) layer 7218, 7234 is also shown in the example UE and RAN protocol stacks 7210, 7230, and is responsible for such features as any of: sequence numbering; header compression and decompression; transfer of user data; reordering and duplicate detection, if order delivery to layers above PDCP is required; PDCP protocol data unit (PDU) routing in the case of split bearers; ciphering and deciphering; duplication of PDCP PDUs; etc.

A radio link control (RLC) layer 7220, 7236 is shown in the example UE and RAN protocol stacks 7210, 7230, and is responsible for such features as any of: transfer of upper layer PDUs; sequence numbering independent of sequence numbering in PDCP; automatic repeat request (ARQ) segmentation and re-segmentation; reassembly of service data units (SDUs); etc.

A media access control (MAC) layer 7222, 7238, also shown in the example UE and RAN protocol stacks 7210, 7230, is responsible for such features as any of: mapping between logical channels and transport channels; multiplexing of MAC SDUs from one logical channel or different logical channels onto transport blocks (TBs) to be delivered to a physical layer on transport channels; demultiplexing of MAC SDUs from one logical channel or different logical channels from TBs delivered from a physical layer on transport channels; scheduling information reporting; and dynamic scheduling for downlink and uplink data transmissions for one or more UEs.

The physical (PHY) layer 7224, 7240 may provide or support such features as any of: channel encoding and decoding; bit interleaving; modulation; signal processing; etc. A PHY Layer handles all information from MAC layer transport channels over an air interface and may also handle such procedures as link adaptation through adaptive modulation and coding (AMC) for example, power control, cell search for either or both of initial synchronization and handover purposes, and/or other measurements, jointly working with a MAC layer.

The relay 7242 represents the information relaying over different protocol stacks by a protocol conversion from one interface to another, where the protocol conversion is between an air interface (between UE 7210 and RAN 7230) and wireline interface (between RAN 7230 and SensMF 7260).

The NG (next generation) application protocol (NGAP) layer 7244, 7266 in the RAN and SensMF example protocol stacks 7230, 7260 provides a way of exchanging control plane messages associated with the UE over the interface between the RAN and SensMF, where the UE association with the RAN at NGAP layer 7244 is by UE NGAP ID unique in the RAN, and the UE association with SensMF at NGAP layer 7266 is by UE NGAP ID unique in the SensMF, and two UE NGAP IDs may be coupled in the RAN and SensMF upon session setup.

The RAN and SensMF example protocol stacks 7230, 7260 also include a stream control transmission protocol (SCTP) layer 7246, 7268, which may provide features similar to those of the PDCP layer 7218, 7234 but for a wired SensMF-RAN interface.

Similarly, the internet protocol (IP) layer 7248, 7270, layer 2 (L2) 7250, 7272, and layer 1 (L1) 7252, 7274 protocol layers in the example shown may provide features similar to those RLC, MAC, and PHY layers in the NR/LTE Uu air interface, but for a wired SensMF-RAN interface in the example shown.

FIG. 49 shows an example of protocol layering for SensMF/UE interaction. In this example, SensP is used on top of a current air interface (uu) protocol. In other embodiments SensP may be used with a newly designed air interface for sensing in lower layers. SensP is intended to represent a higher layer protocol to carry sensing data, optionally with encryption, according a sensing format defined for data transmission between UE and a sensing module or coordinator such as SensMF.

Figure 50:
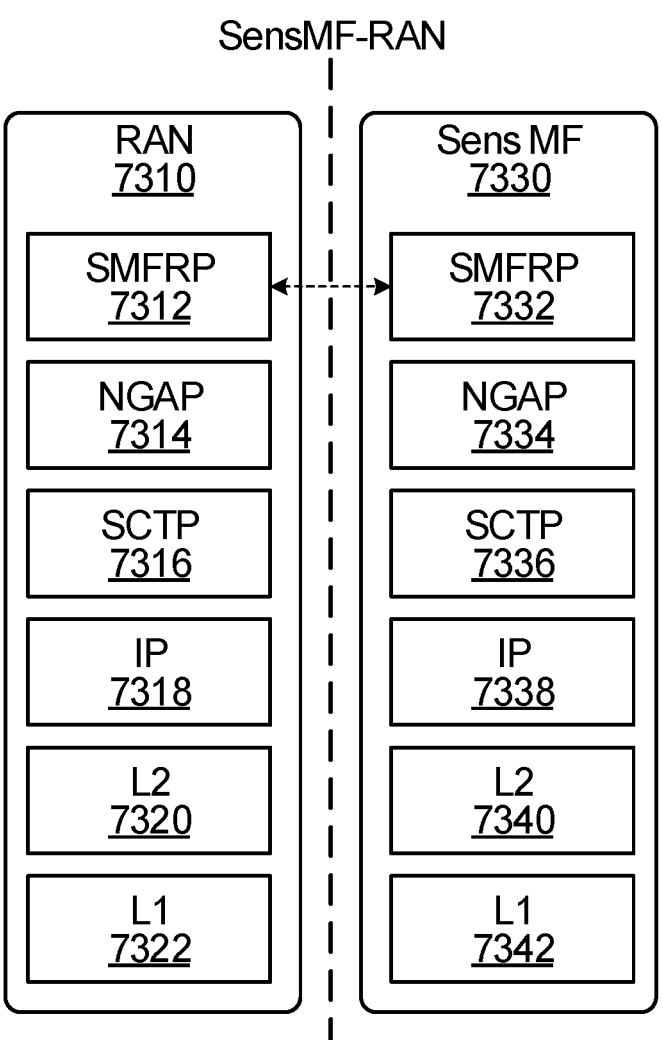
FIG. 50 is a block diagram illustrating example protocol stacks according to another embodiment.

FIG. 50 is a block diagram illustrating example protocol stacks according to another embodiment. Example protocol stacks at a RAN and SensMF are shown at 7310 and 7330, respectively. FIG. 20 relates to RAN/SensMF interaction, and may be applied to any of various types of interface between UEs and the RAN.

A SensMFRAN protocol (SMFRP) layer 7312, 7332, represents a higher protocol layer between SensMF and a RAN node, to support transfer of control information and sensing information over an interface between SensMF and a RAN node, which is a wireline connection interface in this example. The other illustrated protocol layers include NGAP layer 7314, 7334, SCTP layer 7316, 7336, IP layer 7318, 7338, L2 7320, 7340, and L1 7312, 7342, which are described by way of example at least above.

FIG. 50 shows an example of protocol layering for SensMF/RAN node interaction. SMFRP can be used on top of a wireline connection interface as in the example shown, on top of a current air interface (uu) protocol, or with a newly designed air interface for sensing in lower layers. SensP is another higher layer protocol to carry sensing data, optionally with encryption, and with a sensing format defined for data transmission between sensing coordinators, which may include a UE as shown in FIG. 59, a RAN node with a SAF or SMAF, and/or a sensing coordinator such as SensMF implemented in a core network or a third-party network.

Figure 51:
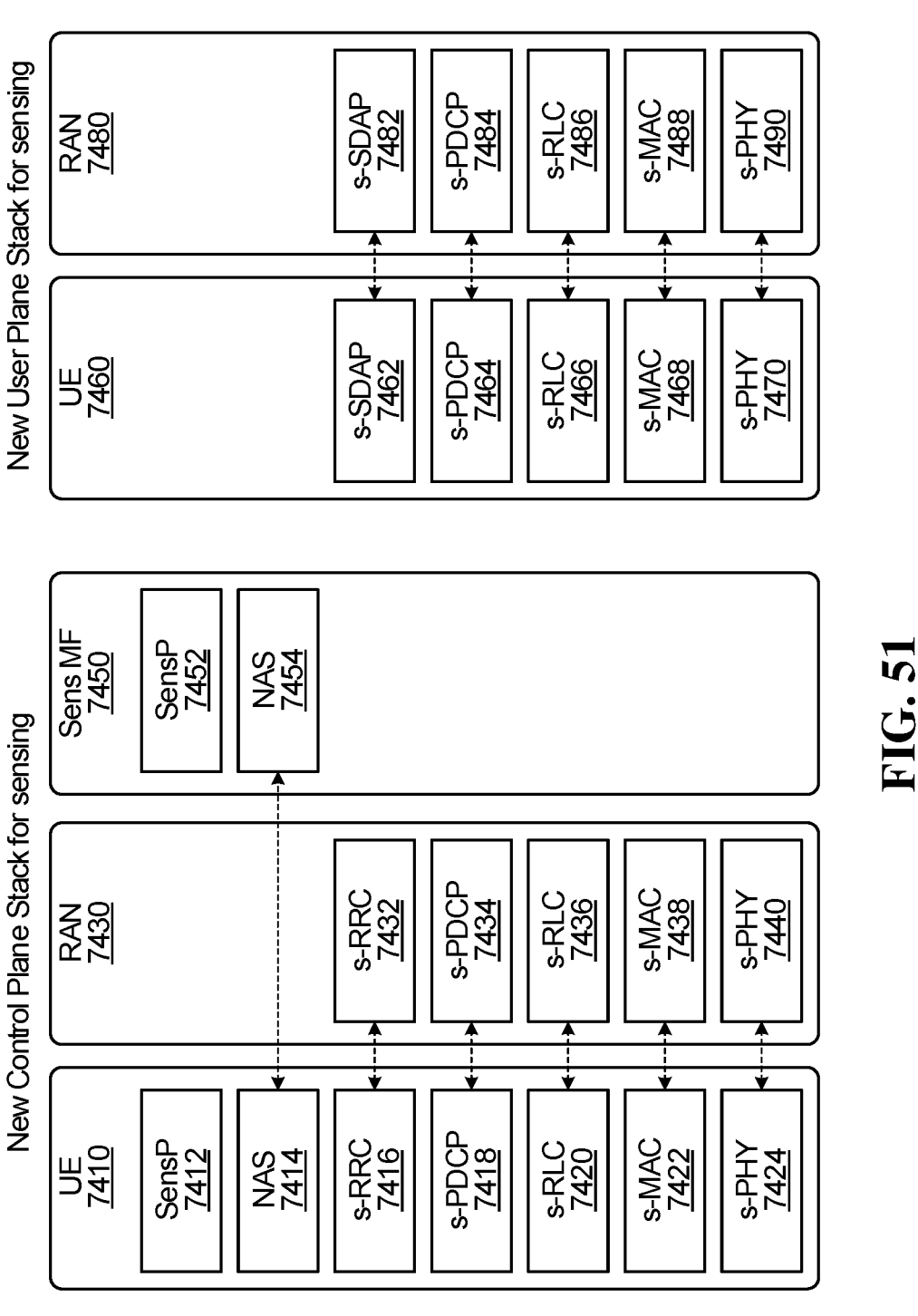
FIG. 51 is a block diagram illustrating example protocol stacks according to a further embodiment.

FIG. 51 is a block diagram illustrating example protocol stacks according to a further embodiment, and includes example protocol stacks for a new control plane for sensing and a new user plan for sensing. Example control plane protocol stacks at a UE, RAN, and SensMF are shown at 7410, 7430, 7450, respectively, and example user plane protocol for a UE and RAN are shown at 7460 and 7480, respectively.

The example in FIG. 49 is based on an uu air interface between the UE and the RAN, and in the example sensing connectivity protocol stacks in FIG. 51 the UE/RAN air interfaces are newly designed or modified sensing-specific interfaces, as indicated by the "s-" labels for the protocol layers. In general, an air interface for sensing can be between a RAN and a UE, and/or include wireless backhaul between SensMF and RAN.

The SensP layers 712, 7452 and the NAS layers 7414, 7454 are described by way of example at least above.

The s-RRC layers 7416, 7432 may reuse 4G or 5G air interface RRC protocol, or use a newly defined or modified RRC layer for sensing. For example, system information broadcasting for s-RRC may include a sensing configuration for a device during initial access to the network, sensing capability information support, etc.

The s-PDCP layers 7418, 7434 may similarly reuse 4G or 5G air interface PDCP protocol, or use a newly defined or modified PDCP layer for sensing, for example, to provide PDCP routing and relaying over one or more relay nodes, etc.

The s-RLC layers 7420, 7436 may reuse 4G or 5G air interface RLC protocol, or use a newly defined or modified RLC layer for sensing, for example, with no SDU segmentation.

The s-MAC layers 7422, 7438 may reuse 4G or 5G air interface MAC protocol, or use a newly defined or modified MAC layer for sensing, for example, using one or more new MAC control elements, one or more new logical channel identifier(s), different scheduling, etc.

Similarly, the s-PHY layers 7424, 7440 may reuse 4G or 5G air interface PHY protocol, or use a newly defined or modified PHY layer for sensing, for example, using one or more of: a different waveform, different encoding, different decoding, a different modulation and coding scheme (MCS), etc.

In the example new user plane for sensing, the following layers are described by way of example at least above: s-PDCP 7464, 7484, s-RLC 7466, 2486, s-MAC 2468, 2488, s-PHY layer 2470, 2490. A service data adaptation protocol (SDAP) layer is responsible for, for example, mapping between a quality-of-service (QoS) flow and a data radio bearer and marking QoS flow identifier (QFI) in both downlink and uplink packets, and a single protocol entity of SDAP is configured for each individual PDU session except for dual connectivity where two entities can be configured. The s-SDAP layers 7462, 7482 may reuse 4G or 5G air interface SDAP protocol, or use a newly defined or modified SDAP layer for sensing, for example, to define QoS flow IDs for sensing packets differently from downlink and uplink data bearers or in a special identity or identities for sensing, etc.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in a first device, the method comprising:
using a first set of channels to transmit, by the first device, a sensing signal for use in cooperative sensing involving a second device for sensing a target;
using a second set of channels to transmit, by the first device, a communications signal, the second set of channels including at least one channel not included in the first set of channels; and
receiving signalling to turn on or off sensing functions of using the first set of channels and using the second set of channels in response to the first device being turned on or in response to a collaborative sensing group being formed, reformed, or dismissed or in response to a sensing task being initiated or completed.

2. The method of claim 1, wherein each channel in the first set of channels and each channel in the second set of channels is a logical channel, a transport channel, or a physical channel, and wherein the first set of channels comprises at least one logical channel, and the second set of channels comprises a different at least one logical channel.

3. The method of claim 1, further comprising:

transmitting cooperation information between the first device and the second device, the cooperation information characterizing at least in part the first sensing signal.

4. The method of claim 1, further comprising:

exchanging timing information between the first device and the second device for the purpose of synchronization, the timing information indicating a time of transmission of the sensing signal.

5. The method of claim 1, wherein:

transmitting, by the first device, the sensing signal comprises using a first frequency band;

transmitting, by the first device, the communications signal comprises using a second frequency band;

wherein the first frequency band is a subset of the second frequency band or wherein the second frequency band is a subset of the first frequency band or different bandwidth part (BWP) configurations apply to frequency bands for communication and sensing.

6. The method of claim 1, wherein the signalling to turn on or off the sensing functions comprises signalling that is one of per cell, per sensing BWP, per group of devices, or per group of network devices.

7. The method of claim 1, wherein the signalling to turn on or off the sensing functions is in the form of an on/off pattern.

8. The method of claim 1, further comprising:

receiving, by the first device, a sensing input from the second device, the sensing input comprising at least one of:

first sensing data derived by the second device from a first echo of the sensing signal received by the second device;

an intermediate version of the first sensing data derived by the second device from the first echo of the sensing signal received by the second device;

a copy of the first echo of the sensing signal;

a compressed version of the first echo of the sensing signal;

coordinate information about one or more of the location, orientation, heading, and velocity of the second device; and synchronization or timing information; and obtaining, by the first device, second sensing data based on the received sensing input.

9. The method of claim 1, further comprising:

receiving sensing data or compressed sensing data from the target.

10. A first device comprising:

at least one processor configured to execute instructions to cause the first device to perform operations including:

using a first set of channels to transmit, by the first device, a first sensing signal for use in cooperative sensing involving a second device for sensing a target;

using a second set of channels to transmit, by the first device, a communications signal, the second set of channels including at least one channel not included in the first set of channels; and receiving signalling to turn on or off sensing functions of using the first set of channels and using the second set of channels: when the first device is turned on; or when a collaborative sensing group is formed, reformed, or dismissed; or when a sensing task is initiated or completed.

11. The first device of claim 10, wherein each channel in the first set of channels and each channel in the second set of channels is a logical channel, a transport channel, or a physical channel, and wherein the first set of channels comprises at least one logical channel, and the second set of channels comprises a different at least one logical channel.

12. The first device of claim 10, wherein the operations further include:

transmitting cooperation information between the first device and the second device, the cooperation information characterizing at least in part the first sensing signal.

13. The first device of claim 10, wherein the operations further include:

exchanging timing information between the first device and the second device for the purpose of synchronization, the timing information indicating a time of transmission of the sensing signal.

14. The first device of claim 10, wherein:

transmitting, by the first device, the sensing signal comprises using a first frequency band;

transmitting, by the first device, the communications signal comprises using a second frequency band;

wherein the first frequency band and the second frequency band do not overlap; or wherein the second frequency band is a subset of the first frequency band; or different bandwidth part (BWP) configurations apply to frequency bands for communication and sensing.

15. The first device of claim 10, wherein the signalling to turn on or off the sensing functions comprises signalling that is one of: per cell, per sensing BWP, per group of devices, or per group of network devices.

16. The first device of claim 10, wherein the signalling to turn on or off the sensing functions is in the form of an on/off pattern.

17. The first device of claim 10, wherein the operations further include:

receiving a sensing input from the second device, the sensing input comprising at least one of:

first sensing data derived by the second device from a first echo of the sensing signal received by the second device;

an intermediate version of the first sensing data derived by the second device from the first echo of the sensing signal received by the second device;

a copy of the first echo of the sensing signal;

a compressed version of the first echo of the sensing signal;

coordinate information about one or more of the location, orientation, heading, and velocity of the second device; and synchronization or timing information; and obtaining second sensing data based on the received sensing input.

18. The first device of claim 10, wherein the operations further include:

receiving sensing data or compressed sensing data from the target.

19. A computer program product comprising a non-transitory computer readable storage medium storing programming, the programming including instructions to:

use a first set of channels to transmit, by a first device, a sensing signal for use in cooperative sensing involving a second device for sensing a target;

use a second set of channels to transmit, by the first device, a communications signal, the second set of channels including at least one channel not included in the first set of channels; and receive signalling to turn on or off sensing functions of using the first set of channels and using the second set of channels: when the first device is turned on; or when a collaborative sensing group is formed, reformed, or dismissed; or when a sensing task is initiated or completed.

\* \* \* \* \*